United States Patent
Edge

(10) Patent No.: US 12,114,229 B2
(45) Date of Patent: Oct. 8, 2024

(54) SYSTEMS AND METHODS FOR LOCATION REPORTING WITH LOW LATENCY FOR WIRELESS NETWORKS

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 16/711,341

(22) Filed: Dec. 11, 2019

(65) Prior Publication Data

US 2020/0196101 A1 Jun. 18, 2020

Related U.S. Application Data

(60) Provisional application No. 62/945,664, filed on Dec. 9, 2019, provisional application No. 62/783,123, filed
(Continued)

(51) Int. Cl.
*H04W 4/00* (2018.01)
*H04W 4/02* (2018.01)
(Continued)

(52) U.S. Cl.
CPC ........... *H04W 4/029* (2018.02); *H04W 4/026* (2013.01); *H04W 4/027* (2013.01); *H04W 12/06* (2013.01); *H04W 76/20* (2018.02)

(58) Field of Classification Search
CPC ... H04W 4/029; H04W 64/003; H04W 64/00; H04W 4/02
See application file for complete search history.

(56) References Cited

U.S. PATENT DOCUMENTS 8,000,702 B2 8/2011 Dawson et al.
9,026,093 B2 * 5/2015 Niemenmaa ........ H04L 12/2854
455/414.2
(Continued)

FOREIGN PATENT DOCUMENTS

CN 101940041 A 1/2011
CN 102725649 A 10/2012
(Continued)

OTHER PUBLICATIONS

"3rd Generation Partnership Project; Technical Specification Group Radio Access Network; Evolved UniversalTerrestrial Radio Access Network (E-UTRAN); Stage 2 functional specification of User Equipment (UE) positioning in E-UTRAN (Release 15)", 3GPP Standard, Technical Specification, 3GPP TS 36.305, 3rd Generation Partnership Project (3GPP), Mobile Competence Centre, 650, Route Des Lucioles, F-06921, Sophia-Antipolis Cedex, France, vol. RAN WG2, No. V15.1.0, Sep. 27, 2018 (Sep. 27, 2018), pp. 1-87, XP051487411, [retrieved on Sep. 27, 2018].
(Continued)

*Primary Examiner* — Omoniyi Obayanju
(74) *Attorney, Agent, or Firm* — QUALCOMM Incorporated

(57) ABSTRACT

Methods and techniques are described for reducing end-to-end latency in a location determination of a user equipment (UE). Location requests from an external client for a UE may be supported using control plane signaling and may be performed only once or infrequently. Location reports to the external client may be supported with user plane signaling to minimize delay. A controlling entity for location of the UE may be part of a Radio Access Network (RAN) to further reduce delay and may be changed to a new controlling entity in the RAN and/or may reconfigure location measurements
(Continued)

for the UE when the UE moves to a new serving cell or new serving base station.

20 Claims, 20 Drawing Sheets

Related U.S. Application Data on Dec. 20, 2018, provisional application No. 62/778,852, filed on Dec. 12, 2018.

(51) Int. Cl.
*H04W 4/029* (2018.01)
*H04W 12/06* (2021.01)
*H04W 76/20* (2018.01)

(56) References Cited

U.S. PATENT DOCUMENTS

| | | | |
|---|---|---|---|
| 9,154,907 B2 | 10/2015 | Edge et al. | |
| 9,237,417 B2 | 1/2016 | Marshall et al. | |
| 9,838,838 B2 | 12/2017 | Rhee et al. | |
| 10,057,877 B2 | 8/2018 | Lee et al. | |
| 10,080,098 B1 | 9/2018 | Edge | |
| 10,383,081 B2 | 8/2019 | Edge et al. | |
| 10,462,610 B1 | 10/2019 | Irish et al. | |
| 10,547,421 B2 | 1/2020 | Palanivelu et al. | |
| 11,212,779 B2 | 12/2021 | Patel et al. | |
| 2005/0136942 A1* | 6/2005 | Timiri | H04W 4/02 455/456.1 |
| 2012/0295623 A1* | 11/2012 | Siomina | G01S 5/0263 455/436 |
| 2013/0059610 A1* | 3/2013 | Siomina | H04W 24/10 455/456.6 |
| 2013/0311764 A1 | 11/2013 | Alpert et al. | |
| 2014/0094188 A1 | 4/2014 | Kazmi et al. | |
| 2016/0302228 A1 | 10/2016 | Kazmi et al. | |
| 2016/0309379 A1 | 10/2016 | Pelletier et al. | |
| 2017/0276761 A1 | 9/2017 | Park et al. | |
| 2017/0332192 A1* | 11/2017 | Edge | H04W 4/029 |
| 2018/0091196 A1 | 3/2018 | Frenne et al. | |
| 2018/0139763 A1 | 5/2018 | Bitra et al. | |
| 2018/0199160 A1 | 7/2018 | Edge | |
| 2018/0262868 A1 | 9/2018 | Edge | |
| 2018/0279182 A1 | 9/2018 | Sang et al. | |
| 2019/0028170 A1 | 1/2019 | Zhang et al. | |
| 2019/0222286 A1 | 7/2019 | Miao | |
| 2019/0281588 A1 | 9/2019 | Zhang et al. | |
| 2020/0196298 A1 | 6/2020 | Edge et al. | |
| 2021/0127386 A1 | 4/2021 | Edge et al. | |
| 2021/0320769 A1 | 10/2021 | Cha et al. | |
| 2023/0362592 A1 | 11/2023 | Edge | |

FOREIGN PATENT DOCUMENTS

| | | | |
|---|---|---|---|
| TW | 201808043 A | 3/2018 | |
| WO | 2007002303 A1 | 1/2007 | |
| WO | 2014124106 A1 | 8/2014 | |
| WO | 2016048906 A1 | 3/2016 | |
| WO | WO-2016154009 A1 | 9/2016 | |
| WO | 2017134295 A1 | 8/2017 | |
| WO | 2017203487 A1 | 11/2017 | |
| WO | 2018064537 | 4/2018 | |
| WO | 2018069311 A1 | 4/2018 | |
| WO | 2018159967 A1 | 9/2018 | |
| WO | 2020123812 | 6/2020 | |

OTHER PUBLICATIONS

International Search Report and Written Opinion—PCT/US2019/065991—ISA/EPO—Mar. 3, 2020.
3GPP TR 23.700-71: "3rd Generation Partnership Project, Technical Specification Group Services and System Aspects, Study on Enhancement to the 5GC LoCation Services (LCS), Phase 3 (Release 18)", 3GPP TR 23.700-71, V0.3.0, 3rd Generation Partnership Project (3GPP), Mobile Competence Centre, 650, Route Des Lucioles, F-06921, Sophia-Antipolis Cedex, France, May 26, 2022, pp. 1-95, XP052159043, pp. 73-80.
3GPP TS 23.273: "3rd Generation Partnership Project, Technical Specification Group Services and System Aspects, SG System (SGS) Location Services (LCS), Stage 2 (Release 18)", 3GPP TS 23.273, V18.0.0, 3rd Generation Partnership Project (3GPP), Mobile Competence Centre, 650, Route Des Lucioles, F-06921, Sophia-Antipolis Cedex, France, Dec. 21, 2022, pp. 1-121, XP052234732, pp. 21-28, pp. 34-37.
Edge S., et al., (Qualcomm Incorporated): "Support of a UE User Plane Connection to an LCS Client or AF for Periodic or Triggered 5GC-MT-LR Event Reporting", 3GPP TSG-SA WG2 Meeting #154, S2-2210922, 3rd Generation Partnership Project (3GPP), Mobile Competence Centre, 650, Route Des Lucioles, F-06921, Sophia-Antipolis Cedex, France, vol. 3GPP SA 2, No. Toulouse, FR, Nov. 14, 2022-Nov. 18, 2022, Nov. 4, 2022, 15 Pages, XP052224989, pp. 2-10.
Taiwan Search Report—TW108145612—TIPO—Jan. 4, 2023.
Taiwan Search Report—TW108145612—TIPO—Sep. 4, 2023.

* cited by examiner

SYSTEMS AND METHODS FOR LOCATION REPORTING WITH LOW LATENCY FOR WIRELESS NETWORKS

CROSS-REFERENCE TO RELATED APPLICATIONS

This application claims the benefit of U.S. Provisional Application Nos. 62/778,852, entitled "SYSTEMS AND METHODS FOR LOCATION REPORTING WITH LOW LATENCY FOR FIFTH GENERATION WIRELESS NETWORKS," filed Dec. 12, 2018, 62/783,123, entitled "SYSTEMS AND METHODS FOR LOCATION REPORTING WITH LOW LATENCY FOR FIFTH GENERATION WIRELESS NETWORKS," filed Dec. 20, 2018, and 62/945,664, entitled "SYSTEMS AND METHODS FOR LOCATION REPORTING WITH LOW LATENCY FOR WIRELESS NETWORKS," filed Dec. 9, 2019, which are assigned to the assignee hereof and which are expressly incorporated herein by reference in their entireties.

BACKGROUND

Background Field

The present disclosure relates generally to communication, and more specifically to techniques for supporting location services for user equipments (UEs).

Relevant Background

Certain location use cases require very low latency in provision of a location of a mobile device to an external client. Examples include: smart (automated) factories where the positions of tools and objects being fabricated may need to be known with an accuracy of 10 centimeters or less and with a latency of less than 1 second; drones where a location accurate to 1 meter may need to be known within a second; public safety first responders at a dangerous location (e.g. inside a burning or partially collapsed building); and user cases associated with locating vehicles and/or pedestrians (referred to as V2X). Other user cases associated with high location accuracy may also have low latency requirements due to a rapid deterioration in location accuracy for a moving object. For example, even at only 4 mph (normal walking speed), an object would move 1.79 meters in 1 second, thereby nullifying the benefit of 1 meter location accuracy after less than 1 second.

Current location solutions defined for wireless networks can have a latency of 5 to 10 seconds or more and no location solutions defined for wireless networks are known with a latency consistently less than 1 second with the exception of solutions using mobile device based positioning where the mobile device or an App in the mobile device is also the client for the determined locations.

SUMMARY

Methods and techniques are described for reducing end-to-end latency in a location determination of a user equipment (UE). Location requests from an external client for a UE may be supported using control plane signaling and may be performed only once or infrequently. Location reports to the external client may be supported with user plane signaling to minimize delay. A controlling entity for location of the UE may be part of a Radio Access Network (RAN) to further reduce delay and may be changed to a new controlling entity in the RAN and/or may reconfigure location measurements for the UE when the UE moves to a new serving cell or new serving base station.

In one implementation, a method for locating a user equipment (UE) performed by a first entity in a wireless network, includes receiving a request for locating the UE from a second entity in the wireless network, wherein the request for locating the UE is based on a location request initiated by an external client and is received by the first entity from the second entity using control plane signaling; obtaining first location information for the UE using control plane signaling; and reporting the first location information for the UE to the external client using user plane signaling.

In one implementation, a first entity in a wireless network configured to support location determination of a user equipment (UE) includes an external interface configured to communicate with other entities in the wireless network; at least one memory; and at least one processor coupled to the wireless transceiver and the at least one memory, the at least one processor configured to: receive a request for locating the UE from a second entity in the wireless network, wherein the request for locating the UE is based on a location request initiated by an external client and is received by the first entity from the second entity using control plane signaling; obtain first location information for the UE using control plane signaling; and report the first location information for the UE to the external client using user plane signaling.

In one implementation, a first entity in a wireless network configured to support location determination of a user equipment (UE) includes means for receiving a request for locating the UE from a second entity in the wireless network, wherein the request for locating the UE is based on a location request initiated by an external client and is received by the first entity from the second entity using control plane signaling; means for obtaining first location information for the UE using control plane signaling; and means for reporting the first location information for the UE to the external client using user plane signaling.

In one implementation, a non-transitory computer readable medium including program code stored thereon, the program code is operable to configure at least one processor in a first entity in a wireless network for supporting location determination of a user equipment (UE), includes program code to receive a request for locating the UE from a second entity in the wireless network, wherein the request for locating the UE is based on a location request initiated by an external client and is received by the first entity from the second entity using control plane signaling; program code to obtain first location information for the UE using control plane signaling; and program code to report the first location information for the UE to the external client using user plane signaling.

In one implementation, a method for locating a user equipment (UE) performed by a first base station in a Radio Access Network (RAN) for a wireless network, wherein the first base station is a serving base station for the UE, the method includes receiving a request for locating the UE from a first entity in the wireless network, wherein the request for locating the UE is based on a location request initiated by an external client and is received by the first base station from the first entity using control plane signaling; and sending information for locating the UE to a second entity in the RAN using control plane signaling, wherein the information for locating the UE sent to the second entity in the RAN enables the second entity to obtain location information for the UE using control plane signaling and to report the location information for the UE to the external client using user plane signaling.

In one implementation, a first base station in a Radio Access Network (RAN) for a wireless network configured to support location determination a user equipment (UE), wherein the first base station is a serving base station for the UE, includes an external interface configured to communicate with other entities in the wireless network; at least one memory; and at least one processor coupled to the wireless transceiver and the at least one memory, the at least one processor configured to: receive a request for locating the UE from a first entity in the wireless network, wherein the request for locating the UE is based on a location request initiated by an external client and is received by the first base station from the first entity using control plane signaling; and send information for locating the UE to a second entity in the RAN using control plane signaling, wherein the information for locating the UE sent to the second entity in the RAN enables the second entity to obtain location information for the UE using control plane signaling and to report the location information for the UE to the external client using user plane signaling.

In one implementation, a first base station in a Radio Access Network (RAN) for a wireless network configured to support location determination a user equipment (UE), wherein the first base station is a serving base station for the UE, includes means for receiving a request for locating the UE from a first entity in the wireless network, wherein the request for locating the UE is based on a location request initiated by an external client and is received by the first base station from the first entity using control plane signaling; and means for sending information for locating the UE to a second entity in the RAN using control plane signaling, wherein the information for locating the UE sent to the second entity in the RAN enables the second entity to obtain location information for the UE using control plane signaling and to report the location information for the UE to the external client using user plane signaling.

In one implementation, a non-transitory computer readable medium including program code stored thereon, the program code is operable to configure at least one processor in a first base station in a Radio Access Network (RAN) for a wireless network configured to support location determination a user equipment (UE), wherein the first base station is a serving base station for the UE, includes program code to receive a request for locating the UE from a first entity in the wireless network, wherein the request for locating the UE is based on a location request initiated by an external client and is received by the first base station from the first entity using control plane signaling; and program code to sending information for locating the UE to a second entity in the RAN using control plane signaling, wherein the information for locating the UE sent to the second entity in the RAN enables the second entity to obtain location information for the UE using control plane signaling and to report the location information for the UE to the external client using user plane signaling.

In one implementation, a method for locating a user equipment (UE) performed by a first entity in a wireless network, includes receiving a request for locating the UE from an external client; transferring the request for locating the UE to a second entity in the wireless network using control plane signaling, wherein the request for locating the UE includes a request to report location information using user plane signaling and an address to which the location information is to be reported; receiving a first response from the second entity using control plane signaling, wherein the first response indicates acceptance of the request for locating the UE; and forwarding the first response to the external client.

In one implementation, a first entity in a wireless network configured to support location determination of a user equipment (UE) includes an external interface configured to communicate with other entities in the wireless network; at least one memory; and at least one processor coupled to the external interface and the at least one memory, the at least one processor configured to: receive a request for locating the UE from an external client; transfer the request for locating the UE to a second entity in the wireless network using control plane signaling, wherein the request for locating the UE includes a request to report location information using user plane signaling and an address to which the location information is to be reported; receive a first response from the second entity using control plane signaling, wherein the first response indicates acceptance of the request for locating the UE; and forward the first response to the external client.

In one implementation, a first entity in a wireless network configured to support location determination of a user equipment (UE) includes means for receiving a request for locating the UE from an external client; means for transferring the request for locating the UE to a second entity in the wireless network using control plane signaling, wherein the request for locating the UE includes a request to report location information using user plane signaling and an address to which the location information is to be reported; means for receiving a first response from the second entity using control plane signaling, wherein the first response indicates acceptance of the request for locating the UE; and means for forwarding the first response to the external client.

In one implementation, a non-transitory computer readable medium including program code stored thereon, the program code is operable to configure at least one processor in a first entity in a wireless network configured to support location determination of a user equipment (UE) includes program code to receive a request for locating the UE from an external client; program code to transfer the request for locating the UE to a second entity in the wireless network using control plane signaling, wherein the request for locating the UE includes a request to report location information using user plane signaling and an address to which the location information is to be reported; program code to receive a first response from the second entity using control plane signaling, wherein the first response indicates acceptance of the request for locating the UE; and program code to forward the first response to the external client.

In one implementation, a method for locating a user equipment (UE) performed by a first entity in a wireless network, includes receiving a request for locating the UE from a second entity in the wireless network, wherein the request for locating the UE is based on a location request initiated by an external client and is received by the first entity from the second entity using control plane signaling; and sending information for the request for locating the UE to a third entity in the wireless network using control plane signaling, wherein the request for locating the UE and the information for the request for locating the UE each include a request to report location information using user plane signaling and an address to which the location information is to be reported, wherein the information for the request for locating the UE enables the third entity to obtain location information for the UE using control plane signaling and report the location information for the UE to the external client using user plane signaling.

In one implementation, a first entity in a wireless network configured to support location determination of a user equipment (UE) includes an external interface configured to communicate with other entities in the wireless network; at least one memory; and at least one processor coupled to the external interface and the at least one memory, the at least one processor configured to: receive a request for locating the UE from a second entity in the wireless network, wherein the request for locating the UE is based on a location request initiated by an external client and is received by the first entity from the second entity using control plane signaling; and send information for the request for locating the UE to a third entity in the wireless network using control plane signaling, wherein the request for locating the UE and the information for the request for locating the UE each include a request to report location information using user plane signaling and an address to which the location information is to be reported, wherein the information for the request for locating the UE enables the third entity to obtain location information for the UE using control plane signaling and report the location information for the UE to the external client using user plane signaling.

In one implementation, a first entity in a wireless network configured to support location determination of a user equipment (UE) includes means for receiving a request for locating the UE from a second entity in the wireless network, wherein the request for locating the UE is based on a location request initiated by an external client and is received by the first entity from the second entity using control plane signaling; and means for sending information for the request for locating the UE to a third entity in the wireless network using control plane signaling, wherein the request for locating the UE and the information for the request for locating the UE each include a request to report location information using user plane signaling and an address to which the location information is to be reported, wherein the information for the request for locating the UE enables the third entity to obtain location information for the UE using control plane signaling and report the location information for the UE to the external client using user plane signaling.

In one implementation, a non-transitory computer readable medium including program code stored thereon, the program code is operable to configure at least one processor in a first entity in a wireless network configured to support location determination of a user equipment (UE) includes program code to receive a request for locating the UE from a second entity in the wireless network, wherein the request for locating the UE is based on a location request initiated by an external client and is received by the first entity from the second entity using control plane signaling; and program code to send information for the request for locating the UE to a third entity in the wireless network using control plane signaling, wherein the request for locating the UE and the information for the request for locating the UE each include a request to report location information using user plane signaling and an address to which the location information is to be reported, wherein the information for the request for locating the UE enables the third entity to obtain location information for the UE using control plane signaling and report the location information for the UE to the external client using user plane signaling.

In one implementation, a method for locating a user equipment (UE) performed by a first entity in a radio access network (RAN) for a wireless network, includes receiving a request for locating the UE from a second entity in the wireless network, wherein the request for locating the UE is based on a location request initiated by an external client and is received by the first entity from the second entity using control plane signaling; obtaining first location information for the UE using control plane signaling; reporting the first location information for the UE to the external client using control plane signaling; receiving an indication of a new serving cell for the UE or a new serving base station for the UE and an indication of connectivity; determining whether to continue or to cease the obtaining of the first location information for the UE and the reporting the first location information for the UE, based on the indication of the new serving cell for the UE or the new serving base station for the UE and the indication of connectivity; continuing to obtain the first location information for the UE and to report the first location information for the UE to the external client when the determining is to continue; and ceasing to obtain the first location information for the UE and to report the first location information for the UE to the external client when the determining is to cease.

In one implementation, a first entity in a radio access network (RAN) for a wireless network configured to support location determination of a user equipment (UE) includes an external interface configured to communicate with other entities in the wireless network; at least one memory; and at least one processor coupled to the external interface and the at least one memory, the at least one processor configured to: receive a request for locating the UE from a second entity in the wireless network, wherein the request for locating the UE is based on a location request initiated by an external client and is received by the first entity from the second entity using control plane signaling; obtain first location information for the UE using control plane signaling; report the first location information for the UE to the external client using control plane signaling; receive an indication of a new serving cell for the UE or a new serving base station for the UE and an indication of connectivity; determine whether to continue or to cease the obtaining of the first location information for the UE and the reporting the first location information for the UE, based on the indication of the new serving cell for the UE or the new serving base station for the UE and the indication of connectivity; continue to obtain the first location information for the UE and to report the first location information for the UE to the external client when the determining is to continue; and cease to obtain the first location information for the UE and to report the first location information for the UE to the external client when the determining is to cease.

In one implementation, a first entity in a radio access network (RAN) for a wireless network configured to support location determination of a user equipment (UE) includes means for receiving a request for locating the UE from a second entity in the wireless network, wherein the request for locating the UE is based on a location request initiated by an external client and is received by the first entity from the second entity using control plane signaling; means for obtaining first location information for the UE using control plane signaling; means for reporting the first location information for the UE to the external client using control plane signaling; means for receiving an indication of a new serving cell for the UE or a new serving base station for the UE and an indication of connectivity; means for determining whether to continue or to cease the obtaining of the first location information for the UE and the reporting the first location information for the UE, based on the indication of the new serving cell for the UE or the new serving base station for the UE and the indication of connectivity; means for continuing to obtain the first location information for the UE and to report the first location information for the UE to the external client when the determining is to continue; and means for ceasing to obtain the first location information for the UE and to report the first location information for the UE to the external client when the determining is to cease.

In one implementation, a non-transitory computer readable medium including program code stored thereon, the program code is operable to configure at least one processor in a first entity in a radio access network (RAN) for a wireless network configured to support location determination of a user equipment (UE) includes program code to receive a request for locating the UE from a second entity in the wireless network, wherein the request for locating the UE is based on a location request initiated by an external client and is received by the first entity from the second entity using control plane signaling; program code to obtain first location information for the UE using control plane signaling; program code to report the first location information for the UE to the external client using control plane signaling; program code to receive an indication of a new serving cell for the UE or a new serving base station for the UE and an indication of connectivity; program code to determine whether to continue or to cease the obtaining of the first location information for the UE and the reporting the first location information for the UE, based on the indication of the new serving cell for the UE or the new serving base station for the UE and the indication of connectivity; program code to continue to obtain the first location information for the UE and to report the first location information for the UE to the external client when the determining is to continue; and program code to cease to obtain the first location information for the UE and to report the first location information for the UE to the external client when the determining is to cease.

In one implementation, a method for locating a user equipment (UE) performed by a first base station in a Radio Access Network (RAN) for a wireless network, wherein the first base station is a serving base station for the UE, includes receiving a request for locating the UE from a first entity in the wireless network, wherein the request for locating the UE is based on a location request initiated by an external client and is received by the first base station from the first entity using control plane signaling; sending information for locating the UE to a second entity in the RAN using control plane signaling, wherein the information for locating the UE sent to the second entity in the RAN enables the second entity to obtain location information for the UE using control plane signaling and to report the location information for the UE to the external client using control plane signaling; identifying a change of serving base station for the UE, wherein the change of serving base station is to a new serving base station; determining if there is sufficient signaling connectivity between the second entity and the new serving base station, and between the second entity and neighboring base stations for the new serving base station, to enable location reporting for the UE to continue at the second entity; and sending a message to or towards the new serving base station, wherein the message comprises an indication of whether or not there is sufficient signaling connectivity and a location context for the UE, wherein the message enables a continuation of location information reporting for the UE to the external client following the change of serving base station.

In one implementation, a first base station in a Radio Access Network (RAN) for a wireless network configured to support location determination of a user equipment (UE), wherein the first base station is a serving base station for the UE, includes an external interface configured to communicate with other entities in the wireless network; at least one memory; and at least one processor coupled to the external interface and the at least one memory, the at least one processor configured to: receive a request for locating the UE from a first entity in the wireless network, wherein the request for locating the UE is based on a location request initiated by an external client and is received by the first base station from the first entity using control plane signaling; send information for locating the UE to a second entity in the RAN using control plane signaling, wherein the information for locating the UE sent to the second entity in the RAN enables the second entity to obtain location information for the UE using control plane signaling and to report the location information for the UE to the external client using control plane signaling; identify a change of serving base station for the UE, wherein the change of serving base station is to a new serving base station; determine if there is sufficient signaling connectivity between the second entity and the new serving base station, and between the second entity and neighboring base stations for the new serving base station, to enable location reporting for the UE to continue at the second entity; and send a message to or towards the new serving base station, wherein the message comprises an indication of whether or not there is sufficient signaling connectivity and a location context for the UE, wherein the message enables a continuation of location information reporting for the UE to the external client following the change of serving base station.

In one implementation, a first base station in a Radio Access Network (RAN) for a wireless network configured to support location determination of a user equipment (UE), wherein the first base station is a serving base station for the UE, includes means for receiving a request for locating the UE from a first entity in the wireless network, wherein the request for locating the UE is based on a location request initiated by an external client and is received by the first base station from the first entity using control plane signaling; means for sending information for locating the UE to a second entity in the RAN using control plane signaling, wherein the information for locating the UE sent to the second entity in the RAN enables the second entity to obtain location information for the UE using control plane signaling and to report the location information for the UE to the external client using control plane signaling; means for identifying a change of serving base station for the UE, wherein the change of serving base station is to a new serving base station; means for determining if there is sufficient signaling connectivity between the second entity and the new serving base station, and between the second entity and neighboring base stations for the new serving base station, to enable location reporting for the UE to continue at the second entity; and means for sending a message to or towards the new serving base station, wherein the message comprises an indication of whether or not there is sufficient signaling connectivity and a location context for the UE, wherein the message enables a continuation of location information reporting for the UE to the external client following the change of serving base station.

In one implementation, a non-transitory computer readable medium including program code stored thereon, the program code is operable to configure at least one processor in a first base station in a Radio Access Network (RAN) for a wireless network configured to support location determination of a user equipment (UE), wherein the first base station is a serving base station for the UE, includes program code to receive a request for locating the UE from a first entity in the wireless network, wherein the request for locating the UE is based on a location request initiated by an external client and is received by the first base station from the first entity using control plane signaling; program code to send information for locating the UE to a second entity in the RAN using control plane signaling, wherein the information for locating the UE sent to the second entity in the RAN enables the second entity to obtain location information for the UE using control plane signaling and to report the location information for the UE to the external client using control plane signaling; program code to identify a change of serving base station for the UE, wherein the change of serving base station is to a new serving base station; program code to determine if there is sufficient signaling connectivity between the second entity and the new serving base station, and between the second entity and neighboring base stations for the new serving base station, to enable location reporting for the UE to continue at the second entity; and program code to send a message to or towards the new serving base station, wherein the message comprises an indication of whether or not there is sufficient signaling connectivity and a location context for the UE, wherein the message enables a continuation of location information reporting for the UE to the external client following the change of serving base station.

BRIEF DESCRIPTION OF THE DRAWINGS

An understanding of the nature and advantages of various embodiments may be realized by reference to the following figures.

FIG. 8, which includes

Figure 1:
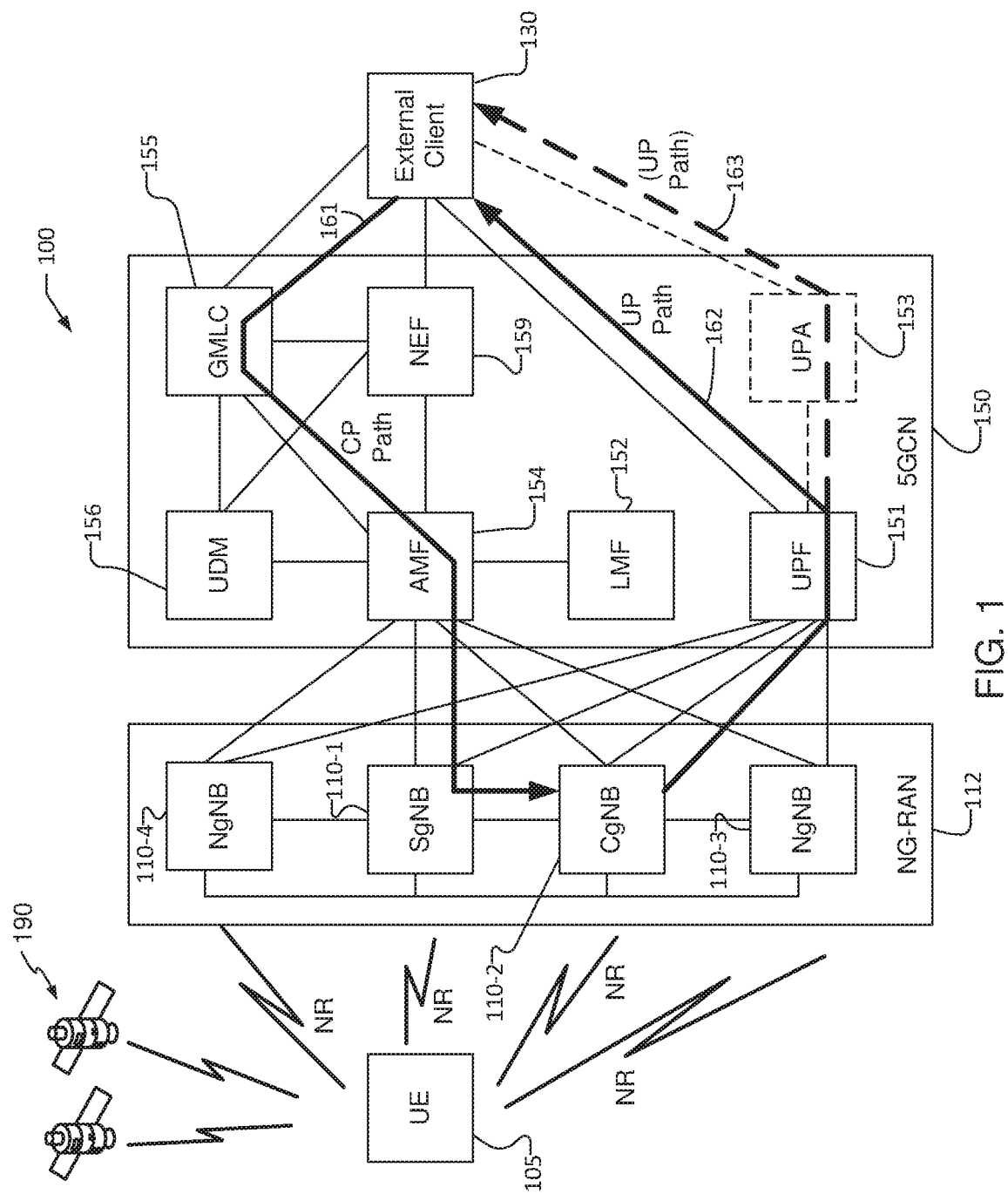
FIG. 1 is a simplified block diagram illustrating a network architecture to support a Very Low Latency Location Service (VLLLS) for a non-roaming UE.

Like reference numbers and symbols in the various figures indicate like elements, in accordance with certain example implementations. In addition, multiple instances of an element may be indicated by following a first number for the element with a letter or with a hyphen and a second number. For example, multiple instances of an element 110 may be indicated as 110-1, 110-2, 110-3 etc. Similarly, multiple instances of an element 155 may be indicated as 155A, 155B, 155C etc. When referring to such an element using only the first number, any instance of the element is to be understood (e.g. elements 110 in the previous example would refer to elements 110-1, 110-2 and 110-3, and element 155 in the previous example would refer to elements 155A, 155B and 155C).

DETAILED DESCRIPTION

Obtaining the location of a user equipment (UE) (sometimes referred to as a "target UE") in a wireless network may be useful for many applications including, for example, emergency calls, personal navigation, asset tracking, locating a friend or family member, etc. Certain types of use cases, however, require low or very low latency (e.g. less than 1 second and in some cases less than 100 milliseconds (ms)). Components of end to end latency in providing a location estimate of a target UE to an external client may include the following: A) delay in sending a location request from the external client to a controlling entity in a wireless network (e.g. a location server); B) delay in requesting location measurements or a location estimate by the controlling entity from other entities in the wireless network and/or from the target UE; C) delay in obtaining location measurements; D) delay in transferring location measurements to a location computation entity (e.g. the controlling entity); E) delay in computing a location estimate from the location measurements; and F) delay in transferring the computed location estimate to the external client.

To minimize these components, one or more of the following approaches may be taken. Components (A) and (B) may be performed once only or infrequently to establish an ongoing series of location measurements for a target UE (e.g. via periodic or triggered location). Component (C) may be reduced via tracking in which a location measuring entity (e.g. the target UE or a base station in the wireless network) relies on previous measurements to establish a small window within which any new measurement can be expected to be obtained. For example, a Time of Arrival (TOA) measurement which requires correlation of a received signal with previously known signal content may be obtained much faster when the TOA (and any Doppler) is already known fairly accurately by a measuring entity. Component (C) may also be reduced by obtaining measurements in parallel from multiple entities, such as from multiple base stations, rather than in series from just one entity. Component (D) may be reduced by assigning a location computation entity close to the source(s) of location measurement, such as assigning the target UE for location computation when the UE provides at least some of the measurements, or assigning a location computation entity in a Radio Access Network (RAN) rather than in a Core Network (CN) when the UE and/or base stations in the RAN provide the measurements. Component (E) may be reduced by using a faster processor for location computation—e.g. as in a location server or higher end target UE. Component (F) may be reduced by employing user plane transfer of a location estimate directly from a location computation entity to an external client, which may avoid extra delay caused by intermediate (e.g. control plane) entities and may use high bandwidth.

One difference between the above approaches and that of traditional location solutions lies in the reduction of delay for Components (A), (B) and (F). Since the establishment of an ongoing series of location measurements for a target UE needs to be performed once only or infrequently, it may be supported using traditional control plane procedures and signaling. However, since delivery of location reports to an external client adds latency to every location report, it may be supported with user plane signaling and procedures which may minimize delay. As part of the solution, when a controlling entity is part of a Radio Access Network (RAN) (e.g. to reduce delay for component (D)), efficient means for periodically changing the controlling entity and reconfiguring location measurements may be supported when a target UE moves to a new serving cell or new serving base station.

Figure 2:
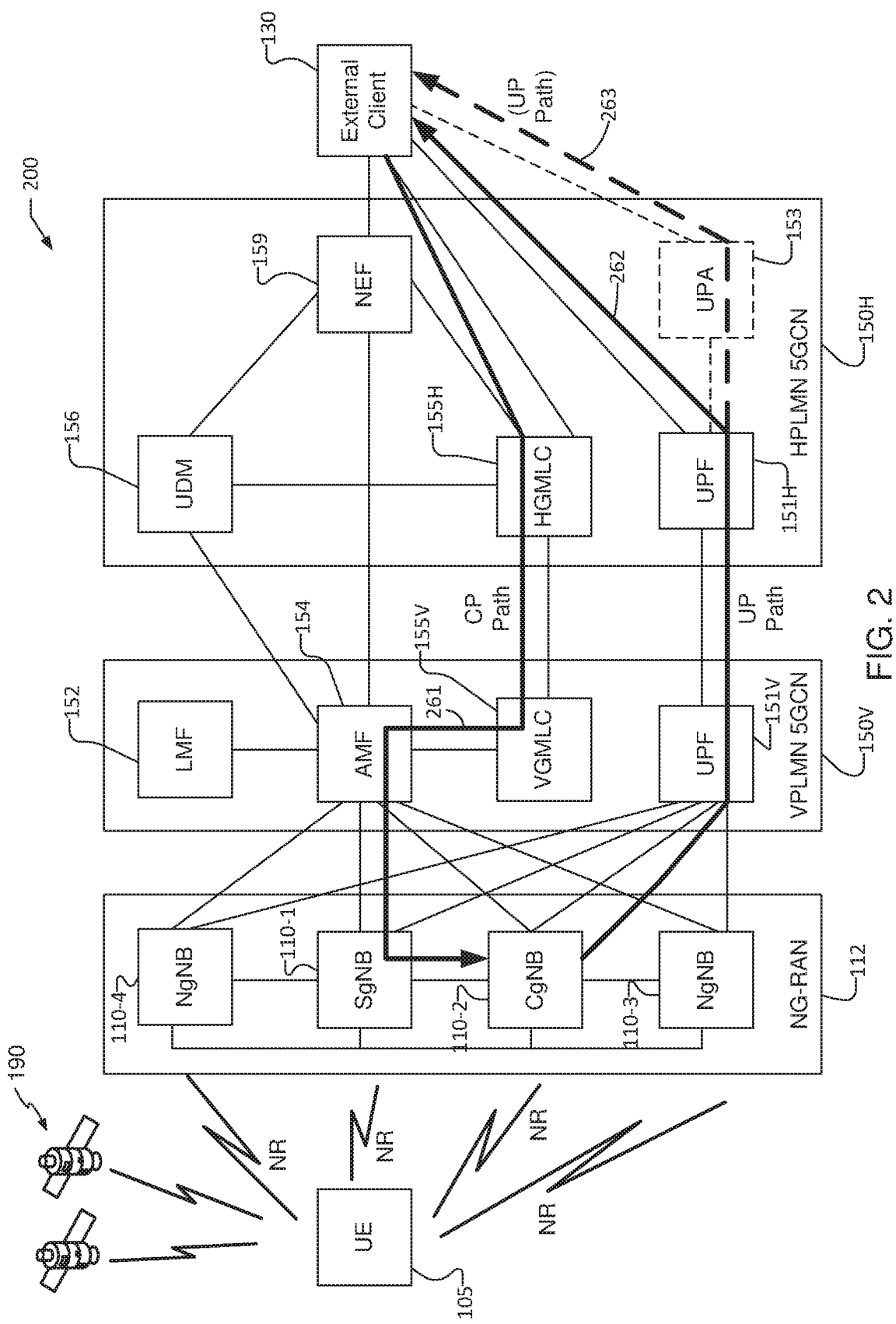
FIG. 2 is a simplified block diagram illustrating a network architecture to support a VLLLS for a roaming UE.

FIG. 1 shows a network architecture to support a Very Low Latency Location Service (VLLLS) for a non-roaming UE and FIG. 2 shows a corresponding network architecture for a roaming UE. Both FIGS. 1 and 2 may align, or partially align, with location solutions defined by the Third Generation Partnership Project (3GPP).

FIG. 1 illustrates a communication system 100 that comprises a UE 105, which is referred to here as a "target UE", since UE 105 may be the target of a location request. FIG. 1 also shows components of a Fifth Generation (5G) network, which may also be referred to as a 5G System (5GS), comprising a Next Generation RAN (NG-RAN) 112, which includes base stations (BSs), sometimes referred to as New Radio (NR) NodeBs or gNBs, 110-1, 110-2, 110-3, and 110-4 (collectively and generically referred to herein as gNBs 110), and a 5G Core Network (5GCN) 150 that is in communication with an external client 130. A 5G network may also be referred to as a New Radio (NR) network; NG-RAN 112 may be referred to as an NR RAN or a 5G RAN; and 5GCN 150 may be referred to as an Next Generation (NG) Core network (NGC). The communication system 100 may further utilize information from space vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

FIG. 1 also shows a serving gNB (SgNB) 110-1 for the target UE 105, some neighbor gNBs (NgNBs) 110-3, 110-4 and a Controlling gNB (CgNB) 110-2. An NgNB 110 may be any gNB 110 which is able to receive and measure uplink (UL) signals transmitted by the target UE 105 and/or is able to transmit a downlink (DL) reference signal (RS) that can be received and measured by the target UE 105. The CgNB 110-2 functions as a controlling entity for location of the target UE 105 and supports a location server function which may be referred to as a Location Management Component (LMC) or a Local LMF (LLMF). The CgNB 110-2 may support one or more functions such as receiving a request for the location of the target UE 105 from an Access and Mobility Management Function (AMF) 154 or the SgNB 110-1 (if different to the CgNB 110-2). The CgNB 110-2 may coordinate the location of the target UE 105 by obtaining a series of location estimates for the target UE 105 (e.g. periodic or triggered locations). The CgNB 110-2 may configure location measurements for the target UE 105 in other gNBs 110 (e.g. SgNB 110-1 and NgNBs 110) and/or in the target UE 105. The CgNB 110-2 may configure transmission of uplink (UL) signals (e.g. UL reference signals (RSs)) by the target UE 105 (to be measured by gNBs 110) and/or transmission of downlink (DL) RSs by gNBs 110 (to be measured by the target UE 105). The CgNB 110-2 may receive location measurements for the target UE 105 from the target UE 105 and/or from other gNBs 110. The CgNB 110-2 may compute a location estimate for the target UE 105. The CgNB 110-2 may transfer the location estimate to the external client 130. The CgNB 110-2 may support a change of CgNB due to mobility of the target UE 105 to a new SgNB.

The CgNB 110-2 may be the SgNB 110-1, another NgNB 110 or some other gNB 110. In that case, the CgNB 110-2 may perform some or all functions of a normal gNB 110 with respect to supporting wireless access (e.g. comprising data, voice and signaling according to 5G NR) from a UE 105 and may include additional capability (e.g. in a dedicated hardware element in the CgNB 110-2 which may be referred to as an LMC or LLMF, and/or in additional software or firmware running on a shared hardware element of CgNB 110-2) that allows the CgNB 110-2 to control and support the location of a UE 105. The CgNB 110-2 may instead be a separate physical server that does not support gNB 110 functions. In that case, the CgNB 110-2 may be referred to as a "Location Management Component (LMC) server" or "Local Location Management Function (LLMF) server". However, in the current description, the CgNB 110-2 retains the term "gNB" in its name and abbreviation even though it may not be a gNB. The CgNB 110-2 may not be present when UE based location and/or an LMF 152 is (or are) used, where the target UE 105 or LMF 152 transfers location reports directly to the external client 130, as described later herein. Note that the terms "LMC" and "LLMF" refer to a dedicated hardware or software element in a CgNB 110-2 (e.g. which may be a physically separate server residing within CgNB 110-2), where the CgNB 110-2 functions also as a normal gNB 110 (e.g. by supporting NR wireless access from a UE 105). In contrast, the terms "LMC server" and "LLMF server" refer to a CgNB 110-2 which does not function as a normal gNB 110 (e.g. does not support NR wireless access from a UE 105) and acts only (or primarily) as a location server in NG-RAN 112.

FIG. 1 also shows a User Plane Aggregator (UPA) 153. The UPA 153 is optional and enables an external client 130 to receive location reports for multiple target UEs by interacting only with the UPA 153. When UPA 153 is not present, an external client 130 could need to interact with the CgNB 110-2 for each target UE 105 for which the external client 130 has instigated location reporting, which may be less efficient (e.g. when the CgNB 110-2 for a target UE 105 is changed) and/or may pose a security risk for a CgNB 110-2 and/or the external client 130. The UPA 153 can avoid the need for a CgNB 110-2 to establish location reporting sessions to multiple external clients and for external clients to establish location reporting sessions to multiple CgNBs. The UPA 153 may also provide security for the NG-RAN 112 and/or the external client 130 by authenticating and authorizing the external client 130 and/or CgNB 110-2. The UPA 153 may be part of the 5GCN 150 or may be external to the 5GCN 150 (e.g. may be associated with the external client 130).

The NG-RAN 112 may also include location measurement units (LMUs) (not shown in FIGS. 1 and 2), which can receive and measure signals from the target UE 105 but do not transmit signals to UEs for normal network operation, and/or location transmission units (LTUs) (not shown in FIGS. 1 and 2), which transmit reference signals to be measured by the target UE 105 but do not receive signals from UEs for normal network operation. An LMU or LTU may be connected to one or more other gNBs 110 and/or to an AMF 154. An LMU and LTU may be combined in the same physical entity. An LTU and/or LMU may also function as a CgNB.

Entities in the NG-RAN 112 which transmit DL reference signals (RSs) to be measured by a target UE 105 for a particular location session are referred to generically as "Transmission Points" (TPs) and can include one or more of the SgNB 110-1, CgNB 110-2 (if different to the SgNB 110-1), NgNBs 110-3, 110-4, and LTUs (not shown). In some cases, SgNB 110-1, CgNB 110-2, NgNBs 110-3, 110-4, and/or LTUs may each include multiple TPs (e.g. where each TP is associated with a distinct cell and/or uses a distinct antenna or distinct set of antenna elements).

Entities in the NG-RAN which receive and measure UL signals (e.g. an RS) transmitted by a target UE 105 for a particular location session are referred to generically as "Reception Points" (RPs) and can include one or more of the SgNB 110-1, CgNB 110-2 (if different to the SgNB 110-1), NgNBs 110-3, 110-4, and LMUs (not shown). In some cases, SgNB 110-1, CgNB 110-2, NgNBs 110-3, 110-4, and/or LMUs may each include multiple RPs (e.g. where each RP is associated with a distinct cell and/or uses a distinct antenna or distinct set of antenna elements).

It should be noted that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger or smaller number of SVs 190, gNBs 110, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), and IEEE 802.11 WiFi etc. For example, where a Wireless Local Area Network (WLAN), e.g., IEEE 802.11 radio interface, is used, the UE 105 may communicate with an Access Network (AN), as opposed to an NG-RAN, and accordingly, component 112 is sometimes referred to herein as an AN or as a Radio Access Network (RAN), denoted by the term "RAN," "(R)AN," or "(R)AN 112". In the case of an AN (e.g. IEEE 802.11 AN), the AN may be connected to a Non-3GPP Interworking Function (N3IWF) (e.g. in 5GCN 150) (not shown in FIG. 1), with the N3IWF connected to AMF 154.

The target UE 105, as used herein, may be any electronic device and may be referred to as a device, a mobile device, a wireless device, a mobile terminal, a terminal, a mobile station (MS), a Secure User Plane Location (SUPL) Enabled Terminal (SET), or by some other name The target UE 105 may be a standalone device or may be embedded in another device, e.g., a factory tool or a vehicle, that is to be monitored or tracked. Moreover, UE 105 may correspond to a smart watch, digital glasses, fitness monitor, smart car, smart appliance, cellphone, smartphone, laptop, tablet, PDA, tracking device, control device or some other portable or moveable device. The UE 105 may include a single entity or may include multiple entities such as in a personal area network where a user may employ audio, video and/or data I/O devices and/or body sensors and a separate wireline or wireless modem. Typically, though not necessarily, the UE 105 may support wireless communication using one or more Radio Access Technologies (RATs) such as GSM, Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 112 and 5GCN 150), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (e.g. via elements of 5GCN 150 not shown in FIG. 1, or possibly via a Gateway Mobile Location Center (GMLC) 155, and/or allow the external client 130 to receive location information regarding the UE 105 (e.g., via the GMLC 155).

The UE 105 may enter a connected state with a wireless communication network that may include the NG-RAN 112. In one example, the UE 105 may communicate with a cellular communication network by transmitting wireless signals to, or receiving wireless signals from a cellular transceiver, in the NG-RAN 112, such as a gNB 110. A transceiver provides user and control planes protocol terminations toward the UE 105 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 105 may have circuitry and processing resources capable of obtaining location related measurements. Location related measurements obtained by UE 105 may include measurements of signals received from SVs 190 belonging to a Satellite Positioning System (SPS) or Global Navigation Satellite System (GNSS) such as GPS, GLONASS, Galileo or Beidou and/or may include measurements of signals received from terrestrial transmitters fixed at known locations (e.g., such as gNBs 110). UE 105, CgNB 110-2 or a separate location server (e.g. LMF 152), to which UE 105 may send the measurements, may then obtain a location estimate for the UE 105 based on these location related measurements using any one of several position methods such as, for example, GNSS, Assisted GNSS (A-GNSS), Advanced Forward Link Trilateration (AFLT), Observed Time Difference Of Arrival (OTDOA), WLAN (also referred to as WiFi) positioning, Angle of Departure (AOD), Angle of Arrival (AOA), multi-cell Round Trip signal propagation Time (multi-RTT), or Enhanced Cell ID (ECID) or combinations thereof. In some of these techniques (e.g. A-GNSS, AFLT and OTDOA), pseudoranges or timing differences may be measured at UE 105 relative to three or more terrestrial transmitters (e.g. gNBs 110) fixed at known locations or relative to four or more SVs 190 with accurately known orbital data, or combinations thereof, based at least in part, on pilots, positioning reference signals (PRS) or other positioning related signals transmitted by the transmitters or satellites and received at the UE 105.

A CgNB 110-2, or a location server, such as the LMF 152, may be capable of providing positioning assistance data to UE 105 including, for example, information regarding signals to be measured (e.g., expected signal timing, signal coding, signal frequencies, signal Doppler), locations and identities of terrestrial transmitters (e.g. gNBs 110) and/or signal, timing and orbital information for GNSS SVs 190 to facilitate positioning techniques such as A-GNSS, AFLT, OTDOA, AOD, multi-RTT and ECID. The facilitation may include improving signal acquisition and measurement accuracy by UE 105 and, in some cases, enabling UE 105 to compute its estimated location based on the location measurements. For example, an LMC server, LLMF server, CgNB 110-2 or other location server (e.g. LMF 152) may comprise an almanac, also referred to as a base station almanac (BSA), which indicates locations and identities of cellular transceivers and/or local transceivers in a particular region or regions such as a particular venue, and may provide information descriptive of signals transmitted by a cellular base station or AP (e.g. a gNB 110) such as transmission power and signal timing. A UE 105 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), an angle of arrival (AOA), an angle of departure (AoD), a receive time-transmission time difference (Rx-Tx), or a round trip signal propagation time (RTT) between UE 105 and a cellular transceiver (e.g. a gNB 110) or a local transceiver (e.g. a WiFi access point (AP)). A UE 105 may transfer these measurements to an LMC server, LLMF server, CgNB 110-2, or to another location server, such as LMF 152, to determine a location for UE 105, or in some implementations, may use these measurements together with assistance data (e.g. terrestrial almanac data or GNSS satellite data such as GNSS Almanac and/or GNSS Ephemeris information) received from an LMC server, LLMF server, CgNB 110-2, or from another location server (e.g. LMF 152), or broadcast by a base station (e.g. a gNB 110) in NG-RAN 112, to determine a location for UE 105.

In the case of OTDOA, UE 105 may measure a Reference Signal Time Difference (RSTD) between signals such as a positioning reference signal (PRS), Cell specific Reference Signal (CRS), or Tracking Reference Signal (TRS) transmitted by nearby pairs of transceivers and base stations (e.g. gNBs 110). An RSTD measurement may provide the time of arrival difference between signals (e.g. TRS, CRS or PRS) received at UE 105 from two different transceivers. The UE 105 may return the measured RSTDs to an LMC server, LLMF server, CgNB 110-2, or to another location server (e.g. LMF 152), which may compute an estimated location for UE 105 based on known locations and known signal timing for the measured transceivers. In some implementations of OTDOA, the signals used for RSTD measurements (e.g. PRS or CRS signals) may be accurately synchronized by the transceivers to a common universal time such as GPS time or Coordinated Universal Time (UTC), e.g., using a GPS or GNSS receiver at each transceiver to accurately obtain the common universal time.

In some implementations, network based position methods may be used to locate a target UE 105. With these methods, entities in a network such as gNBs 110 and/or LMUs may measure UL signals transmitted by UE 105. The UL signals may include or comprise UL reference signals such as UL positioning reference signals (PRSs). The entities obtaining the location measurements (e.g. gNBs 110 and/or LMUs) may then transfer the location measurements to a location server (e.g. LMF 152 or CgNB 110-2), which may compute a location for the target UE 105. Examples of UL location measurements can include an RSSI, RSRP, RSRQ, TOA, Rx-Tx, AOA and RTT. An example of a network based position method may be an Uplink Time Difference of Arrival (UTDOA) method which may make use of TOA measurements obtained by gNBs 110 and/or LMUs whose timing is accurately synchronized or aligned with a common absolute time such as GPS time. Another example network based position method may be ECID which may make use of any of RSSI, RSRP, RSRQ, TOA, Rx-Tx, AOA and RTT measurements.

With a UE assisted position method, UE 105 may obtain location measurements (e.g. measurements of RSSI, Rx-Tx, RTT, RSTD, RSRP and/or RSRQ for gNBs 110, or measurements of GNSS pseudorange, code phase and/or carrier phase for SVs 190) and send the measurements to an entity performing a location server function, such as CgNB 110-2 or LMF 152 for computation of a location estimate for UE 105. With a UE based position method, UE 105 may obtain location measurements (e.g. which may be the same as or similar to location measurements for a UE assisted position method) and may additionally compute a location of UE 105 (e.g. with the help of assistance data received by point to point means from a location server such as LMF 152 or CgNB 110-2 or broadcast by a gNB 110).

An estimate of a location of the UE 105 may be referred to as a location, location estimate, location fix, fix, position, position estimate or position fix, and may be geographic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. The location may be expressed as an absolute location estimate for the UE 105, such as location coordinates or address, or as a relative location estimate for the UE 105, such as a distance and direction from a previous location estimate or from a known absolute location. The location of the UE 105 may include a linear velocity, an angular velocity, a linear acceleration, an angular acceleration, an angular orientation for the UE 105, e.g., the orientation of the UE 105 relative to a fixed global or local coordinate system, an identification of a trigger event for locating the UE 105, or some combination of these. For example, trigger events may include an area event, a motion event or a velocity event. An area event, for example, may be the UE 105 moving into a defined area, moving out of the area and/or remaining in the area. A motion event, for example, may include movement of the UE 105 by a threshold straight line distance or threshold distance along a UE trajectory. A velocity event, for example, may include the UE 105 attaining a minimum or maximum velocity, a threshold increase and/or decrease of velocity, and/or a threshold change in direction. In the description contained herein, the use of the term location may comprise any of these variants unless indicated otherwise. When computing the location of a UE 105, it is common to solve for local x, y, and possibly z coordinates and then, if needed, convert the local coordinates into absolute ones (e.g. for latitude, longitude and altitude above or below mean sea level).

As shown in FIG. 1, pairs of gNBs 110 in NG-RAN 112 may be connected to one another, e.g., directly as shown in FIG. 1 or indirectly via other gNBs 110. Access to the 5G network is provided to UE 105 via wireless communication between the UE 105 and one or more of the gNBs 110, which may provide wireless communication access to the 5GCN 150 on behalf of the UE 105 using 5G (e.g. NR). In FIG. 1, the serving gNB for UE 105 (SgNB) is assumed to be gNB 110-1, although other gNBs (e.g. gNB 110-2 and/or gNB 110-3) may act as a serving gNB if UE 105 moves to another location or may act as a secondary gNB to provide additional throughput and bandwidth to UE 105. Some gNBs 110 in FIG. 1 (e.g. gNB 110-3 or gNB 110-4) may be configured to function as positioning-only beacons (referred to here as LTUs) which may transmit signals (e.g. directional PRS) to assist positioning of UE 105 but may not receive signals from UE 105 or from other UEs.

As noted, while FIG. 1 depicts nodes configured to communicate according to 5G communication protocols, nodes configured to communicate according to other communication protocols, such as, for example, the LTE protocol, may be used. Such nodes, configured to communicate using different protocols, may be controlled, at least in part, by the 5GCN 150. Thus, the NG-RAN 112 may include any combination of gNBs, evolved Node Bs (eNBs), or other types of base stations or access points. As an example, NG-RAN 112 may include one or more next generation eNBs (ng-eNBs), not shown, which provide LTE wireless access to UE 105 and may connect to entities in 5GCN 150 such as AMF 154.

The gNBs 110 and/or the ng-eNB can communicate with the Access and Mobility Management Function (AMF) 154, which, for positioning functionality, may communicate with a Location Management Function (LMF) 152. The AMF 154 may support mobility of the UE 105, including cell change and handover and may participate in supporting a signaling connection to the UE 105 and possibly helping establish and release Protocol Data Unit (PDU) sessions for UE 105 supported by the UPF 151. Other functions of AMF 154 may include: termination of a control plane (CP) interface from NG-RAN 112; termination of Non-Access Stratum (NAS) signaling connections from UEs such as UE 105, NAS ciphering and integrity protection; registration management; connection management; reachability management; mobility management; access authentication and authorization.

The CgNB 110-2 (e.g. a CgNB 110-2 which includes an LMC or LLMF or comprises an LMC server or LLMF server) or LMF 152 may support positioning of the UE 105 when UE 105 accesses the NG-RAN 112 and may support position procedures/methods such as Assisted GNSS (A-GNSS), Observed Time Difference of Arrival (OTDOA), Real Time Kinematic (RTK), Precise Point Positioning (PPP), Differential GNSS (DGNSS), Enhanced Cell ID (ECID), angle of arrival (AOA), angle of departure (AOD), multi-RTT, WLAN positioning, UTDOA, and/or other position methods. The CgNB 110-2 or LMF 152 may also process location service requests for the UE 105, e.g., received directly or indirectly from the GMLC 155 or NEF 159. In some embodiments, a node/system that implements the LMF 152 may additionally or alternatively implement other types of location-support modules, such as an Enhanced Serving Mobile Location Center (E-SMLC) or a Secure User Plane Location (SUPL) Location Platform (SLP). It will be noted that in some embodiments, at least part of the positioning functionality (including derivation of UE 105's location) may be performed at the UE 105 (e.g., using signal measurements for signals transmitted by wireless nodes, and assistance data provided to the UE 105).

The GMLC 155 may support a location request for the UE 105 received from an external client 130 and may forward such a location request to a serving AMF 154 for UE 105. The AMF 154 may then forward the location request to LMF 152 which may obtain one or more location estimates for UE 105 (e.g. according to the request from external client 130) and may return the location estimate(s) to AMF 154, which may return the location estimate(s) to external client 130 via GMLC 155. GMLC 155 may contain subscription information for an external client 130 and may authenticate and authorize a location request for UE 105 from external client 130. GMLC 155 may further initiate a location session for UE 105 by sending a location request for UE 105 to AMF 154 and may include in the location request an identity for UE 105 and the type of location being requested (e.g. such as a current location or a sequence of periodic or triggered locations).

The AMF 154 and the gNBs 110 may communicate using a New Radio Position Protocol A (which may be referred to as NPPa or NRPPa). NRPPa may be defined in 3GPP TS 38.455 and may be the same as, similar to, or an extension of the LTE Positioning Protocol A (LPPa) defined in 3GPP TS 36.455, with NRPPa messages being transferred between the gNBs 110 and the AMF 154. Further, the AMF 154 and UE 105 may communicate using the LTE Positioning Protocol (LPP) defined in 3GPP Technical Specification (TS) 36.355 or TS 37.355, where LPP messages are transferred between the UE 105 and the serving AMF 154 via the serving gNB 110-1 for UE 105. For example, LPP messages may be transferred between the AMF 154 and the UE 105 using a 5G Non-Access Stratum (NAS) protocol. The LPP protocol may be used to support positioning of UE 105 using UE assisted and/or UE based position methods such as Assisted GNSS (A-GNSS), Real Time Kinematic (RTK), Wireless Local Area Network (WLAN), Observed Time Difference of Arrival (OTDOA), AOD, AOA, multi-RTT, and/or Enhanced Cell Identity (ECID). The NRPPa protocol may be used to support positioning of UE 105 using network based and network assisted position methods such as ECID and multi-RTT (e.g. when used with measurements obtained by a gNB 110 or received from a gNB 110 from UE 105) and/or may be used by LMF 152 to obtain location related information from gNBs 110 such as parameters defining positioning reference signal (PRS) transmission from gNBs 110 for support of OTDOA, AOD and multi-RTT.

GNBs 110 may communicate with AMF 154 using a Next Generation Application Protocol (NGAP), e.g. as defined in 3GPP TS 38.413. NGAP may enable AMF 154 to request a location of a target UE 105 from an SgNB 110-1 for target UE 105 and may enable SgNB 110-1 to return a location for UE 105 to the AMF 154.

GNBs 110 may communicate with one another using an Xn Application Protocol (XnAP), e.g. as defined in 3GPP TS 38.423. XnAP may allow one gNB 110 to request another gNB 110 to obtain UL location measurements for a target UE 105 and to return the UL location measurements. XnAP may also enable a gNB 110 to request another gNB 110 to transmit a downlink (DL) RS or PRS to enable a target UE 105 to obtain DL location measurements of the transmitted DL RS or PRS. In some implementations, XnAP may be used to transport location related messages belonging to a higher protocol level (e.g. NRPPa) between gNBs 110 to request UL location measurements and/or transmission of DL RS or PRS signals, in which case XnAP may only be used as a transport protocol between pairs of gNBs 110.

A gNB (e.g. SgNB 110-1) may communicate with a target UE 105 using a Radio Resource Control (RRC) protocol, e.g. as defined in 3GPP TS 38.331. RRC may allow a gNB 110 (e.g. SgNB 110-1) to request location measurements from the target UE 105 of DL RSs or DL PRSs transmitted by the gNB 110 and/or by other gNBs 110 and to return the location measurements. RRC may also enable a gNB 110 (e.g. SgNB 110-1) to request the target UE 105 to transmit an UL RS or PRS to enable the gNB 110 or other gNBs 110 to obtain UL location measurements of the transmitted UL RS or PRS. A gNB (e.g. SgNB 110-1) may further communicate with a target UE 105 using lower protocol levels, e.g., layer 1 (L1) and/or layer 2 (L2) protocol levels, which may be used by the UE 105 to return location measurements. RRC may also be used to transport one or more LPP messages between a UE 105 and SgNB 110-1, where the one or more LPP messages rather than RRC are used to request location measurements from the target UE 105 and/or to request the target UE 105 to transmit an UL RS or PRS.

Information provided by the gNBs 110 to the LMF 152 using NRPPa or to the CgNB 110-2 using XnAP and/or NRPPa may include timing and configuration information for PRS transmission and location coordinates of the gNBs 110. The LMF 152 or CgNB 110-2 can then provide some or all of this information to the UE 105 as assistance data in an LPP message in the case of LMF 152 or in an RRC and/or LPP message in the case of CgNB 110-2. For example, an RRC message sent from CgNB 110-2 to UE 105 (e.g. via SgNB 110-1) may include an embedded LPP message in some implementations.

An RRC and/or LPP message sent from the CgNB 110-2 (e.g. via SgNB 110-1) to the UE 105 or an LPP message sent from LMF 152 to UE 105 may instruct the UE 105 to do any of a variety of things, depending on desired functionality. For example, the LPP and/or RRC message could contain an instruction for the UE 105 to obtain measurements for GNSS (or A-GNSS), WLAN, AOD, multi-RTT and/or OTDOA (or some other position method). In the case of OTDOA, the LPP or RRC message may instruct the UE 105 to obtain one or more measurements (e.g. RSTD measurements) of PRS signals transmitted within particular cells supported by particular gNBs 110 (or supported by one or more ng-eNBs or eNBs). The UE 105 may send the measurements back to the CgNB 110-2 or LMF 152 in an RRC and/or LPP message.

In some embodiments, LPP may be augmented by or replaced by an NR or NG positioning protocol (NPP or NRPP) which supports position methods such as OTDOA, multi-RTT and ECID for NR radio access. For example, an LPP message may contain an embedded NPP message or may be replaced by an NPP message.

A gNB 110 in NG-RAN 112 may also broadcast positioning assistance data to UEs such as UE 105.

As illustrated in FIG. 1, a Unified Data Management (UDM) 156 may be connected to the GMLC 155. The UDM 156 is analogous to a Home Subscriber Server (HSS) for LTE access, and if desired, the UDM 156 may be combined with an HSS. The UDM 156 is a central database that contains user-related and subscription-related information for UE 105 and may perform the following functions: UE authentication, UE identification, access authorization, registration and mobility management, subscription management and Short Message Service management.

To support services including location services from external clients 130 for Internet of Things (IoT) UEs, a Network Exposure Function (NEF) 159 may be included in 5GCN 150. An NEF may also be referred to as a Service Capability Exposure Function (SCEF), e.g. for a UE 105 with LTE access to an EPC rather than 5G NR radio access to 5GCN 150. The NEF 159 may support secure exposure of capabilities and events concerning 5GCN 150 and UE 105 to an external client 130 (which may then be referred to as an Application Function (AF)) and may enable secure provision of information from external client 130 to 5GCN 150. In the context of location services, NEF 159 may function to obtain a current or last known location for a UE 105, may obtain an indication of a change in location for a UE 105, or an indication of when a UE 105 becomes available (or reachable). An external client 130 may access NEF 159 directly or may access a Services Capability Server (SCS, not shown in FIG. 1), which may access NEF 159 on behalf of external client 130 in order to provide location information to the external client 130 for UE 105 via the SCS. The NEF 159 may be connected to the GMLC 155 to support last known location, current location and/or deferred periodic and triggered location for the UE 105. If desired, the NEF 159 may include, or may be combined with, the GMLC 155.

The User Plane Function (UPF) 151 may support voice and data bearers for UE 105 and may enable UE 105 voice and data access to other networks such as the Internet. UPF 151 functions may include: external PDU session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering.

FIG. 2 illustrates a communication system 200 that is similar to the communication system 100 shown in FIG. 1, but supports location for a roaming UE 105. In the communication system 200, the core network 5GCN 150V that is in communication with the UE 105 via the NG-RAN 112 is part of a visited network, i.e., Visited Public Land Mobile Network (VPLMN), which is in communication with a home network 5GCN 150H, which is part of Home Public Land Mobile Network (HPLMN). In communication system 200, the VPLMN 5GCN 150V includes the AMF 154 in communication with the LMF 152. The AMF 154 is also in communication with the UDM 156, e.g., in the HPLMN 5GCN 150H. The VPLMN 5GCN 150V also includes a Visited Gateway Mobile Location Center (VGMLC) 155V, which is similar to the GMLC 155 in the non-roaming communication system 100 of FIG. 1, and is designated as 155V to indicate that it is located in the visited network for UE 105. As illustrated in FIG. 2, the VGMLC 155V connects to the AMF 154 in the VPLMN 5GCN 150V.

As illustrated, HPLMN 5GCN 150H may include a Home GMLC (HGMLC) 155H that may be connected to the VGMLC 155V (e.g., via the Internet). The HGMLC 155H may be similar to the GMLC 155 in the non-roaming communication system of FIG. 1, and is designated as 155H to indicate that it located in the home network for UE 105. The VGMLC 155V and HGMLC 155H may be sometimes collectively and generically referred to herein as GMLC 155. The HGMLC 155H is in communication with the external client 130, as well as the UDM 156 in the HPLMN 150H. The HGMLC 155H may provide location access to UE 105 on behalf of external clients such as external client 130.

The HPLMN 5GCN 150H may also include the NEF 159 which may be connected to HGMLC 155H. One or more of HGMLC 155H and NEF 159 may be connected to external client 130, e.g., through another network, such as the Internet. In some cases, a Requesting GMLC (RGMLC) located in another PLMN (not shown in FIG. 2) may be connected to HGMLC 155H (e.g., via the Internet) in order to provide location access to UE 105 on behalf of external clients connected to the RGMLC.

As further illustrated, HPLMN 5GCN 150H may include a Home UPF 151H that may be connected to a Visited UPF 151V in the VPLMN 5GCN 150V (e.g., via the Internet). The UPFs 151H and 151V may be similar to the UPF 151 in the non-roaming communication system of FIG. 1, and are designated as 151H and 151V to indicate, respectively, location in the home network and visited network for UE 105. The UPF 151H may also communicate with the external client 130 directly or through the UPA 153, if present.

FIGS. 1 and 2 also illustrate at a high level via the bold arrows how a location session may be established and how location reporting may be supported in the case that CgNB 110-2 is used. To establish (or to cancel) a location session for a target UE 105, a control plane signaling path may be used as shown by the bold arrows 161 and 261. With a control plane (CP) path, control plane procedures are used in which an external client 130 sends a location request to a GMLC 155 (or HGMLC 155H when roaming) or to an NEF 159, which forwards the location request to a serving AMF 154 for the target UE 105 (e.g. via VGMLC 155V in the case of a roaming target UE 105). The serving AMF 154 then forwards the location request to an SgNB 110-1 for the target UE 105 which either acts as the CgNB for the location session or forwards the location request to a separate CgNB 110-2. FIGS. 1 and 2 only show the location establishment via the GMLC 155 or HGMLC 155H and VGMLC 155V and not via the NEF 159. For location reporting, a user plane signaling path may be used as shown by the bold arrows 162, 163, 262 and 263. With a user plane signaling path, the CgNB 110-2 may send location reports to the external client 130 through a UPF 151 (or UPF 151V and UPF 151H if the target UE 105 is roaming) via either a user plane connection between the CgNB 110-2 and the external client 130 when a UPA 153 is not used, or a user plane connection between the CgNB 110-2 and the UPA 153 and a second user plane connection between the UPA 153 and the external client 130 when a UPA 153 is used. The UPF 151 may support a Protocol Data Unit (PDU) session to CgNB 110-2 (but not in this case to UE 105), which may enable IP (and possibly Local Area Network (LAN)) access from CgNB 110-2 to external networks and entities such as external client 130. The user plane connections can use ciphering and mutual authentication when the two endpoints are not in the same trust domain. This would typically occur for a user plane connection between the CgNB 110-2 and the external client 130, between the CgNB 110-2 and the UPA 153 when the UPA 153 is outside the 5GCN 150, or between the UPA 153 and the external client 130 when the UPA 153 is inside the 5GCN 150.

For location reporting via a user plane from the UE 105, no restrictions on the target UE 105 mobility state may be needed. For location reporting via a user plane from a CgNB 110-2, the UE 105 may need to remain in a Connection Management (CM) Connected state and in an RRC Connected state or an RRC Inactive state in order for the UE 105 to always have an SgNB 110-1. If the target UE 105 were to transition into a CM Idle state, the CgNB 110-2 might not be able to access the target UE 105 (e.g. to reconfigure DL location measurements or transmission of UL signals by the target UE 105) and may not know which gNBs 110 and LMUs to configure to obtain UL location measurements. The target UE 105 can be kept in CM Connected state if the serving AMF 154 for the target UE 105 remains aware of the positioning session and avoids placing the target UE 105 in CM Idle state.

Figure 3:
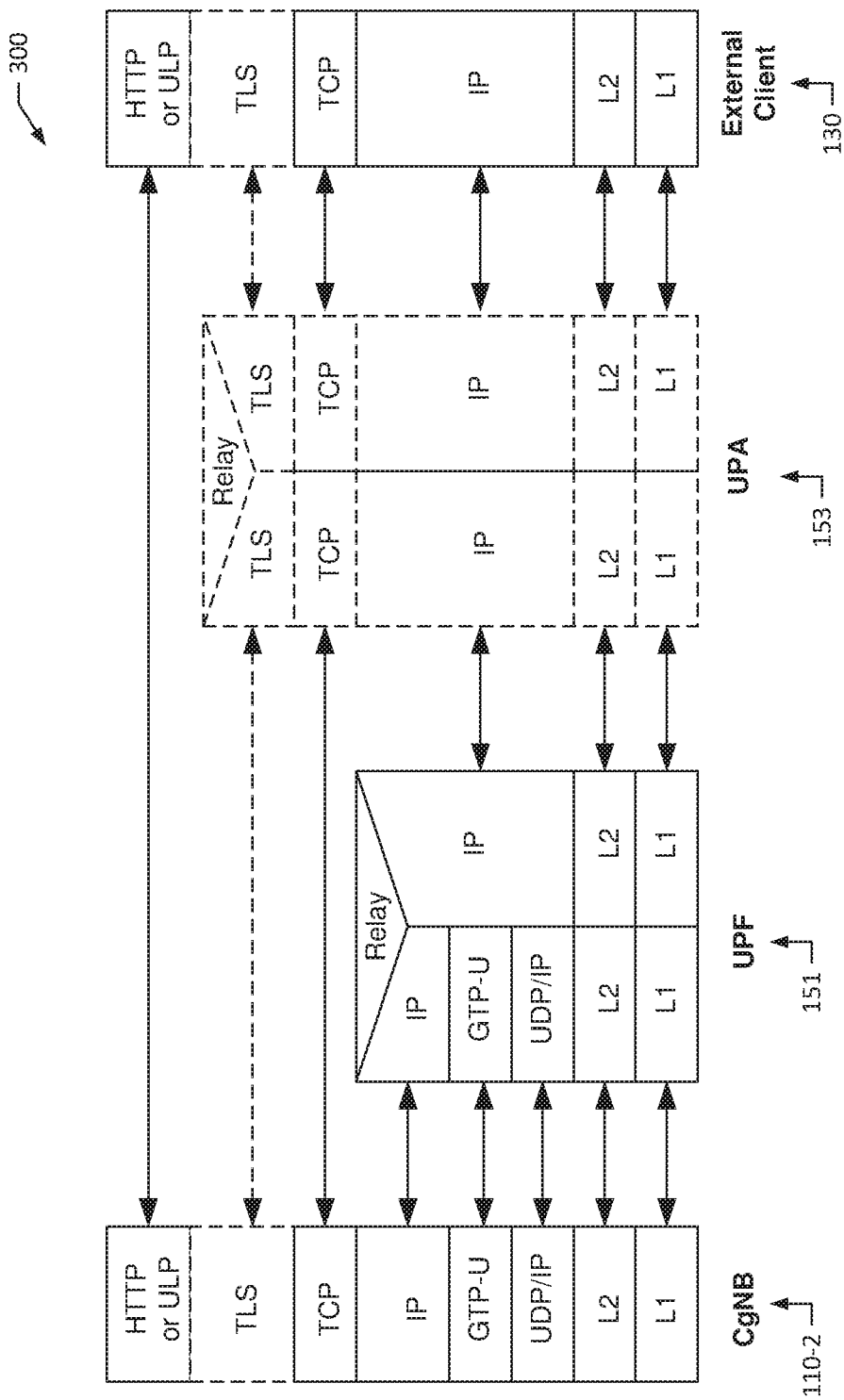
FIG. 3 is a representation of protocol layering which may be used when a controlling entity in the Radio Access Network (RAN) is present and transfers location reports for the target UE to an external client.

FIG. 3 shows protocol layering 300 which may be used when a CgNB 110-2 is present and transfers location reports for the target UE 105 to the external client 130. Protocol layering between the CgNB 110-2 and UPF 151 corresponds to that defined for an N2 reference point between NG-RAN 112 and a 5GCN 150 (e.g. as defined in 3GPP TS 38.300 and TS 23.501) with the difference that the CgNB 110-2 also supports the Internet Protocol (IP) layer. When a UPA 153 is not present, protocol layering between the UPF 151 and external client 130 corresponds to that supported by a UPF 151 to any other external data entity. At the upper levels, the CgNB 110-2 and external client 130 support the Transmission Control Protocol (TCP), optionally Transport Layer Security (TLS) and either the HyperText Transfer Protocol (HTTP) (e.g. HTTP/2) or the UserPlane Location Protocol (ULP) defined by the Open Mobile Alliance for the Secure User Plane Location (SUPL) solution. When a UPA 153 is present, the UPA 153 intercepts the IP, TCP and (when present) TLS layers and relays HTTP or ULP messages between the CgNB 110-2 and external client 130. An advantage of ULP may be existing support in ULP for transferring location information for a target UE 105 (e.g. a location estimate) and support of authentication and ciphering using TLS. An advantage of HTTP may be low implementation impact and widespread support by external clients 130.

The protocol layering shown in FIG. 3 allows the CgNB 110-2 to transfer HTTP or ULP messages containing location reports for the target UE 105 to the external client 130. TLS may be used to enable mutual authentication and support ciphering. TCP is used to provide reliable transfer. Since a gNB 110 may already support the GPRS Tunneling Protocol for user plane access (GTP-U), User Datagram Protocol with IP (UDP/IP) and Layers 1 and 2 (L1 and L2) towards the UPF 151, the new impacts are to add IP, TCP, optionally TLS and either HTTP or ULP. If a UPA 153 is present inside the 5GCN 150, TLS support may not be needed by the CgNB 110-2.

In some alternative implementations, HTTP or ULP in FIG. 3 could be replaced by a different protocol such as Simple Mail Transfer Protocol (SMTP) or Simple Object Access Protocol (SOAP), and IP could be replaced by, or be augmented with, a Local Area Network (LAN) protocol if the external client is accessed via a LAN.

There may be one TCP connection and one optional corresponding TLS session between the CgNB 110-2 and the external client 130 or UPA 153 for each target UE being located. Alternatively, one TCP connection and one optional corresponding TLS session may be shared among multiple UEs by being used to support location reporting for some or all target UEs for which location reports need to be sent by a CgNB 110-2 to an external client 130 or UPA 153. Location reports sent at the HTTP or ULP (or other equivalent) protocol level may include an identity or reference for the target UE 105 (e.g. a Generic Public Subscription Identifier (GPSI) or a Subscription Permanent Identifier (SUPI)), an identity or address for the external client 130 (e.g. when location reports are sent via a UPA 153), a location session reference or identifier and location related information being reported.

Figure 4:
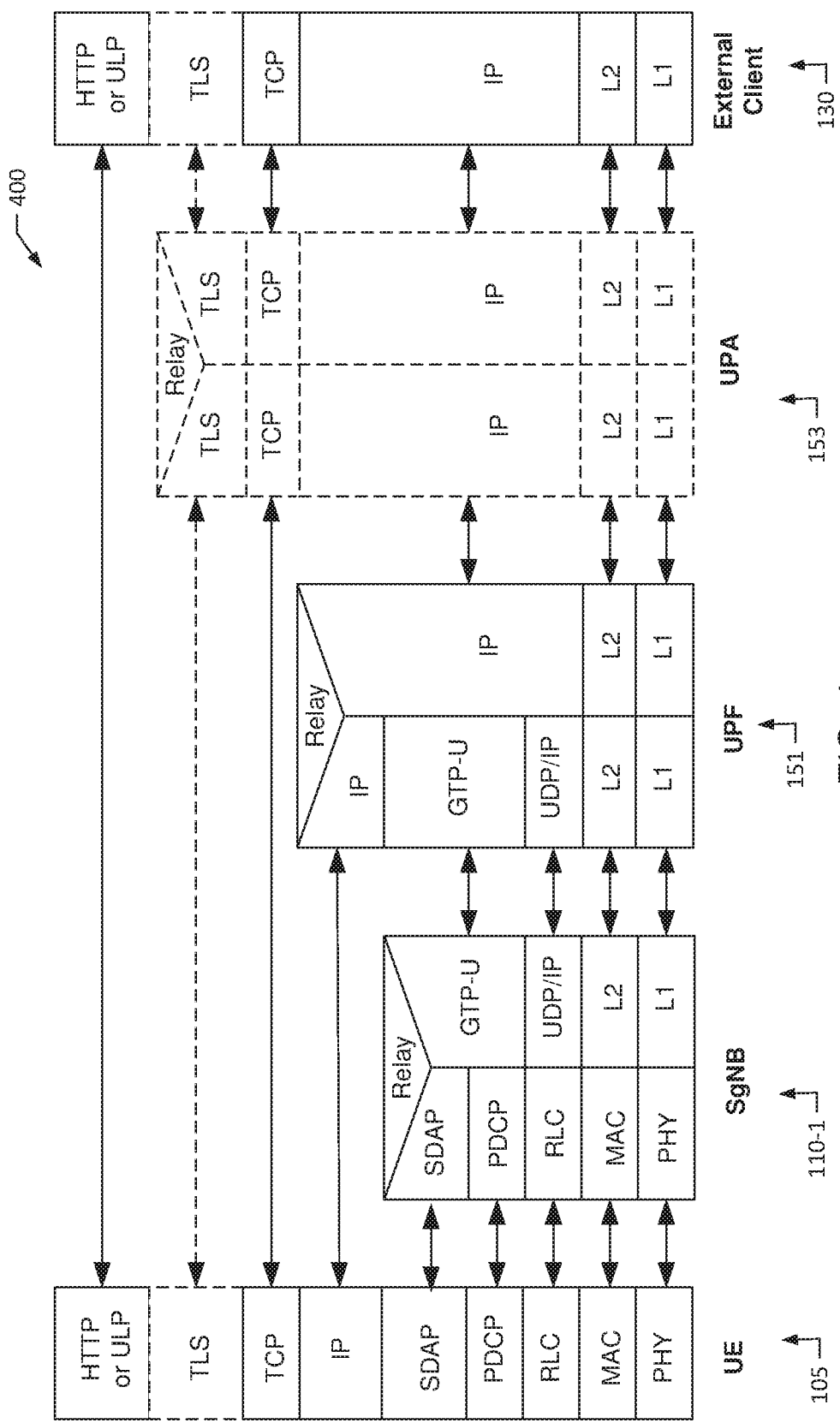
FIG. 4 is a representation of protocol layering which may be used when a target UE transfers location reports for the target UE to an external client.

FIG. 4 shows protocol layering 400 which may be used when the target UE 105 transfers location reports to the external client 130 via user plane signaling. The protocol layering is similar to that in FIG. 3 with the UE 105 sending location reports to the external client 130 using IP, TCP, optionally TLS and either HTTP (e.g. HTTP/2) or ULP. The UPA 153 is again optional and when present avoids the need for a separate TCP connection and TLS session between the external client 130 and each target UE 105 being located. To send location reports as far as the UPF 151, the UE 105 may use a PDU session between the UE 105 and UPF 151 using protocols defined by 3GPP for this purpose, including an NR physical layer (PHY), a Medium Access Control (MAC) protocol, a Radio Link Control (RLC) protocol, a Packet Data Convergence Protocol (PDCP), a Service Data Protocol (SDAP), GTP-U and UDP/IP. An advantage of using ULP in FIG. 4 can be widespread existing support of ULP in many UEs 105 to support the OMA SUPL location solution. Adapting ULP support in a UE 105 to enable a combined control plane and user plane location solution as described herein may then have low UE 105 implementation impact.

Information, referred to here as "location context information", may be needed in participating entities (e.g. UE 105 and gNBs 110) to support transmission of UL and DL RSs, obtain UL and DL location measurements, transfer location measurements to a CgNB 110-2 (when used), and/or to deliver location reports to the external client 130.

For location reporting for one target UE 105 using a CgNB 110-2, Table 1 summarizes location context information which may be stored in each type of entity and events which may create, update or delete this information.

TABLE 1

| Entity | Stored Location Context Information | Creation, Update, Deletion |
|---|---|---|
| CgNB | Information from an original location request for the target UE<br>Identities and/or addresses of participating RPs, TPs, SgNB (if different to the CgNB), target UE and external client<br>Security information for an external client (e.g. cipher key(s))<br>Location session reference<br>Location session identifier<br>UL location measurements configured by the CgNB in each RP<br>DL RS transmission configured by the CgNB in each TP<br>DL location measurements and UL RS transmission configured by the CgNB in the target UE<br>Recently determined UE location information<br>Recently received UL and/or DL location measurements<br>Statistics on location reporting (e.g. current duration and number of location reports sent so far) | Created after receiving a location request for the target UE (e.g. from an AMF or SgNB)<br>Updated after configuring location measurements in RPs or the target UE, configuring UL or DL RS in TPs or the target UE, or after receiving responses from RPs, TPs or the target UE<br>Updated after handover or cell change of the target UE when the CgNB is not changed<br>Deleted in an old CgNB after handover or cell change of the target UE with change of CgNB<br>Created in a new CgNB after handover or cell change of the target UE with change of CgNB and based on a location context received from the old CgNB |
| SgNB | Information from an original location request for the target UE<br>Address of the CgNB (if different to the SgNB)<br>Location session identifier | Created after receiving a location request for the target UE (e.g. from an AMF)<br>Deleted in an old SgNB after handover or cell change of the target UE to a new SgNB<br>Created in a new SgNB after handover or cell change of the target UE and based on a location context received from the old SgNB |
| RP | Identity or address of the CgNB<br>Location session identifier<br>UL location measurements configured by the CgNB<br>Identity of the target UE if needed for the UL location measurements | Created after configuration of UL location measurements in the RP by the CgNB<br>Updated after reconfiguration of UL location measurements in the RP by the CgNB or by a new CgNB |
| TP | Location session identifier<br>DL RS transmission configured by the CgNB | Created after configuration of DL RS transmission in the TP by the CgNB<br>Updated after reconfiguration of DL RS transmission in the TP by the CgNB or by a new CgNB |
| Target UE | Location session identifier<br>DL location measurements configured by the CgNB<br>UL RS transmission configured by the CgNB | Created after configuration of DL location measurements and/or UL RS transmission in the target UE by the CgNB<br>Updated after reconfiguration of DL location measurements and/or UL RS transmission in the target UE by the CgNB or by a new CgNB |

A location session identifier (e.g. as shown in Table 1) may be used to identify a location request for a target UE 105 and an associated location session which is used by a CgNB 110-2 to support the location request. The location session identifier may also be used to associate signaling messages and location measurements with the location session. In the case of UL location measurements, RPs may send UL location measurements to the CgNB 110-2 and may include the location session identifier in each message used to convey the UL location measurements to allow the CgNB 110-2 to associate each message with the location session. In the case of DL location measurements, the target UE 105 may send DL location measurements to the current SgNB 110-1 and may include the location session identifier in each message (e.g. each RRC message) used to convey the DL location measurements. Based on the CgNB 110-2 address and the location session identifier stored in the SgNB 110-1, the SgNB 110-1 may then forward the DL location measurements to the CgNB 110-2 if different from the SgNB 110-1. Thus, the target UE 105 does not need to be aware of an address or an identity for the CgNB 110-2, which can allow handover and cell change of the target UE 105 without the need to update the target UE 105 with the address or identity of a new CgNB.

Figure 5:
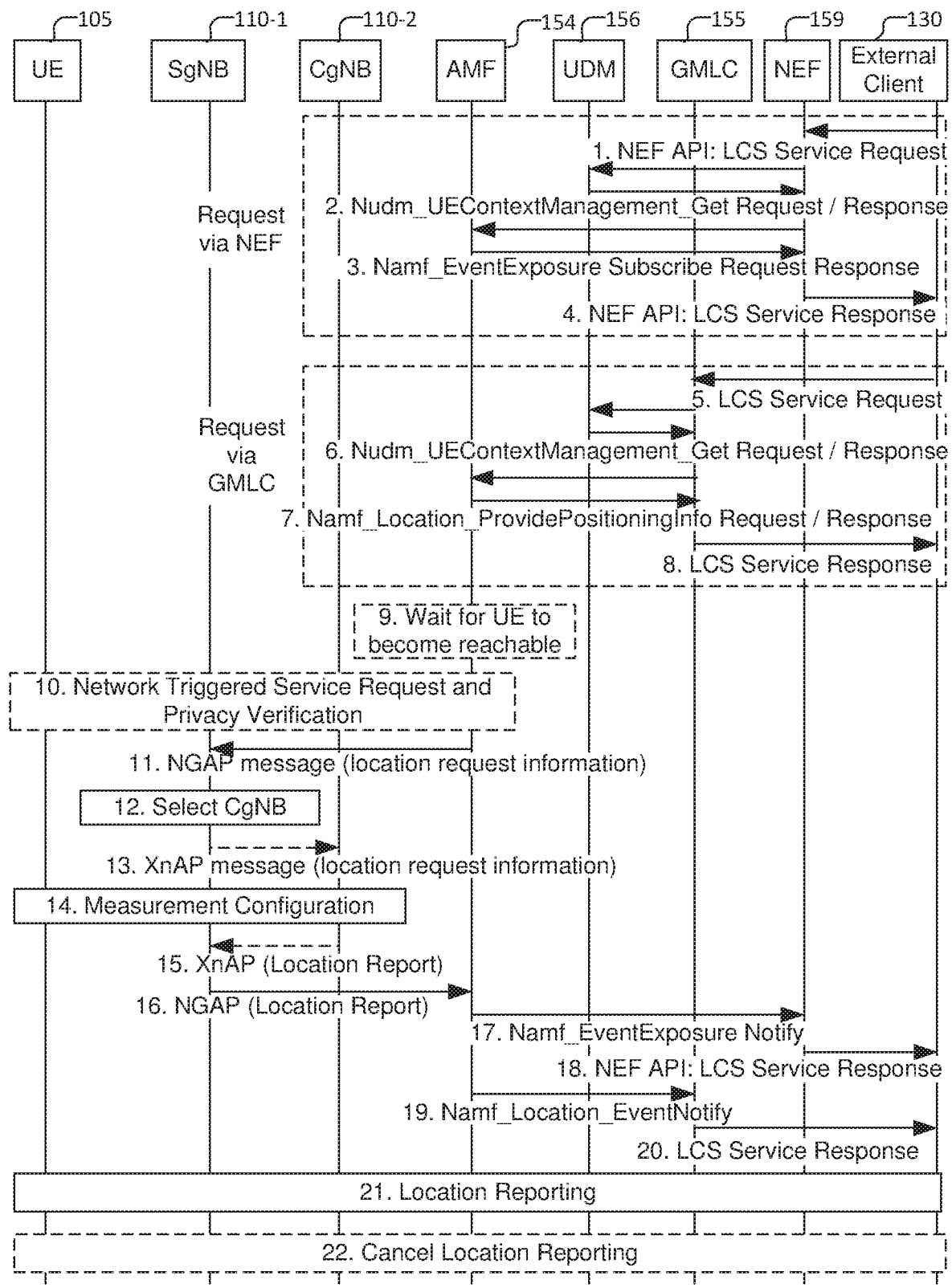
FIG. 5 shows a location session establishment and reporting procedure to support a VLLLS that is applicable for a controlling entity in a RAN.

FIG. 5 shows a location session establishment and reporting procedure to support a VLLLS that is applicable to use of a CgNB 110-2. The procedure shows in detail how location reporting via user plane signaling can be requested by an external client 130 and configured in participating entities. The procedure applies to a non-roaming target UE 105 as communication system 100 in FIG. 1.

As illustrated in FIG. 5, the external client 130 may send a location request for the target UE 105 to either an NEF 159 (Request via NEF) or a GMLC 155 (Request via GMLC) in the 5GCN. For a request via an NEF 159, stages 1-4 are performed and stages 5-8 are omitted. For a request via a GMLC 155, stages 1-4 are omitted and stages 5-8 are performed. For a request via an NEF 159, a location request sent to the NEF 159 at stage 1 may include: (i) an identity of the target UE 105 (e.g. a GPSI or SUPI); (ii) criteria for sending back location reports at stage 21 (e.g. location report trigger events such as an area event trigger or a UE motion trigger or parameters for periodic sending of location reports); (iii) Quality of Service (QoS) parameters such as a required location accuracy, location reporting latency and location reporting reliability; (iv) a minimum and/or a maximum location reporting interval; (v) criteria for starting and stopping location reporting (e.g. a start time, stop time, maximum number of reports, maximum duration of reporting); (vi) location reporting content (e.g. supported Geographic Area Description (GAD) shapes and whether UE velocity and/or UE orientation should be reported); (vii) an identification of the external client (e.g. a client name, Fully Qualified Domain Name (FQDN) or IP address); and/or (viii) a location session reference (e.g. a number or an alphanumeric sequence) to be used later to identify location reports at stage 21. The location request at stage 1 may also include a request to send location reports (e.g. at stage 21) via a user plane and an address to which location reports should be sent via the user plane (e.g. an IP address, Uniform Resource Identifier (URI) or FQDN) and security information. The security information may include a ciphering and/or authentication key (or keys) and an identification for the external client which may be usable to establish a TLS session between a CgNB 110-2 and the external client as described later. The security information may not be present or may be ignored by the NEF 159 when location reporting at stage 21 uses a UPA 153. As part of stage 1, the NEF 159 may authenticate the external client 130 and verify the external client 130 is authorized to locate the target UE 105. For example, the NEF 159 may verify privacy requirements for the target UE 105 (e.g. by requesting privacy requirements for the target UE 105 stored in the UDM 156) and that the privacy requirements allow the target UE 105 to be located by the external client 130.

At stage 2 in FIG. 5, if the NEF 159 is not aware of the serving AMF 154 for the target UE 105, the NEF 159 may query a UDM 156 for the address of the serving AMF 154 by invoking an Nudm_UEContextManagement_Get service operation. The UDM 156 then returns the serving AMF address.

At stage 3, the NEF 159 forwards the location request received at stage 1 to the serving AMF 154 for the target UE 105 by invoking an Namf_EventExposure Subscribe service operation. The forwarded location request may contain some or all of the information that was included in stage 1. The serving AMF 154 may return a response to the NEF 159 confirming acceptance of the location request.

It is noted that in a variant of the procedure, the NEF 159 may send the location request to the serving AMF 154 via the UDM 156 (not shown in FIG. 5), in which case stage 2 is not performed.

At stage 4, the NEF 159 may return a first response to the external client 130 confirming that the location request sent in stage 1 was accepted by the network.

It is noted that in a variant of the procedure (not shown in FIG. 5), the NEF 159 may forward the location request to the GMLC 155 after stage 1, in which case the GMLC 155 may perform stages 6 and 7 and return a location response to the NEF 159. In this variant, stages 2 and 3 are not performed.

At stage 5, for a request via a GMLC, the location request may include the same information or similar information to that described in stage 1 for a location request via an NEF 159. As part of stage 5, the GMLC 155 may authenticate the external client 130 and verify the external client 130 is authorized to locate the target UE 105 (e.g. as described for the NEF 159 in stage 1).

At stage 6, if the GMLC 155 is not aware of the serving AMF 154 for the target UE 105, the GMLC 155 may query a UDM 156 for the address of the serving AMF 154 by invoking a Nudm_UEContextManagement_Get service operation. The UDM 156 then returns the serving AMF 154 address.

At stage 7, the GMLC 155 forwards the location request received at stage 5 to the serving AMF 154 for the target UE by invoking an Namf_Location_ProvidePositioningInfo service operation. The forwarded location request may contain some or all of the information that was included in stage 5. The serving AMF 154 may return a response to the GMLC 155 confirming acceptance of the location request.

At stage 8, the GMLC 155 may return a first response to the external client 130 confirming that the location request sent in stage 5 was accepted by the network.

At stage 9 (which applies to a location request via either an NEF or GMLC), the serving AMF 154 waits for the target UE to become reachable (e.g. if the target UE 105 is not initially reachable due to use of Discontinuous Reception (DRX) or Power Saving Mode (PSM)).

At stage 10, if the target UE 105 is not in CM connected state (e.g. does not have an SgNB 110-1), the serving AMF 154 performs a network triggered service request to place the target UE in CM connected state. Once the UE is in CM connected state, the serving AMF 154 may verify target UE privacy by sending a message to the target UE 105 (e.g. a supplementary services message) indicating the requested location of the target UE 105 and possibly identifying the external client 130. The target UE 105 (e.g. after notifying and obtaining a response from a user for the target UE 105) may return a response to the serving AMF 154 indicating whether or not the location request is allowed. If the location request is not allowed, the serving AMF 154 may return a response to the external client 130 as at stages 17-20 indicating that the location request was not accepted by the target UE 105 and the rest of the procedure may be omitted.

At stage 11, the serving AMF 154 determines to use a location service capability in the NG-RAN 112 rather than an LMF 152. This determination may be configured in the serving AMF 154 for all target UEs (e.g. if the 5GCN does not contain an LMF) or may be based on the type of location request received at stage 3 or stage 7 (e.g. may be based on a location request that includes a QoS specifying low latency, such as a latency of 2 seconds or less and/or a location request which specifies location reporting via a user plane). The serving AMF 154 then sends an NGAP message to the SgNB 110-1 for the target UE 105. The NGAP message may include "location request information" that comprises some or all of the information in the location request received by the serving AMF 154 at stage 3 or stage 7. In some implementations, the NGAP message may include a message for a higher protocol level (e.g. a message for an LMF service based operation) which includes the location request information. The SgNB 110-1 may store some or all of the location request information which may form part of the location context for the target UE 105 in the SgNB 110-1 as described in Table 1.

At stage 12, the SgNB 110-1 selects a CgNB 110-2 for the target UE 105. The selected CgNB 110-2 may be the SgNB 110-1 itself or may be another gNB 110 or a server that is not a gNB 110 (e.g. an LMC server or LLMF server). The selection may be based on the capability of the SgNB 110-1 and the type of location request (e.g. criteria for sending location reports to the external client 130, QoS and/or a request to send location reports via a user plane). For example, the SgNB 110-1 for the target UE 105 may determine to act as the CgNB 110-2 when the SgNB 110-1 has a capability to support the type of location request. Alternatively, the SgNB 110-1 may select a different CgNB 110-2 with a capability to support the type of location request.

At stage 13, if the CgNB 110-2 selected at stage 12 is not the SgNB 110-1, the SgNB 110-1 forwards the location request information received at stage 11 to the selected CgNB 110-2 in an XnAP message (e.g. may forward any higher protocol level message received at stage 11).

At stage 14, the CgNB 110-2 selected at stage 12 (i.e. the SgNB 110-1 or a different gNB 110 or a server) configures location measurements for the target UE 105 to support the location request which was received at stage 11 or stage 13. The measurement configuration at stage 14 is described in more detail in FIG. 6. In some embodiments, stage 14 may occur after stage 15 and stage 16.

At stage 15, if stage 13 occurred (i.e. the CgNB 110-2 is not the SgNB 110-1), the CgNB 110-2 returns a response to the SgNB 110-1 confirming that location reporting for the target UE 105 was activated. The response may include a Location Report (LR) message to be returned to the serving AMF 154 at stage 16 or LR information to be included in an LR message returned at stage 16.

At stage 16, the SgNB 110-1 returns an NGAP message to the serving AMF 154 confirming that the location request for the target UE 105 has been activated in the CgNB 110-2. The NGAP message includes either the LR information or LR message received at stage 15 when stage 15 occurs, or LR information or an LR message originated by SgNB 110-1 when stage 15 does not occur (i.e. when SgNB 110-1 comprises CgNB 110-2).

At stage 17, for a request from an NEF 159 (e.g. where stages 1-4 were performed or where an NEF 159 sent a location request to the serving AMF 154 via the UDM 156), the serving AMF 154 invokes an Namf_EventExposure Notify service operation to send an indication to the NEF 159 that the location request at stage 1 has been activated in a CgNB 110-2.

At stage 18, the NEF 159 forwards the indication received at stage 17 to the external client 130.

At stage 19, for a request from a GMLC 155 (e.g. where stage 7 was performed)), the serving AMF 154 invokes an Namf_Location_EventNotify service operation to send an indication to the GMLC 155 that the location request at stage 5 (or stage 1 if an NEF 159 forwards a location request to the GMLC 155) has been activated in a CgNB 110-2.

At stage 20, the GMLC 155 forwards the indication received at stage 19 to the external client 130.

Figure 7:
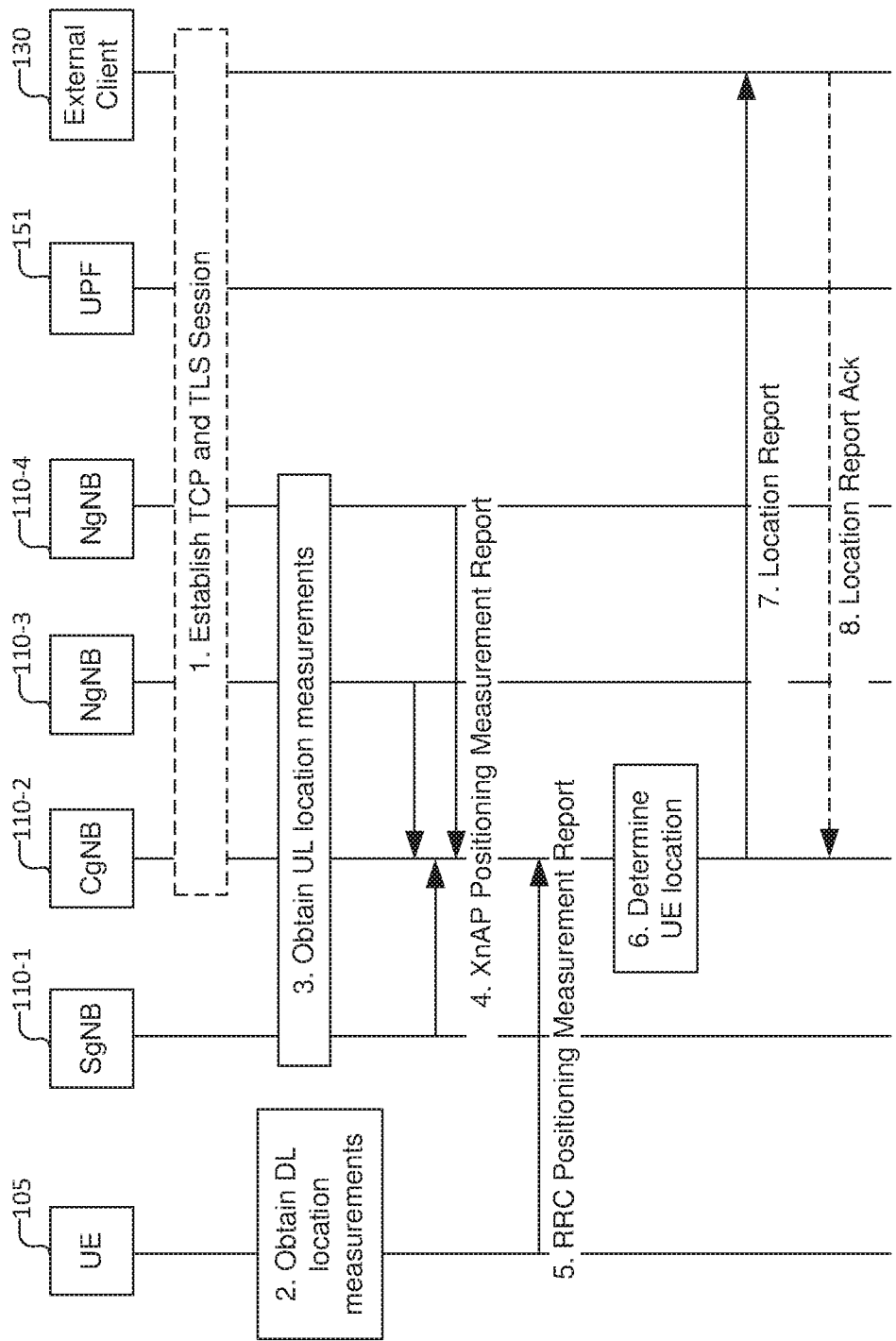
FIG. 7 shows a procedure to support location reporting by a controlling entity in a RAN to support a VLLLS.

At stage 21, the CgNB 110-2 performs location reporting for the target UE 105 via a user plane as described in more detail in FIG. 7.

At stage 22, the target UE 105, CgNB 110-2, GMLC 155, NEF 159 or external client 130 may cancel the location request by sending a location cancelation request directly or indirectly to other entities participating in the location reporting. The other entities participating in the location reporting may include whichever of the target UE 105, CgNB 110-2, GMLC 155, NEF 159 and external client 130 are not instigating the location cancelation and participated in at least one of stages 1-21.

Figure 6:
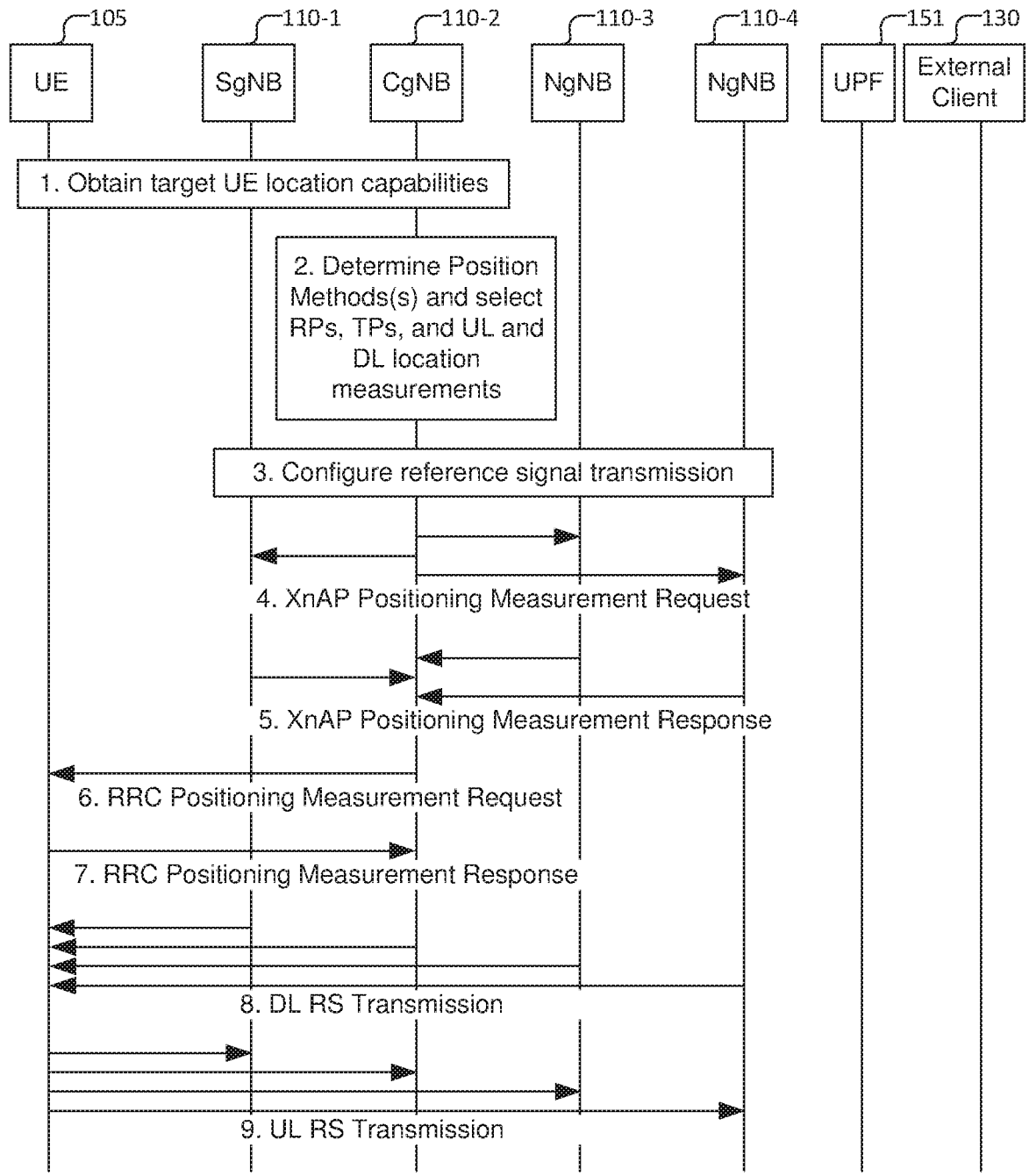
FIG. 6 shows a procedure to support location measurement configuration by a controlling entity in a RAN to support a VLLLS.

FIG. 6 shows a procedure to support location measurement configuration by a CgNB 110-2 to support a VLLLS. The procedure may be used to support stage 14 in FIG. 5. The procedure applies to a non-roaming target UE 105 as in FIG. 1.

At stage 1 in FIG. 6, the CgNB 110-2 may obtain the location capabilities of the target UE 105 by sending an RRC request message to the UE 105 and receiving an RRC response message from the UE 105 containing the location capabilities. In some embodiments, the RRC request message and the RRC response message may each include an LPP message containing a request for the capabilities and the location capabilities, respectively. If the CgNB 110-2 is not the SgNB 110-1 for the target UE 105, the CgNB 110-2 may send and receive the RRC messages and/or the LPP messages at stage 1 via the SgNB 110-1 (e.g. by sending and receiving the RRC messages and/or the LPP messages in XnAP messages). In an embodiment, the CgNB 110-2 may obtain the location capabilities of the target UE 105 at stage 1 from the SgNB 110-1 (e.g. by sending an XnAP request to the SgNB 110-1 and receiving an XnAP response from the SgNB 110-1 or by receiving the location capabilities as part of the original request received at stage 13 in FIG. 5). In this embodiment, the SgNB 110-1 may obtain the location capabilities of the target UE 105 at an earlier time from the target UE 105.

At stage 2, the CgNB 110-2 determines a position method or position methods for obtaining location estimates and other location information for the target UE 105. The position method(s) may include, for example, ECID, multi-RTT, OTDOA, A-GNSS, RTK, AOA, AOD, sensors, WLAN and/or other methods. The position method(s) may be determined based on the UE 105 location capabilities obtained at stage 1 and/or the requested QoS for the location request for the target UE 105 (e.g. as received at stage 11 or stage 13 in FIG. 5). For example, the position method(s) may comprise only position methods indicated as supported by the target UE 105 and which can support or help support the requested QoS. The CgNB 110-2 may also select one or more reception points (RPs) to obtain UL location measurements for the target UE 105 to support the determined position method(s). The RPs may include the CgNB 110-2, the SgNB 110-1 (if different to the CgNB 110-2), one or more NgNBs 110 and/or one or more LMUs. The CgNB 110-2 may also determine one or more UL location measurements to be obtained by each RP and criteria for obtaining the UL location measurements. The UL location measurements may be determined based on the determined position method(s), the location QoS, and/or the location capabilities of the selected measurement entities (e.g. as configured in the CgNB 110-2). For example, the UL location measurements may include or more of a TOA, Rx-Tx, AOA, RSSI, RSRP, RSRQ. Typically, criteria for obtaining the UL location measurements will be to obtain measurements at fixed periodic intervals. The CgNB 110-2 may also determine one or more DL location measurements to be obtained by the target UE 105 and criteria for obtaining the DL location measurements. The DL location measurements may be determined based on the determined position method(s), the location QoS, and/or the location capabilities of the target UE 105 as obtained at stage 1. For example, the DL location measurements may include one or more of a TOA, Rx-Tx, RSTD, AOA, RSSI, RSRP, RSRQ, GNSS code phase, GNSS carrier phase, WiFi AP RTT, WiFi AP RSSI and/or sensor measurements (e.g. of the relative location and/or orientation of the target UE 105).

At stage 3, which is optional, the CgNB 110-2 may select one or more transmission points (TPs) comprising gNBs 110 or TPs within gNBs 110 (e.g. other NgNBs 110-3, 110-4, the SgNB 110-1 if different to the CgNB, the CgNB 110-2) and/or LTUs to transmit DL reference signals (RSs) to be later measured by the target UE 105 to support some or all of the DL location measurements selected at stage 2. The reference signals may include positioning reference signals (PRSs), tracking reference signals (TRSs) and other types of RS and may include omnidirectional RSs and/or directional (e.g. beam formed) RSs. The CgNB 110-2 may then send an XnAP message to each selected TP which is not part of the CgNB 110-2 to configure transmission of a DL RS by each selected TP. In some embodiments, the XnAP message which is sent to each selected TP at stage 3 may include an NRPPa message containing information to configure transmission of a DL RS by this selected TP. The transmission times for the configured RSs may be timed to coincide with required or selected location reports for the target UE 105. For example, if the external client 130 requests periodic location reporting for the target UE 105 at 10 second intervals at stage 1 or stage 5 in FIG. 5, the CgNB 110-2 may configure each TP to transmit an RS for a short period (e.g. 100 ms to 1 second) immediately prior to each 10 second reporting interval. In situations where the selected TPs are already transmitting RSs to support location of other UEs, the CgNB 110-2 may modify the transmission by requesting increased transmission of RSs (e.g. using a higher bandwidth and/or higher frequency of transmission). The configuration may be supported by sending an XnAP message (possibly including an NRRPa message) from the CgNB 110-2 to each selected TP (except the CgNB 110-2) indicating the required RS transmission. The configuration information sent to each TP may include RS details (e.g. RF carrier frequency, bandwidth, duration and periodicity of transmission) and a start and end time. Each TP may return a response to the CgNB 110-2 confirming whether or not the requested RS configuration can be performed.

At stage 4, which is optional, if RPs are selected at stage 2 which include, or are part of, other gNBs 110 or LMUs, the CgNB 110-2 sends an XnAP Positioning Measurement Request to each RP requesting UL location measurements of signals to be transmitted by the target UE 105. Each request may indicate the type of signal(s) to be later transmitted by the target UE 105 (e.g. whether this is an UL PRS or other type of UL RS) and may include characteristics of the signal(s) such as RF carrier frequency, bandwidth, coding and timing of transmission. The request may also indicate the requested types of UL location measurement and may indicate QoS for the measurements (e.g. accuracy, latency in obtaining the measurements, reliability). The request may also indicate a series of measurement occasions at each of which the UL location measurements are to be obtained. The measurement occasions may be periodic in which case the CgNB 110-2 may provide a periodicity and a start time and end time. In some embodiments, the XnAP Positioning Measurement Request message which is sent to each RP at stage 4 may be an XnAP transport message that includes an NRPPa message containing some or all of the information to configure the UL location measurements by this RP.

At stage 5, if stage 4 occurs, each RP which receives a request as part of stage 4 sends an XnAP Positioning Measurement Response (or an XnAP transport message containing an NRPPa message) to the CgNB 110-2 indicating whether the UL location measurements requested at stage 4 can be supported. In some variants, the messages (e.g. XnAP and/or NRPPa messages) for stages 4 and 5 may be combined with the messages used to support stage 3.

At stage 6, the CgNB 110-2 sends an RRC Positioning Measurement Request to the target UE 105 (e.g. via the SgNB 110-1 for the target UE 105 if different from the CgNB 110-2) to request UL transmission by the target UE 105 of an UL RS (e.g. an UL PRS) to support the UL location measurements selected at stage 2 and/or to request the DL location measurements by the target UE 105 selected at stage 2. The RRC Positioning Measurement Request may include details about the required UL RS (e.g. coding, bandwidth, RF carrier frequency, frequency and timing of transmission, and/or a start time and end time for transmission). The request may further indicate QoS for the DL location measurements (e.g. accuracy, latency in obtaining the measurements, reliability) and a series of measurement occasions at each of which the DL location measurements are to be obtained by the target UE 105. The measurement occasions may be defined by criteria such as a fixed periodic interval, trigger conditions such as movement of the target UE 105 by more than some threshold distance and/or by a start time and end time. Typically, measurement occasions for the target UE 105 in this stage and measurement occasions for the RPs in stage 4 will coincide in time. In some embodiments, the RRC Positioning Measurement Request message which is sent to the target UE 105 at stage 6 may be an RRC transport message that includes an LPP message containing some or all of the information to configure the UL RS transmission and/or the DL location measurements by the target UE 105. In this embodiment, the CgNB 110-2 may transfer the LPP message to the SgNB 110-1 using XnAP, when the CgNB 110-2 is not the SgNB 110-1, with the SgNB 110-1 then forwarding the LPP message to the target UE 105 in an RRC transport message.

At stage 7, the target UE 105 returns an RRC and/or LPP response to the CgNB 110-2 (e.g. via the SgNB 110-1 if different from the CgNB 110-2) confirming whether the requested UL RS transmission and/or DL location measurements can be supported by the target UE 105.

In some embodiments, prior to stage 6 and not shown in FIG. 6, if the CgNB 110-2 is not the SgNB 110-1, the CgNB 110-2 may request and obtain configuration information for the UL RS transmission by UE 105 from the SgNB 110-1 in order to ensure that the UL RS transmission by the target UE 105 uses UL RF carrier frequencies, bandwidth and timing that do not interfere with UL and DL transmission for other UEs supported by the SgNB 110-1. In some of these embodiments, the SgNB 110-1 rather than CgNB 110-2 may subsequently send a request to UE 105 to configure the UL RS transmission as part of stage 6, in which case information for the UL RS transmission may not be sent to the target UE 105 by CgNB 110-2 as part of stage 6.

At stage 8, each of the TPs selected and configured at stage 3 transmits a DL RS (e.g. at periodic intervals) which may be received and measured by the target UE 105. The transmission of a DL RS by each TP may continue for a location reporting period for the target UE 105 or until transmission of a DL RS is canceled or reconfigured by the CgNB 110-2 or by another CgNB 110-2 if the target UE 105 moves to a new SgNB 110-1.

At stage 9, if the CgNB 110-2 (or SgNB 110-1) configures transmission of an UL RS by the target UE 105 at stage 6, the target UE 105 commences to transmit the configured UL RS and may continue for a location reporting period for the target UE 105 or until transmission of the UL RS is canceled or reconfigured by the CgNB 110-2 (or SgNB 110-1) or by another CgNB 110-2 if the target UE 105 moves to a new SgNB 110-1.

FIG. 7 shows a procedure to support location reporting by a CgNB 110-2 to support a VLLLS. The procedure may be used to support stage 21 in FIG. 5. The procedure applies to a non-roaming target UE 105 as in FIG. 1.

At stage 1 in FIG. 7, if there is currently no TCP connection and optional TLS session between the CgNB 110-2 and the external client 130 or UPA 153 (when a UPA 153 is used) which can be used to send location reports for the target UE 105, the CgNB 110-2 establishes a TCP connection and optional TLS session with the external client 130 or UPA 153 (if used). This may occur any time after stage 15 or stage 16 in FIG. 5. For location reporting directly to the external client 130, the CgNB 110-2 may use an address or identity of the external client 130 received at stage 11 or stage 13 in FIG. 5 to establish the TCP connection, and any ciphering and authentication key(s) received at stage 11 or stage 13 of FIG. 5 to establish a TLS session. For location reporting via a UPA 153, the CgNB 110-2 may use a configured address for a UPA 153 and an optionally configured ciphering and authentication key to establish a TCP connection and optional TLS session with a UPA 153. The UPA 153, if used, may already have a TCP connection and optional TLS session with the external client 130 but, if not, may establish a TCP connection and optional TLS session with the external client 130 as part of stage 1 after a TCP connection and TLS session have been established with the CgNB 110-2 or after receiving the first location report from the CgNB 110-2 at stage 7.

In a variant of stage 1, when ULP is used to send location reports rather than HTTP, the CgNB 110-2 may establish a SUPL session with the external client 130 or UPA 153 if there is currently no SUPL session, which may include establishing a TCP connection and optional TLS session as described above. In this variant, CgNB 110-2 may indicate (e.g. at a ULP level and optionally in a SUPL START or SUPL TRIGGERED START message sent to the external client 130 or UPA 153 as part of stage 1) that the SUPL session is associated with the location request sent at stage 1 or stage 5 in FIG. 5. For example, CgNB 110-2 may include a location session reference sent by external client 130 at stage 1 or stage 5 in FIG. 5 in a SUPL START or SUPL TRIGGERED START message sent to external client 130 or UPA 153 as part of stage 1 in FIG. 7.

At stage 2, if the target UE 105 was previously requested by the CgNB 110-2 to obtain DL location measurements as at stage 6 in FIG. 6, the target UE 105 obtains the requested DL location measurements at each of the measurement occasions indicated in stage 6 of FIG. 6.

At stage 3, if one or more of the SgNB 110-1, CgNB 110-2, NgNBs 110-3, 110-4, and/or LMUs (not shown in FIG. 7) were selected (and configured) to obtain UL location measurements at stages 2, 4 and 5 in FIG. 6, the SgNB 110-1, CgNB 110-2, NgNBs 110-3, 110-4 and/or LMUs obtain UL location measurements of UL signals transmitted by the target UE 105. The UL signals may be transmitted by the target UE 105 as described for stage 9 of FIG. 6. The SgNB 110-1, CgNB 110-2, NgNBs 110-3, 110-4 and/or LMUs may obtain the UL location measurements of the UL signals as requested at stage 4 in FIG. 6, or, in the case of the CgNB 110-2, as determined at stage 2 in FIG. 6. The UL location measurements may be obtained at each of a series of measurement occasions as described for stage 4 of FIG. 6.

At stage 4, if stage 3 occurs, each of the SgNB 110-1, NgNBs 110-3, 110-4 and/or LMUs which obtained UL location measurements at stage 3 sends an XnAP Positioning Measurement Report message to the CgNB 110-2 after each measurement occasion and includes the UL location measurements obtained for that measurement occasion. In some embodiments, the XnAP Positioning Measurement Report message which is sent to the CgNB 110-2 at stage 4 may be an XnAP transport message that includes an NRPPa message containing the UL location measurements obtained for a measurement occasion.

At stage 5, if stage 2 occurs, the target UE 105 sends an RRC Positioning Measurement Report to the CgNB 110-2 after each measurement occasion and includes the DL location measurements obtained by the target UE 105 for that measurement occasion. When the CgNB 110-2 is different from the SgNB 110-1, the target UE 105 may send the RRC Positioning Measurement Report to the SgNB 110-1 which forwards the message to the CgNB 110-2. In some embodiments, the RRC Positioning Measurement Report message which is sent to the CgNB 110-2 at stage 5 may be an RRC transport message that includes an LPP message containing the DL location measurements obtained by the target UE 105 for a measurement occasion. In this embodiment, the SgNB 110-1 may forward the LPP message to the CgNB 110-2 using XnAP, when the SgNB 110-1 is not the CgNB 110-2.

At stage 6, the CgNB 110-2 determines a location for the target UE 105 based on the UL location measurements received in stage 4 and/or the DL location measurements received in stage 5 and according to the position method(s) determined at stage 2 in FIG. 6. The CgNB 110-2 may also determine other location information for the target UE 105 such as a velocity and/or orientation based on the UL and/or DL location measurements. The determination of the location and any other location information may be performed by CgNB 110-2 for each separate measurement occasion for which UL and/or DL location measurements are received at stage 4 and/or stage 5.

At stage 7, based on criteria for reporting the location of the target UE 105 received at stage 11 or stage 13 in FIG. 5, the CgNB 110-2 determines whether to report the location information obtained at stage 6 to the external client 130. If the CgNB 110-2 determines to report the location information, the CgNB 110-2 sends a location report to the external client 130 or to a UPA 153 if a UPA 153 is used. The location report may include some or all of the location and any other location information determined at stage 6 as well as a target UE 105 identity (e.g. GPSI or SUPI), a location session reference, and/or an address or indication of the external client 130. The location report may be sent as a user plane message according to the protocol layering described for FIG. 3. When the location report is sent to a UPA 153, the UPA 153 may forward the location report to the external client 130 using a separate TCP connection and optional TLS session as described for FIG. 3. If HTTP is used to send the location report at stage 7, the location report may comprise an HTTP POST message. If ULP is used to send the location report at stage 7, the location report may comprise a ULP message such as a SUPL POS message, SUPL POS INIT message or a SUPL REPORT message.

At stage 8, optionally, the external client 130 may return an acknowledgment to the CgNB 110-2 and via a UPA 153 if a UPA 153 is used. An acknowledgment may not be needed if an acknowledgement at the TCP level is considered to be sufficient. stages 2-8 may be repeated for each measurement occasion and/or each location report. In some variants, an acknowledgment at stage 8 or a separate message from the external client 130 to the CgNB 110-2 may request some change to the location reporting such as a higher or lower periodicity of location reporting, a higher or lower location QoS or cancellation of location reporting. If HTTP is used to send the location report at stage 7, the acknowledgement at stage 8 may comprise an HTTP Status 204 (no content) message or HTTP Status 200 OK message.

In one variant of the procedure shown in FIG. 7, referred to here as a "control plane variant", the location report at stage 7 and the location report acknowledgment at stage 8 may be sent via a control plane instead of via a user plane. For control plane sending, the CgNB 110-2 may send a location report to the SgNB 110-1 (if different to the CgNB 110-2). The SgNB 110-1 may then forward the location report to a serving AMF 154 for the target UE 105 which forwards the location report to a GMLC 155 or NEF 159, which in turns forwards the location report to the external client 130. The signaling path used to send the location report to the external client 130 with the control plane variant may be the same as or similar to the signaling path used to establish the location reporting session for the target UE 105 as described for FIG. 5, except that the location report is sent in the opposite direction to the location request used to establish the location reporting session. The control plane variant may be used when sending of a location report via a user plane is not supported by a PLMN or by an external client 130. However, it may produce higher latency than use of a user plane.

Due to movement of the target UE 105 and/or other factors such a variations in wireless coverage or network loading level, the target UE 105 may change serving cell and, as a consequence, may be assigned a new SgNB 110-1. When this occurs, the CgNB 110-2 may also need to change if the current CgNB 110-2 does not have connectivity (e.g. Xn connectivity) to the new SgNB 110-1 or to one or more new RPs and/or new TPs for the target UE 105 which may be needed to obtain UL location measurements and/or transmit a DL RS. A change of CgNB 110-2 may require a partial or complete reconfiguration of location measurements for the target UE 105 because the RPs selected at stage 2 in FIG. 6 would need to send UL location measurements to the new CgNB rather than the old CgNB 110-2. The measurement reconfiguration may require extensive signaling between the new and/or old CgNB 110-2 and the RPs which may consume network resources and may interfere with (e.g. delay or prevent) obtaining location measurements and sending location reports. It may therefore be preferable not to change the CgNB 110-2 if the current CgNB 110-2 has connectivity to the new SgNB 110-1 and can access any new RPs and new TPs which may be needed to obtain UL location measurements and/or transmit a DL RS to the target UE 105.

Figure 8A:
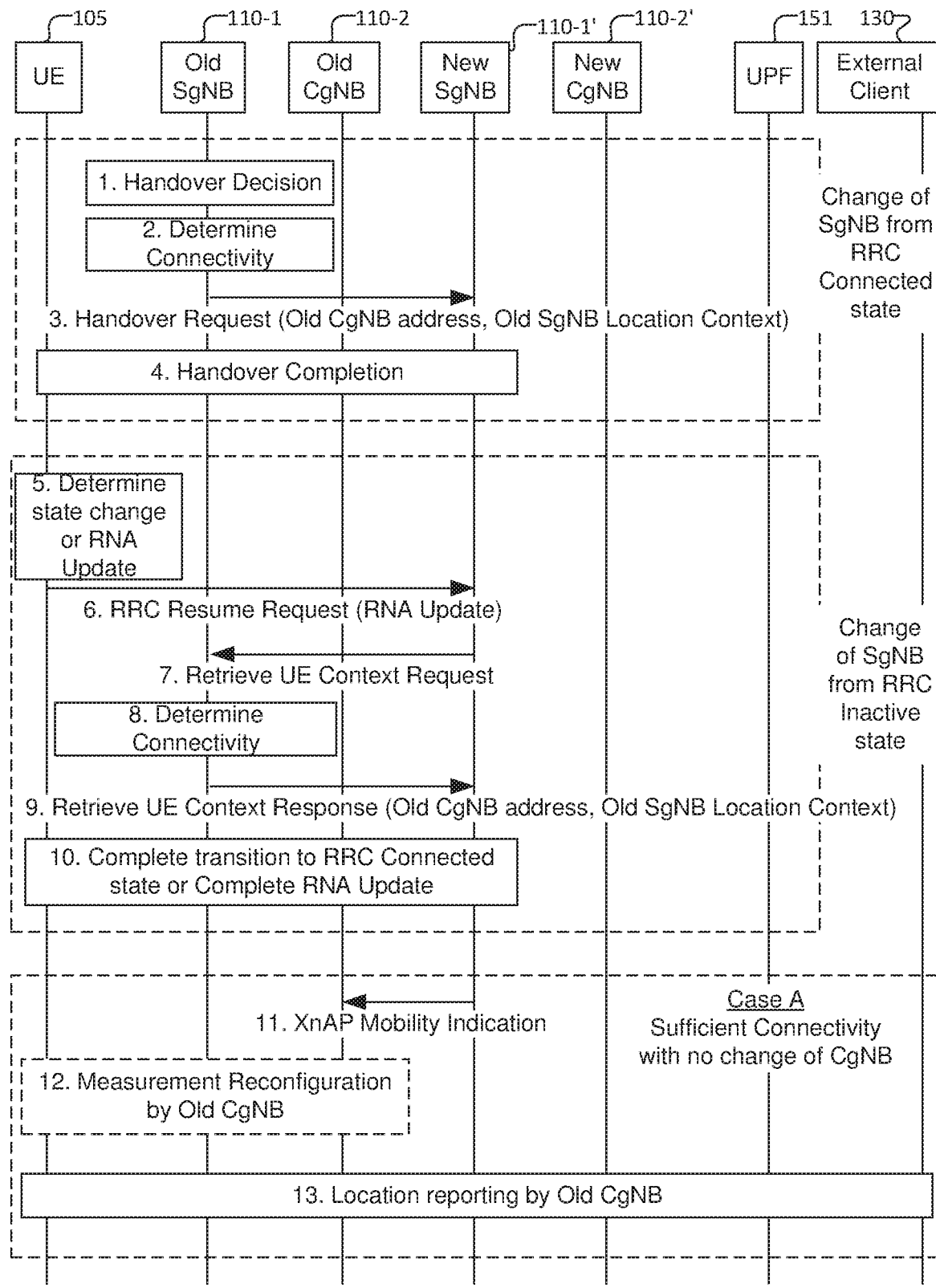
FIGS. 8A and 8B, shows a procedure to support change of a serving base station for a target UE with a possible change of a controlling entity in a RAN for a target UE in RRC connected state or RRC Inactive state.
Figure 8B:
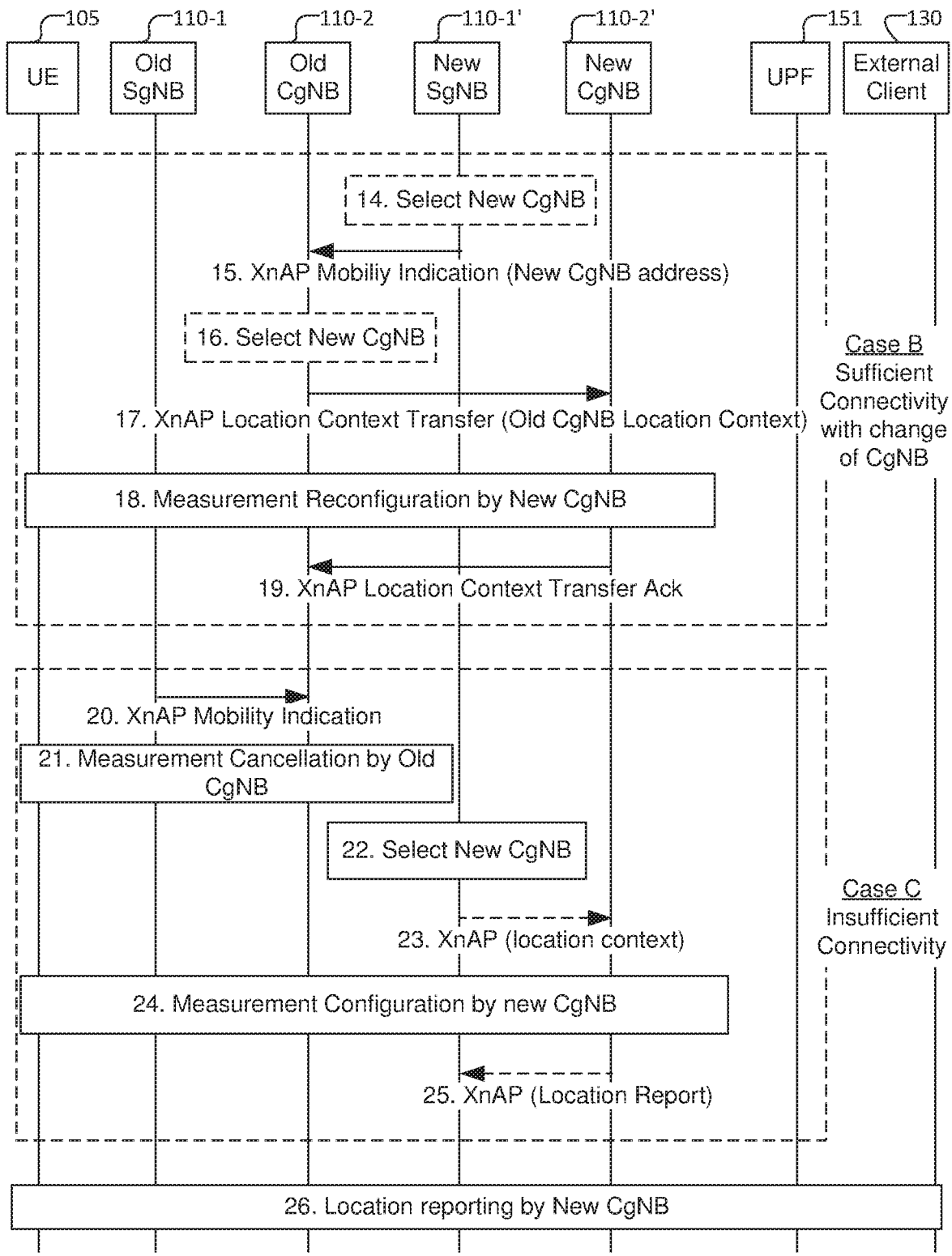

FIG. 8, which is split into FIG. 8A and FIG. 8B, shows a procedure to support change of SgNB with a possible change of CgNB for a target UE 105 in RRC connected state or RRC Inactive state. FIG. 8 also distinguishes three cases, referred to as Case A, Case B and Case C for different types of SgNB and CgNB change. These are based on a determination performed by the current SgNB 110-1 (referred to here as the "old SgNB 110-1") as to whether a current CgNB (referred to here as the "old CgNB 110-2") does or does not have signaling connectivity to a new SgNB 110-1' and to sufficient RPs and TPs to enable location reporting for the target UE 105 to continue at the old CgNB 110-2, after the handover or cell change and with support of the required QoS. The result of this determination is either "sufficient connectivity" or "insufficient connectivity". The three cases are then defined as follows. Case A corresponds to "Sufficient Connectivity" with no change of CgNB; Case B corresponds to "Sufficient Connectivity" with a change of CgNB; and Case C corresponds to "Insufficient Connectivity" (and with a change of CgNB).

Depending on the mobility of target UEs and the degree of network connectivity, it is possible that some PLMNs may not need to support Case C and possibly not Case B. For example, for location of objects in a factory, a warehouse or other single building, where all gNBs providing wireless coverage are interconnected, only Case A may need to be supported.

As illustrated in FIG. 8, if a change of SgNB occurs in RRC Connected state for the target UE 105, stages 1-4 are performed and stages 5-10 are omitted. If a change of SgNB occurs in RRC Inactive state for the target UE 105, stages 1-4 are omitted and stages 5-10 are performed.

At stage 1 in FIG. 8, for RRC Connected state, the old SgNB 110-1 determines that handover is needed for the target UE 105 and selects a new cell and/or new SgNB 110-1+.

At stage 2, the old SgNB 110-1 determines connectivity for the new cell and/or new SgNB 110-1' as described above. This is a binary decision where the result of the determination is either "sufficient connectivity" or "insufficient connectivity".

At stage 3, as part of a normal handover procedure (e.g. as described in 3GPP TS 38.300 and TS 23.502), the old SgNB 110-1 sends a Handover Request message to the new SgNB 110-1'. The Handover request message may be sent directly over the Xn interface (and possibly via one or more intermediate gNBs 110) or may be sent via an old serving AMF 154 and a new serving AMF 154 when change of AMF occurs as part of the handover. The old SgNB 110-1 includes the SgNB 110-1 location context in the Handover Request as described in Table 1. The old SgNB 110-1 also includes the address of the old CgNB 110-2 in the Handover Request when the determination at stage 2 is "sufficient connectivity". The old SgNB 110-1 may further include the result of the determination in stage 2.

At stage 4, the rest of the handover procedure occurs as described in 3GPP TS 38.300 and TS 23.502.

At stage 5, for RRC Inactive state, and as part of normal UE 105 operation not specifically associated with location reporting, the target UE 105 determines either to transition to RRC Connected state (e.g. in order to send and receive data or send UL location measurements as at stage 5 in FIG. 7) or to instigate a RAN-based Notification Area (RNA) update, e.g. due to changing RNA or for periodic RNA update.

At stage 6, the target UE 105 sends an RRC Resume Request message to a new SgNB 110-1' associated with a new cell for the target UE 105. The RRC Resume Request includes an indication of RNA Update when the UE 105 detects being in a new RNA at stage 5 and also includes an identification of the old SgNB 110-1.

At stage 7, the new SgNB 110-1' sends a Retrieve UE Context Request message to the old SgNB 110-1 if the old SgNB 110-1 is reachable from the new SgNB 110-1'. Stages 5-7 may be performed as defined in 3GPP TS 38.300 and TS 23.502 without any change for location reporting.

At stage 8, the old SgNB 110-1 determines connectivity for the new SgNB 110-1' as described for stage 2.

At stage 9, the old SgNB 110-1 returns a Retrieve UE Context Response message to the new SgNB 110-1' as described in 3GPP TS 38.300 to provide information for the target UE 105 to the new SgNB 110-1'. The old SgNB 110-1 also includes the old SgNB 110-1 location context in the Retrieve UE Context Response. The old SgNB 110-1 further includes the address of the old CgNB 110-2 in the Retrieve UE Context Response when the determination at stage 8 is "sufficient connectivity". The old SgNB 110-1 may further include the result of the determination in stage 8.

At stage 10, the rest of the procedure for transition of the target UE 105 to RRC Connected state or completion of the RNA update occurs as described in 3GPP TS 38.300.

Depending on the connectivity determination in stage 2 or stage 8 and whether a change of CgNB is needed, different stages in FIGS. 8A and 8B can be performed. If "Sufficient Connectivity" is determined in stage 2 or stage 8 and the new SgNB 110-1' and old CgNB 110-2 determine that a change of CgNB is not needed (Case A), stages 11-13 are performed and stages 14-26 are omitted. If "Sufficient Connectivity" is determined in stage 2 or stage 8 and the new SgNB 110-1' or old CgNB 110-2 determines that a change of CgNB is needed (Case B), stages 14-19 and stage 26 are performed and stages 11-13 and 20-25 are omitted. If "Insufficient Connectivity" is determined in stage 2 or stage 8 (Case C), stages 20-26 are performed and stages 11-19 are omitted. It is noted that, from the perspective of the new SgNB 110-1', stage 11 and stage 15 can appear to be identical when the old CgNB 110-2 rather than new SgNB 110-1' determines that a change of CgNB is needed for Case B.

At stage 11 in FIG. 8, for Case A, the new SgNB 110-1' sends an XnAP Mobility Indication message to the old CgNB 110-2 based on the old CgNB 110-2 address received at stage 3 or stage 9. The new SgNB 110-1' includes its own address in the message and an identity for the new serving cell for the target UE 105. In some embodiments, the XnAP Mobility Indication message which is sent to the old CgNB 110-2 at stage 11 may be an XnAP transport message that includes an NRPPa message containing the address for the new SgNB 110-1' and the identity for the new serving cell.

At stage 12, the old CgNB 110-2 may optionally reconfigure UL location measurements by some RPs and/or may optionally reconfigure transmission of a DL RS by some TPs based on the new SgNB 110-1' address and/or new serving cell identity. Since a new SgNB 110-1' address and/or new serving cell identity may indicate some movement of the target UE 105, certain previous RPs (e.g. as selected at stage 2 in FIG. 6) may no longer be able to obtain accurate UL location measurements of UL signals transmitted by the target UE 105, and/or some previous TPs (e.g. as selected at stage 2 of FIG. 6) may no longer be able to effectively transmit a DL RS that can be accurately measured by the target UE 105. However, there may be other RPs, not yet selected by the old CgNB 110-2, that could obtain accurate UL location measurements of UL signals transmitted by the target UE 105. Similarly, there may be other TPs, not yet selected by the old CgNB 110-2, that could effectively transmit a DL RS that can be accurately measured by the target UE 105. The old CgNB 110-2 may thus determine: (i) a set of RPs, referred to here as "RP Set 1", for which ongoing UL location measurements will be cancelled; (ii) a set of RPs, referred to here as "RP Set 2", for which new UL location measurements will be requested; (iii) a set of TPs, referred to here as "TP Set 1", for which ongoing DL RS transmission will be cancelled; and/or (iv) a set of TPs, referred to here as "TP Set 2", for which new DL RS transmission will be requested. The old CgNB 110-2 may then perform the reconfiguration by performing a stage similar to stage 3 of FIG. 6 for the TPs in TP Set 1 and TP Set 2 and by performing stages similar to stages 4 and 5 of FIG. 6 for the RPs in RP Set 1 and RP Set 2, where, in the case of TP Set 1 and RP Set 1, messages requesting cancellation are sent by the old CgNB 110-2 instead of requests for new transmission or new measurements. After (or possibly before) the old CgNB 110-2 has reconfigured the TPs and RPs in TP and RP sets 1 and 2, the old CgNB 110-2 may perform stages similar to stages 6 and 7 of FIG. 6 to reconfigure DL location measurements and possibly UL RS transmission by the target UE 105. For example, the old CgNB 110-2 can request the target UE 105 to cease obtaining DL location measurements for DL RSs transmitted by the TPs in TP Set 1 and to instead start to obtain DL location measurements for DL RSs transmitted by TPs in TP Set 2. Following the reconfiguration, TPs in TP Set 1 may cease DL RS transmission for stage 8 of FIG. 6, TPs in TP Set 2 may start DL RS transmission as in stage 8 of FIG. 6 and the target UE 105 may modify UL RS transmission for stage 9 of FIG. 6 if the old CgNB 110-2 requested a change in target UE 105 UL RS transmission.

At stage 13, location reporting continues as described for stages 2-8 of FIG. 7 (e.g. with respect to any TPs and RPs not in TP and RP sets 1 and 2) and with the following differences. At stage 2 in FIG. 7, the target UE 105 obtains DL location measurements for the new TPs in TP Set 2 and ceases to obtain DL location measurements for the old TPs in TP Set 1. Similarly, at stage 3 in FIG. 7, the new RPs in RP Set 2 start to obtain UL location measurements for UL signals transmitted by the target UE 105 and the old RPs in RP Set 1 cease to obtain UL location measurements for UL signals transmitted by the target UE 105. Transfer of the location measurements to the old CgNB 110-2 at stages 4 and 5 in FIG. 6 may continue as before with the difference that the new RPs in RP Set 2 now send UL location measurements for the target UE 105 to the old CgNB 110-2 at stage 4, while the old RPs in RP Set 1 cease to send UL location measurements for the target UE 105.

At stage 14 in FIG. 8, for Case B, the new SgNB 110-1' may select a new CgNB 110-2'. Selection of the new CgNB 110-2' may be based on: (i) the identity of the old CgNB 110-2 as received at stage 3 or stage 9; (ii) the new SgNB 110-1' identity or new serving cell identity; (iii) the capabilities of the old CgNB 110-2 (e.g. if configured in the new SgNB 110-1'); and/or (iv) the capabilities of the new CgNB 110-2' (e.g. if configured in the new SgNB 110-1'). For example, if the old CgNB 110-2 is distant from the new serving cell such that the old CgNB 110-2 (if the old CgNB 110-2 is a gNB 110) is no longer an NgNB 110 for the target UE 105, the new SgNB 110-1' may decide to select a new CgNB 110-2' which is an NgNB 110 for the target UE 105, e.g. may select the new CgNB 110-2' as being the new SgNB 110-1'. Alternatively, if the old CgNB 110-2 does not have complete Base Station Almanac (BSA) data for the new SgNB 110-1' and/or new NgNBs 110 for the target UE 105 such that the old CgNB 110-2 may not be able to adequately perform reconfiguration as at stage 12 or continue location computation as at stage 6 for FIG. 7, the new SgNB 110-1' may decide to select a new CgNB 110-2' which has complete BSA data for the new SgNB 110-1' and new NgNBs 110. Selection of a new CgNB 110-2' at stage 14 is optional and may not always occur for Case B.

At stage 15, the new SgNB 110-1' sends an XnAP Mobility Indication message to the old CgNB 110-2 as described for stage 11. However, in addition to the actions described for stage 11, the new SgNB 110-1' includes in the message the address of any new CgNB 110-2' selected at stage 14.

At stage 16, if the old CgNB 110-2 receives the address of a new CgNB 110-2' at stage 15, stage 16 is skipped. Otherwise, the old CgNB 110-2 selects a new CgNB 110-2' as described for selection by the new SgNB 110-1' for stage 14.

At stage 17, the old CgNB 110-2 sends an XnAP Location Context Transfer message to the new CgNB 110-2' and includes the old CgNB 110-2 location context as described in Table 1. In some embodiments, the XnAP Location Context Transfer message which is sent to the new CgNB 110-2' at stage 17 may be an XnAP transport message that includes a higher level protocol message (e.g. an NRPPa message) containing the old CgNB 110-2 location context.

At stage 18, the new CgNB 110-2' performs measurement reconfiguration for the target UE 105 as described for stage 12 for the old CgNB 110-2 and based on the current configuration of UL and DL location measurements and UL and DL RS transmission as indicated in the location context received from the old CgNB 110-2 at stage 17. However, in addition to adding and/or cancelling UL location measurements and/or DL RS transmission in some RPs and TPs, the new CgNB 110-2' also sends an XnAP Positioning Measurement Request (or an equivalent NRPPa message in an XnAP transport message) to each previously selected RP for which UL location measurement is not changed informing the RP to now send XnAP Positioning Measurement Reports (as at stage 4 in FIG. 7) to the new CgNB 110-2' instead of to the old CgNB 110-2. The new CgNB 110-2' may not need to inform the target UE 105 of the change of CgNB since the new SgNB 110-1' can forward DL location measurements received from the target UE 105 to the new CgNB 110-2'. The new CgNB 110-2' may also not need to inform the old CgNB 110-2 of the change in CgNB since the old CgNB 110-2 is already aware of this.

At stage 19, the new CgNB 110-2' sends an acknowledgement to the old CgNB 110-2 confirming that the new CgNB 110-2' is able to continue location reporting for the target UE 105. The old CgNB 110-2 can then delete location context information for the target UE 105 except for information related to support of RP and/or TP functions performed by (or in) the old CgNB 110-2 for location reporting for the target UE 105.

At stage 20, for Case C, the old SgNB 110-1 sends an XnAP Mobility Indication message (or an XnAP transport message containing an NRPPa message) to the old CgNB 110-2 with an indication of a change in SgNB for which "Insufficient Connectivity" was determined.

At stage 21, based on the indication of "Insufficient Connectivity" received at stage 20, the old CgNB 110-2 performs stages similar to stages 3-7 for FIG. 6 to cancel all UL location measurements, all DL location measurements, all UL RS transmission and all DL RS transmission previously configured to support location reporting for the target UE 105 in selected RPs, TPs and target UE 105. The old CgNB 110-2 then deletes all location context information.

At stage 22, based on an indication of "Insufficient Connectivity" received at stage 3 or stage 9 or based on the new SgNB 110-1' making this determination, the new SgNB 110-1' selects a new CgNB 110-2' as described for stage 12 of FIG. 5.

At stage 23, if the new CgNB 110-2' selected at stage 22 is not the new SgNB 110-1', the new SgNB 110-1' forwards the old SgNB 110-1 location context received at stage 3 or stage 9 to the selected new CgNB 110-2' in an XnAP message or in an NRPPa message included in an XnAP transport message.

At stage 24, the new CgNB 110-2' selected at stage 22 (i.e. the new SgNB 110-1' or a different gNB 110 or an LMC server or LLMF server) configures entirely new location measurements for the target UE 105 to support the location request as indicated by the old SgNB 110-1 location context received at stage 3, 9 or 23. The measurement configuration at stage 24 can be as described in FIG. 6.

At stage 25, if stage 23 occurred (i.e. the new CgNB 110-2' is not the new SgNB 110-1'), the new CgNB 110-2' returns a response to the new SgNB 110-1' confirming that location reporting for the target UE 105 was activated. In one variant, the messages sent at stages 23 and 25 may be the same types of message as sent at stages 13 and 15, respectively, for FIG. 5 (e.g. may each be an XnAP message containing a message for a higher protocol level such as for an LMF service based operation). With this variant, the impacts to the new SgNB 110-1' and new CgNB 110-2' to support stages 23-25 may be very similar or even identical to the impacts needed to support stages 13-15 for FIG. 5.

At stage 26, for Case B and Case C, location reporting continues as described for FIG. 7 with the difference that the location reporting is now performed by the new CgNB 110-2' according to the measurement configuration performed in stage 24 or the measurement reconfiguration performed in stage 18.

In one embodiment, instead of reporting location for a target UE 105 using a CgNB 110-2, location reporting may be performed by the target UE 105 using UE based location and with location reports sent to the external client 130 by the target UE 105 via a user plane. As for location reporting using a CgNB 110-2, a location session may be established by the external client 130 using control plane signaling and procedures. In one variant, a CgNB 110-2 may be used to coordinate location reporting by performing location measurement configuration as in, or similarly to that described in, FIG. 6. However, the location reporting in FIG. 7 may be replaced by location reporting by the target UE 105 via a user plane. In another variant, a CgNB 110-2 may be used to assist location determination by a UE 105 with the UE 105 performing location measurement configuration in gNBs 110 with the assistance of the CgNB 110-2, determining UE 105 location and performing location reporting via a user plane. In a further variant, which is described in more detail below for FIG. 9, there may be no CgNB 110-2 and instead location reporting may be controlled by an LMF 152 in a 5GCN 150. This variant may be similar to a periodic and triggered 5G Core Mobile Terminated Location Request (5GC-MT-LR) procedure for a 5GCN, as described in 3GPP TS 23.273, with the difference that location reports are sent to the external client 130 via a user plane.

Figure 9:
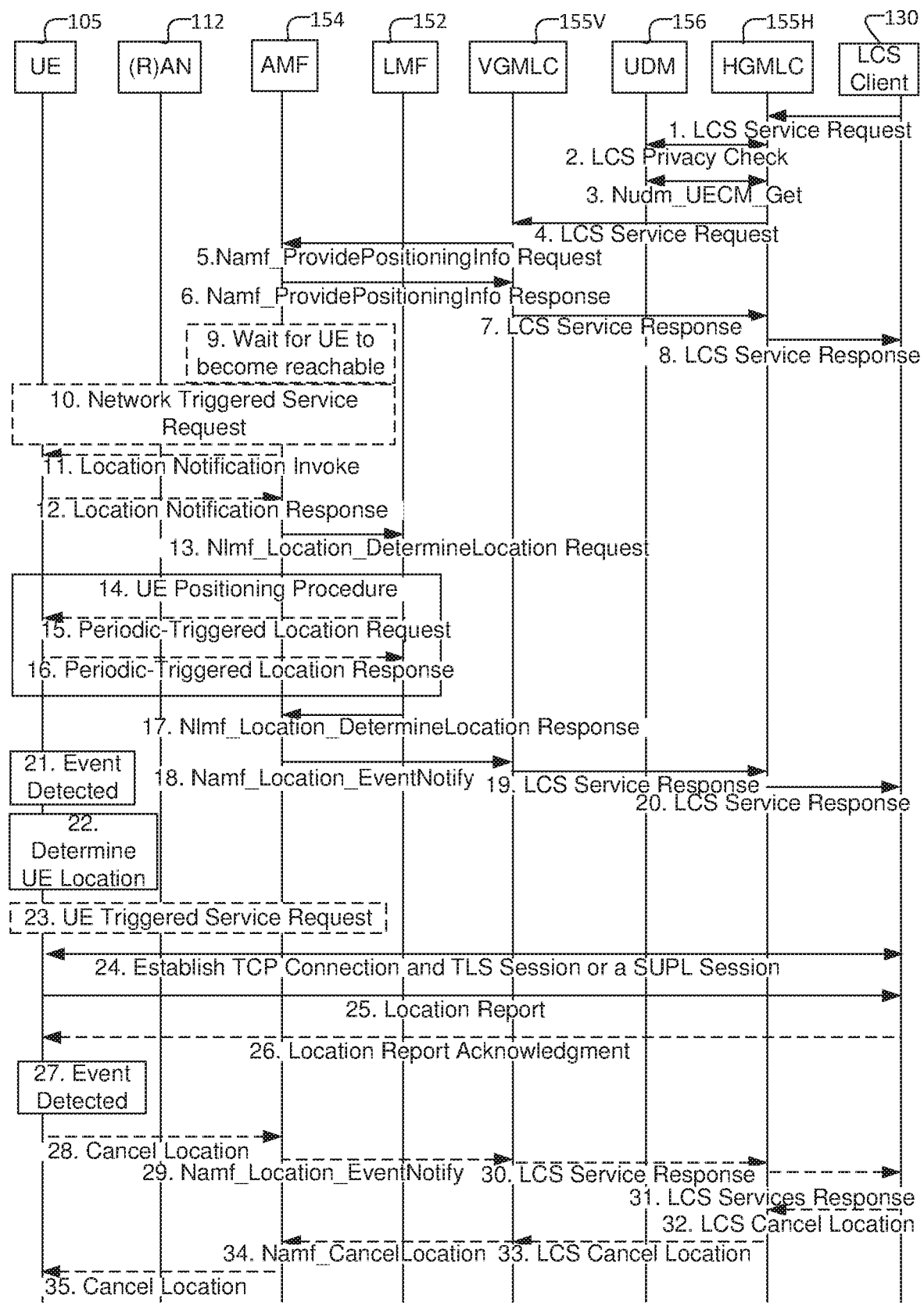
FIG. 9 shows a location session establishment and reporting procedure to support a VLLLS that is applicable for a target UE supporting location reporting.

FIG. 9 shows a procedure for one example of location reporting by a target UE 105 using a user plane. FIG. 9 applies to a roaming target UE 105 as in communication system 200 in FIG. 2. A procedure for a non-roaming target UE 105 as in communication system 100 in FIG. 1 could comprise a subset of the procedure shown in FIG. 9.

At stage 1 in FIG. 9, an external Location Services (LCS) client 130 sends a location request for a periodic or triggered location event for a target UE 105 to an HGMLC 155H in the HPLMN 5GCN 150H for the target UE 105. The location request provides the type of location reporting being requested and associated parameters. For periodic location, the request includes the time interval between successive location reports, the total number of reports and a location QoS. For triggered reporting for an area event, the request includes details of the target area, whether the trigger event to be reported is the target UE 105 being inside, entering or leaving the target area, whether event reporting shall include UE location estimates and if so a location QoS and the duration of reporting. For triggered reporting for a motion event, the request includes a threshold linear distance for triggering a location report, whether event reporting shall include UE location estimates and if so a location QoS and the duration of reporting. More than one type of location reporting may be requested at stage 1 (e.g. external client 130 may request periodic location and triggered location reporting for the area event or motion event). The location request may also include user plane information. The user plane information may include a request to send location reports via a user plane and an address to which location reports should be sent via the user plane (e.g. an IP address, FQDN or URI) and security information. The security information may include a ciphering and/or authentication key (or keys) and an identification for the external client 130 which may be usable to establish a TLS session between the target UE 105 and the external client 130. The security information may not be present or may be ignored by the HGMLC 155H when location reporting uses a UPA. The location request sent at stage 1 may also include some or all of the information described for stage 1 of FIG. 5—e.g. may include a location session reference to identify location reports sent later at stage 25.

It is noted that the external LCS client 130 may instead be a Network Function (NF) or an Application Function (AF) which accesses the HGMLC 155H via an NEF 159 as described for FIG. 5.

At stage 2 in FIG. 9, the HGMLC 155H may verify target UE 105 privacy requirements by querying the UDM 156 for privacy subscription information for UE 105 and then verifying that external client 130 is allowed to receive location information for UE 105. If the target UE 105 is not allowed to be located, subsequent stages are skipped.

At stage 3, the HGMLC 155H invokes an Nudm_UECM_Get service operation towards the home UDM 156 of the target UE 105 with the GPSI or SUPI of the target UE 105 to obtain the serving AMF 154 address and optionally a VGMLC 155V address and current access type(s) for the target UE 105.

It is noted that HGMLC 155H may also query the HSS of the target UE 105 (not shown in FIG. 9) for an address of a serving Mobility Management Entity (MME) as described in 3GPP TS 23.271. A deferred EPC-MT-LR procedure for Periodic and Triggered Location described in 3GPP TS 23.271 may then be performed instead of stages 4-35 in FIG. 9—e.g. if the HSS returns an MME address but the UDM 156 does not return an AMF address. In this case, the deferred EPC-MT-LR procedure may also invoke location reporting via a user plane by UE 105 which may be similar to that described below for FIG. 9.

At stage 4, if a VGMLC 155V address was not returned in stage 3, the HGMLC 155H may use a Network Repository Function (NRF) service in the HPLMN 5GCN 150H to select an available VGMLC 155V in the VPLMN 5GCN 150V, based on a VPLMN identification contained in the AMF 154 address received in stage 3. The HGMLC 155H forwards the location request to the VGMLC 155V and includes the AMF 154 address, the target UE 105 identity (e.g. SUPI), any access type(s) received at stage 3 and any privacy requirements for the target UE 105. The HGMLC 155H also includes a contact address for the HGMLC 155H (also referred to as a Notification Target Address, e.g. a URI) and a Location Deferred Request (LDR) reference number (also referred to as a Notification correlation ID) to be used for event and location reporting at stages 19 and 30. The HGMLC 155H further includes any user plane information received at stage 1 and may include other information received at stage 1 such as a location session reference and the type(s) of periodic and/or triggered location reported that were requested.

At stage 5, the VGMLC 155V invokes an Namf_Location_ProvidePositioningInfo Request service operation to forward the location request including all information received at stage 4 to the serving AMF 154. The VGMLC 155V may optionally determine an LMF 152 and then includes the LMF 152 identity in the request sent to the AMF 154.

At stages 6-8, if the AMF 154 supports a deferred location request for periodic or triggered location, the AMF 154 returns an acknowledgment to the external LCS client 130, via the VGMLC 155V and HGMLC 155H, indicating that the request for location was accepted. The VGMLC 155V may optionally release resources for the location request at this point.

It is noted that as an optional optimization, a VGMLC 155V may not be used. In this case, instead of performing stages 4-7, the HGMLC 155H invokes the Namf_Location_ProvidePositioningInfo Request service operation to forward the location request directly to the AMF 154. The AMF 154 then returns an acknowledgment directly to the HGMLC 155H.

At stage 9, if the target UE 105 is not currently reachable (e.g. is using DRX or PSM), the AMF 154 waits for the target UE 105 to become reachable.

It is noted that in the event of mobility of the target UE 105 to another AMF, or to an Enhanced Packet Core (EPC) supporting LTE access, when the target UE 105 becomes reachable, the old AMF 154 can return an event indication to the HGMLC 155H as at stages 18 and 19 and may include the address of the new serving AMF or new serving MME if known. If a new serving AMF or MME is not known, the HGMLC 155H can repeat stages 2 and 3 to query the UDM 156 and HSS for the new AMF or new MME address. The HGMLC 155H can then restart the procedure from stage 3.

At stage 10, once the target UE 105 is reachable, the AMF 154 performs a network triggered service request if needed to move the target UE 105 into a CM Connected state.

At stage 11, the AMF 154 may notify the target UE 105 and verify UE privacy requirements based on any privacy requirements received from the HGMLC 155H in stages 4-5. If this occurs, the AMF 154 sends a supplementary services Location Notification invoke to the target UE 105.

At stage 12, if stage 11 was performed for UE privacy verification, the target UE 105 notifies a user of UE 105 (if there is a user) of the location request and verifies user permission if UE privacy is to be verified. The target UE 105 then returns a supplementary services Location Notification response to the AMF 154 indicating whether the user (or UE 105 if there is no user) grants or withholds permission for the location request.

At stage 13, the AMF 154 determines an LMF 152, e.g. based on an LMF 152 identity provided by the VGMLC 155V in stage 5, the type of location request (e.g. a QoS) and/or current UE access type(s). The AMF 154 then invokes an Nlmf_Location_DetermineLocation Request service operation towards the LMF 152 to initiate a request for deferred UE location. The AMF 154 includes all the information received in stage 5 including the HGMLC 155H contact address, LDR reference number and user plane information. The request also includes an LCS Correlation identifier, a serving cell identity for UE 105, the external client 130 type and may include a required QoS and GAD shapes supported by the external client 130.

At stage 14, the LMF 152 instigates a UE positioning procedure (e.g. using a UE Assisted and UE Based Positioning Procedure described in 3GPP TS 23.273 and/or a Network Assisted Positioning Procedure described in 3GPP TS 23.273). During this procedure, the LMF 152 may request and obtain the target UE 105 positioning capabilities (e.g. which may indicate the type(s) of periodic and triggered location supported by the target UE 105, the access types supported by the target UE 105 for event reporting and whether the target UE 105 supports location reporting via a user plane). The LMF 152 may also obtain the target UE 105 location—e.g. if an initial UE 105 location is requested by external client 130 at stage 1.

At stage 15, and as part of stage 14, the LMF 152 sends a Periodic-Triggered Location Request to the target UE 105 via the serving AMF 154 by invoking an Namf_Communication_N1N2MessageTransfer service operation. The Periodic-Triggered Location Request carries the location request information received from the AMF 154 at stage 13, including the HGMLC 155H contact address, LDR reference number and user plane information. The Periodic-Triggered Location Request may indicate the allowed access types for location reporting at stage 25 (e.g. one or more of NR, LTE access to 5GCN 150V, LTE access to an EPC for the VPLMN, WLAN (e.g. IEEE 802.11 WiFi) access to 5GCN 150V) and may indicate certain allowed or required location measurements (or a location estimate) at stage 22 for each location event reported (e.g. based on the positioning capabilities of the target UE 105 obtained as part of stage 14 and the allowed access types).

At stage 16, if the request in stage 15 can be supported, the target UE 105 returns an acknowledgment to the LMF 152 as part of stage 14, which is transferred via the serving AMF 154 and delivered to the LMF 152 using an Namf_Communication_N1MessageNotify service operation. The target UE 105 may indicate in the acknowledgment whether user plane location reporting can be supported. The remaining stages here assume that location reporting via a user plane can be supported. When location reporting via a user plane cannot be supported, the procedure may continue according to a periodic and triggered 5GC-MT-LR procedure in which location reports are returned to the external client 130 via control plane signaling.

It is noted that the Periodic-Triggered Location Request sent at stage 15 and its acknowledgment at stage 16 may be messages for a positioning protocol (e.g. LPP) or may be messages for a separate protocol (e.g. a supplementary services protocol). In the latter case, each message may carry an embedded positioning protocol message to enable the LMF 152 to request or allow specific location measurements from the target UE 105 and/or specific position methods for UE based location.

At stage 17, the LMF 152 invokes an Nlmf_Location_DetermineLocation Response service operation towards the AMF 154 to respond to the request at stage 13. The response includes any location obtained at stage 14, a confirmation of whether periodic or triggered location was successfully activated in the target UE 105 according to stages 15 and 16, and an indication that user plane location reporting will be used. The LMF 152 may then release all resources for the location request and cease support for the procedure.

At stage 18, the AMF 154 invokes an Namf_Location_EventNotify service operation towards the VGMLC 155V and includes any location received at stage 17 and a confirmation of whether periodic or triggered location was successfully activated in the target UE 105, and an indication of user plane location reporting. The VGMLC 155V may be the same VGMLC 155V used in stages 5 and 6 or may be a different VGMLC 155V. In the case of a different VGMLC 155V, the AMF 154 includes the HGMLC 155H contact address and LDR reference number. The AMF 154 may then release all resources for the location request and cease support for the procedure.

At stage 19, the VGMLC 155V forwards the response received at stage 18 to the HGMLC 155H using the HGMLC 155H contact address received at stage 18 (for a different VGMLC 155V) or received and stored at stage 4 (for the same VGMLC 155V) and includes the LDR reference number. The VGMLC 155V may then release all resources for the location request and cease support for the procedure.

It is noted that as an optional optimization, instead of performing stages 18 and 19, the AMF 154 may invoke an Namf_Location_EventNotify service operation directly towards the HGMLC 155H (e.g. if a VGMLC 155V is not used or if the VGMLC 155V ceases support after stage 7).

At stage 20, the HGMLC 155H forwards the response to the external LCS client 130.

At stage 21, the target UE 105 monitors for occurrence of the trigger or periodic event(s) requested in stage 15. When a trigger event is detected and if the target UE 105 is camped on or connected to (or can otherwise access) an access type allowed by the LMF 152 at stage 15, the target UE 105 proceeds to stage 22. If the target UE 105 cannot access an allowed access type, the target UE 105 may skip reporting the trigger event or may report the trigger event at a later time when an allowed access type becomes available, according to requirements received from the LMF 152 at stage 15.

At stage 22, the target UE 105 obtains location measurements and from these determines a location estimate and possibly other location information (e.g. the target UE velocity and/or orientation) as requested at stage 15. The location measurements may be obtained by UE 105 at stage 22 (not shown in FIG. 9) by sending a request (e.g. an RRC or LPP request) using control plane signaling to an SgNB 110-1 for UE 105 or to a CgNB 110-2 in NG-RAN 112, where the SgNB 110-1 or the CgNB 110-2 measures UL signals transmitted by UE 105 and/or requests other NgNBs 110 to measure UL signals transmitted by UE 105 and return the measurements to the SgNB 110-1 or the CgNB 110-2. The SgNB 110-1 or the CgNB 110-2 may then return the location measurements to the UE 105 using control plane signaling. Alternatively or in addition, UE 105 may obtain location measurements of DL signals (e.g. PRS or TRS signals) transmitted, according to a control plane, by one or more gNBs 110 in NG-RAN 112. UE 105 may also obtain location measurements of signals from other sources (e.g. GNSS SVs 190 and/or WLAN APs) and/or from sensors in UE 105. UE 105 may then determine a location estimate for UE 105 from these location measurements and possibly using assistance data broadcast by and received from NG-RAN 112 or received using control plane signaling (e.g. at an earlier time) from an LMF 152 in 5GCN 150 or from an CgNB 110-2, LMC server or LLMF server in NG-RAN 112. At stage 23, the target UE 105 performs a service request if in CM idle state or a Resume Request if in RRC Inactive state.

At stage 24, if there is currently no TCP connection and/or TLS session between the target UE 105 and the external client 130 or UPA 153 (when a UPA 153 is used), the target UE 105 establishes a TCP connection and optional TLS session with the external client 130 or UPA 153 (if used). This may typically occur once only any time after stage 15. For location reporting directly to the external client 130, the target UE 105 may use an address of the external client 130 received at stage 15 to establish the TCP connection, and any ciphering and authentication key(s) received at stage 15 to establish a TLS session. For location reporting via a UPA 153, the target UE 105 may use an address for a UPA 153 received at stage 15. The target UE 105 may not need to be aware whether the TCP connection and TLS session are to the external client 130 or UPA 153 since the impacts to support establishment of the TCP connection and TLS session and sending of location reports may be identical for both cases.

In a variant of stage 24, when ULP is used to send location reports rather than HTTP, the UE 105 may establish a SUPL session with the external client 130 or UPA 153 if there is currently no SUPL session, which may include establishing a TCP connection and optional TLS session as described above. In this variant, UE 105 may indicate (e.g. at the ULP level and optionally in a SUPL START or SUPL TRIGGERED START message sent to the external client 130 or UPA 153 as part of stage 24) that the SUPL session is associated with the location request at stage 1. For example, UE 105 may include a location session reference sent by external client 130 at stage 1 in a SUPL START or SUPL TRIGGERED START message sent to external client 130 or UPA 153 as part of stage 24.

At stage 25, the target UE 105 sends a location report (also referred to as an event report) to the external client 130 or to a UPA 153 if a UPA 153 is used. The location report may include some or all of the location information determined at stage 22 as well as a target UE 105 identity (e.g. GPSI or SUPI), a location session reference, an address or indication of the external client 130, and/or the type of triggered or periodic event detected at stage 21. The location report may be sent as a user plane message according to the protocol layering described for FIG. 4. When the location report is sent to a UPA 153, the UPA 153 may forward the location report to the external client 130 using a separate TCP connection and optional TLS session as shown for FIG. 4. If HTTP is used to send the location report at stage 25, the location report may comprise an HTTP POST message. If ULP is used to send the location report at stage 25, the location report may comprise a ULP message such as a SUPL POS message, SUPL POS INIT message or a SUPL REPORT message.

At stage 26, optionally, the external client 130 may return an acknowledgment to the target UE 105 and via a UPA 153 if a UPA 153 is used. An acknowledgment may not be needed if an acknowledgement at the TCP level is considered to be sufficient. In some variants, an acknowledgment at stage 26 or a separate message from the external client 130 to the UE 105 may request some change to the location reporting such as a higher or lower periodicity of location reporting, a higher or lower location QoS or cancellation of location reporting. If HTTP is used to send the location report at stage 25, the acknowledgement at stage 26 may comprise an HTTP Status 204 (no content) message or HTTP Status 200 OK message.

At stage 27, the target UE 105 continues to monitor for further periodic or trigger events and instigates stages 22-26 each time a periodic or trigger event is detected.

At stage 28, in order to cancel the location request (e.g. if the target UE 105 is powered off or if the user wishes to cancel the location), the target UE 105 performs stage 23 if needed and then sends a Cancel Location request message to the serving AMF 154 using Non-Access Stratum (NAS) control plane signaling indicating that periodic or triggered location was cancelled. The target UE 105 includes the HGMLC 155H contact address and LDR reference number.

At stages 29-31, the AMF 154 forwards the cancelation request to a VGMLC 155V, the HGMLC 155H and external LCS client 130.

At stage 32, if the external LCS client 130 wishes to cancel the periodic or triggered location, the external LCS client 130 sends a request to the HGMLC 155H.

At stages 33-34, the HGMLC 155H determines the serving AMF 154 address as in stage 3 and forwards the cancelation request to the AMF 154 either directly or via a VGMLC 155V. The HGMLC 155H includes the HGMLC 155H contact address and the LDR reference number.

At stage 35, the AMF 154 sends the cancelation request to the target UE 105 as soon as the target UE 105 becomes reachable and includes the HGMLC 155H contact address and the LDR reference number. The target UE 105 then releases all resources for the location request.

It is noted that the cancellation request sent to the target UE 105 at stage 35 could be a message for supplementary services or a NAS message.

In one variant of the techniques described herein, referred to as the "SgNB variant", the CgNB 110-2 used to support location for a target UE 105 may typically or always be the serving gNB (SgNB) 110-1 for the target UE 105. The CgNB 110-2 used to support location for the target UE 105 may also change to a new SgNB 110-1 for the target UE 105 following a change of SgNB for the target UE 105. With the SgNB variant, the SgNB (e.g. SgNB 110-1) for a target UE 105 may maintain both an SgNB location context and a CgNB location context for target UE 105 location reporting, as described for Table 1. Certain signaling and procedural aspects described earlier may then not be used or may only be used occasionally. These may comprise signaling and procedural aspects related to selection of a CgNB 110-2 by an SgNB 110-1, transfer of a location request from an SgNB 110-1 to a CgNB 110-2, selection of a new CgNB 110-2 by an SgNB 110-1 following change of a serving cell or a serving gNB for a target UE, transfer of a location context from an SgNB 110-1 to a new CgNB 110-2 following change of a serving cell or a serving gNB for a target UE 105, and location measurement configuration and location reporting by a CgNB 110-2.

When the SgNB variant is used, some of the signaling and procedural aspects described previously for FIGS. 5-8 may be different. For example, in FIG. 5, SgNB 110-1 and CgNB 110-2 may be combined (i.e. may be the same entity), and thus stages 13 and 15 may not occur and measurement configuration for stage 14 of FIG. 5 and location reporting for stage 21 of FIG. 5 may be performed by SgNB 110-1 (rather than by CgNB 110-2). Similarly, in FIG. 6, SgNB 110-1 and CgNB 110-2 may be combined (i.e. may be the same entity), in which case stages 1-7 in FIG. 6 are performed by SgNB 110-1 (rather than by CgNB 110-2) and there is no signaling at stages 3-5 between SgNB 110-1 and CgNB 110-2, since these are the same entity. Similarly, also in FIG. 7, SgNB 110-1 and CgNB 110-2 may be combined (i.e. may be the same entity), in which case stage 1 and stages 3-8 in FIG. 7 are performed by SgNB 110-1 (rather than by CgNB 110-2), and there is no signaling at stages 3 and 4 between SgNB 110-1 and CgNB 110-2, since these are the same entity. In the case of FIG. 8, stages 1-10 may be performed as previously described with the difference that the old CgNB 110-2 is now the same entity as the old SgNB 110-1, and the location context transferred by the old SgNB 110-1 to the new SgNB 110-1' at stage 3 or stage 9 now includes an old SgNB location context (as described in Table 1), an old CgNB location context (as described on Table 1) and does not include an old CgNB 110-2 address. If the old SgNB 110-1 determines "sufficient connectivity" at stage 2 or stage 8 in FIG. 8, then the new SgNB 110-1' may perform stage 18 of FIG. 8 to reconfigure measurements for the new SgNB 110-1' (which is also the new CgNB 110-2'). If the old SgNB 110-1 determines "insufficient connectivity" at stage 2 or stage 8 in FIG. 8, then the old SgNB 110-1 may perform stage 21 of FIG. 8 as described previously to cancel previous location measurements and the new SgNB 110-1' may perform stage 24 of FIG. 8 to reconfigure a new set of measurements as previously described. Stages 11-17, 19-20, 22-23 and 25 of FIG. 8 may then not be performed. The "SgNB variant" may be applicable to both user plane location reporting by an SgNB and to control plane location reporting by an SgNB according to the "control plane variant" described previously for FIG. 7.

In another variant of the techniques described here, periodic or triggered location of a target UE 105 may be requested by an external LCS client 130 and activated in the target UE 105 using control plane signaling (e.g. according to stages similar to stages 1-20 in FIG. 9). In this variant, the periodic or triggered location of the target UE 105 may be supported using an LMF 152 in the 5GCN 150 for a serving PLMN for the target UE 105. The LMF 152 may receive a location event report from UE 105 whenever the UE 105 detects a periodic or triggered event. The LMF 152 may then optionally determine a location for the UE 105 using control plane signaling and may send a location event report containing the location (when the location is obtained) to the external client 130 via a user plane (e.g. using a TCP connection and optional TLS session between the LMF 152 and either the external client 130 or a UPA 153) and possibly using HTTP or ULP. With this variant, latency in sending the location event report from LMF 152 to external client 130 may be reduced in comparison to using control plane signaling to send a location event report from LMF 152 to external client 130.

Figure 10:
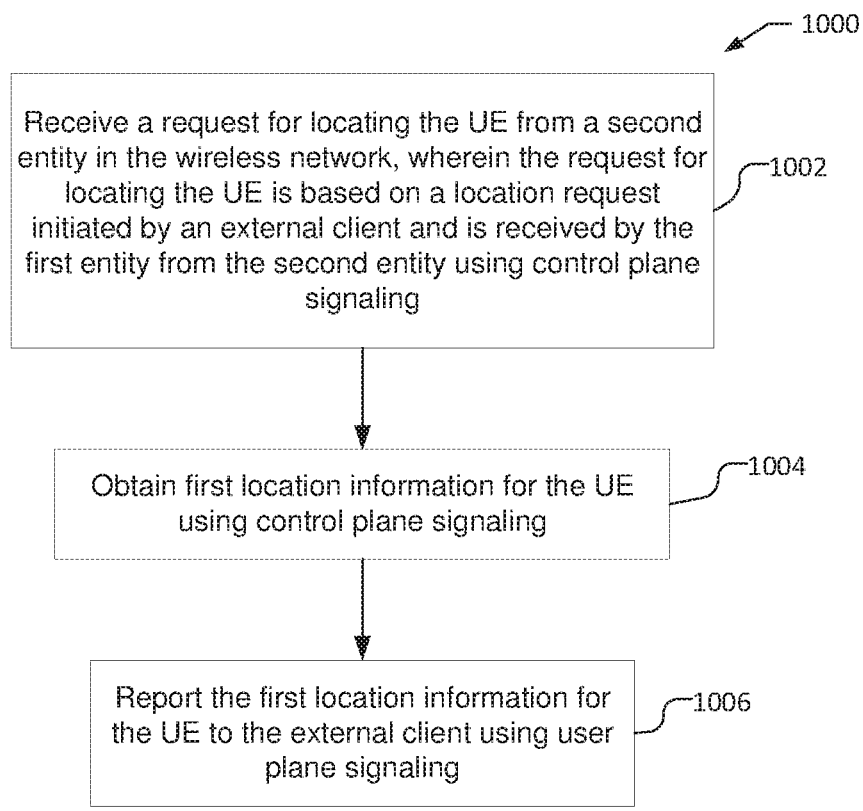
FIG. 10 shows a process flow illustrating a method for locating a user equipment (UE) performed by an entity in a wireless network, in which both control plane signaling and user plane signaling are used.

FIG. 10 shows a process flow 1000 illustrating a method for locating a user equipment (UE), such as the target UE 105, performed by a first entity in a wireless network, in which both control plane signaling and user plane signaling are used. The first entity, for example, may be the UE 105, an entity in the NG-RAN 112, such as the CgNB 110-2, the SgNB 110-1, an NgNB 110-3 or 110-4, an LMC server or an LLMF server.

Process flow 1000 may start at block 1002, where a request for locating the UE is received from a second entity in the wireless network, where the request for locating the UE is based on a location request initiated by an external client (e.g. the external client 130) and is received by the first entity from the second entity using control plane signaling, e.g., as described at one of stage 11 or 13 in FIG. 5, or stage 3, 9, 17 or 23 of FIG. 8, or stage 15 in FIG. 9. The second entity, for example, may be, one of an AMF (e.g. the AMF 154), an LMF (e.g. the LMF 152), an SgNB (e.g. the SgNB 110-1), or a previous CgNB (e.g. the CgNB 110-2) for locating the UE. At block 1004, first location information for the UE is obtained using control plane signaling, e.g., as described in FIG. 6 and for stages 2-6 for FIG. 7 in the case of first entity that is a CgNB, SgNB, LMC server or LLMF server, or as described for stage 22 of FIG. 9 in the case of a first entity that is a UE. At block 1006, the first location information for the UE is reported to the external client using user plane signaling, e.g., as described at stage 21 of FIG. 5, stage 7 of FIG. 7, stage 25 of FIG. 9 and for FIGS. 3 and 4.

In one implementation, the first location information for the UE is reported to the external client using user plane signaling by sending a message for the Hypertext Transfer Protocol (HTTP) or the Secure User Plane Location (SUPL) UserPlane Location Protocol (ULP) to the external client, e.g. as described for stage 7 of FIG. 7 and stage 25 of FIG. 9. The message for the HTTP may be an HTTP POST message and the message for the SUPL ULP may be a SUPL POS message, SUPL POS INIT message or SUPL REPORT message.

In one implementation, information for the location request initiated by the external client is transferred to the second entity using control plane signaling, e.g., as described at stages 1-8 and stages 11-13 in FIG. 5 and stages 1-8 and stage 13 in FIG. 9.

In one implementation, a confirmation of the request for locating the UE is returned to the second entity using control plane signaling, e.g., as described at stage 15 and stage 16 in FIG. 5, stage 19 of FIG. 8B, and stage 16 of FIG. 9. In one implementation, the confirmation of the request for locating the UE is transferred from the second entity to the external client using control plane signaling, e.g., as described at stages 16-20 of FIG. 5 or stages 17-20 of FIG. 9.

In one implementation, the request for locating the UE received by the first entity includes an indication of using user plane signaling to report the location information and an address to which the location information is to be reported, e.g., as described at stages 1, 3, 5, 7, 11, and 13 of FIG. 5, and stages 1, 4, 5, 13 and 15 of FIG. 9. The first entity may establish a first user plane connection to at least one of the external client or a third entity (e.g. a UPA such as UPA 153) based on the address, where the third entity (if used) establishes a second user plane connection towards the external client, where the location information is reported using the first user plane connection or the first and second user plane connections, e.g., as described for FIGS. 3 and 4, and at stages 1 and 7 of FIG. 7 or stages 24 and 25 of FIG. 9. The first and second user plane connections may be each based on at least one of the Internet Protocol (IP), the Transmission Control Protocol (TCP), Transport Layer Security (TLS), or some combination of these, e.g., as described for FIGS. 3 and 4, stage 1 of FIG. 7 and stage 24 of FIG. 9. In some implementations, at least one of the first user plane connection and the second user plane connection use ciphering and mutual authentication, e.g., as described for FIGS. 3 and 4, stage 1 of FIG. 7 and stage 24 of FIG. 9.

In one implementation, the first location information for the UE comprises a plurality of sets of location information for the UE obtained at different first times by the first entity and is reported to the external client by the first entity using the user plane signaling immediately following each of the different first times, e.g., as described for FIG. 7 and for stages 21-27 of FIG. 9. Each set of location information may comprise at least one of an absolute location estimate for the UE, a relative location estimate for the UE, a linear velocity for the UE, an angular velocity for the UE, a linear acceleration for the UE, an angular acceleration for the UE, an angular orientation for the UE, an identification of a trigger event, or some combination of these. The different first times, for example, may be at least one of periodic times or times for trigger events. The trigger events, for example, may comprise at least one of an area event, a motion event or a velocity event.

In one implementation, referred to as implementation IL the first entity may be the UE (e.g. UE 105), as described in FIG. 9, where the wireless network comprises a 5G System (5GS) (e.g. the NG-RAN 112 and 5GCN 150), and the second entity may be a serving Access and Mobility Management Function (AMF) for the UE (e.g. the AMF 154), a Location Management Function (LMF) (e.g. the LMF 152)), a Controlling NR Node B (CgNB) for locating the UE (e.g. CgNB 110-2), a Location Management Component (LMC) server or a Local Location Management Function (LLMF) server.

In the implementation IL the first location information for the UE may be reported to the external client using user plane signaling using a Protocol Data Unit (PDU) session for the UE. In the implementation IL the process may further include monitoring for an occurrence of each of the first times; obtaining location measurements at each of the first times for at least one of signals received from a plurality of transmission points (TPs), signals received from entities outside the 5GS, or inertial sensors of the UE; determining at least some of the first location information at each of the first times based on the location measurements obtained at each of the first times; and sending the at least some of the first location information to the external client following each of the first times using the user plane signaling, e.g., as described at stages 21-27 of FIG. 9. In the implementation IL the location measurements, for example, may include at least one of a time of arrival (TOA), a receive time-transmission time difference (Rx-Tx), a round trip signal propagation time (RTT), angle of arrival (AOA), angle of departure (AOD), received signal strength indication (RSSI), reference signal received power (RSRP), reference signal received quality (RSRQ), Global Navigation Satellite System (GNSS) code phase, GNSS carrier phase, sensor measurements, or some combination of these. In the implementation I1, the plurality of TPs may include at least one of a New Radio (NR) Node B (gNB) (e.g. a gNB 110), an evolved Node B (eNB), a Location Transmission Unit (LTU), or some combination of these.

In another implementation, referred to as implementation I2, the first entity may be an entity in a next generation Radio Access Network (NG-RAN) (e.g. NG-RAN 112) providing 5G New Radio (NR) wireless access to the UE. In implementation I2, the UE may remain in a Connection Management (CM) Connected state and in either a Radio Resource Control (RRC) Connected state or an RRC Inactive state, e.g., as discussed for FIG. 8A. In implementation I2, the first entity may be a Controlling NR Node B (CgNB) for locating the UE (e.g. CgNB 110-2), where the CgNB comprises a Serving NR Node B (SgNB) for the UE (e.g. SgNB 110-1), a Neighbor NR Node B (NgNB) for the UE (e.g. NgNB 110-3 or 110-4), a first Location Management Component (LMC) server or a first Local Location Management Function (LLMF) server. The CgNB may comprise the SgNB, where the second entity is a serving Access and Mobility Management Function (AMF) for the UE (e.g. AMF 154). The CgNB may instead comprise the NgNB, the first LMC server or the first LLMF server, where the second entity is the SgNB. The second entity may alternatively comprise a previous CgNB for locating the UE (e.g. as described for FIGS. 8A and 8B), where the request for locating the UE is received from the previous CgNB in response to a change of a serving cell for the UE or a change of a previous SgNB for the UE, as discussed, e.g., at stage 17 of FIG. 8B. The request for locating the UE for example, may indicate the change of the serving cell or the change of the previous SgNB, where the request for locating the UE further comprises a location context as discussed, e.g., at stage 17 of FIG. 8B. The location context may include, at least one of: (i) information for the location request initiated by the external client; (ii) an indication of a plurality of RPs; (iii) an indication of a plurality of TPs; (iv) an indication of location measurements configured in the UE; (v) an indication of location measurements configured in the plurality of RPs; (vi) an indication of DL reference signals (RSs) transmitted by the plurality of TPs (vii) an indication of UL signals transmitted by the UE; (viii) a location session identifier; (ix) location capabilities of the UE; or (x) some combination of these, e.g. as described for Table 1.

In implementation I2, location capabilities of the UE may be obtained when the first entity does not have the location capabilities of the UE, e.g., as discussed at stage 1 of FIG. 6. In implementation I2, the process may further include: (i) receiving first location measurements for the UE from at least one of the UE or a first plurality of Reception Points (RPs), where the first location measurements are received using control plane signaling, where the first location measurements received from the first plurality of RPs comprise location measurements of first uplink (UL) signals transmitted by the UE, where the first location measurements received from the UE include at least one of location measurements of first downlink (DL) reference signals (RSs) transmitted by a first plurality of Transmission Points (TPs) or other location measurements, where the first plurality of TPs comprise at least one of the first entity, the SgNB, at least one NgNB or at least one Location Transmission Unit (LTU), where the first plurality of RPs comprise at least one of the first entity, the SgNB, at least one NgNB or at least one Location Measurement Unit (LMU), where the at least one of the UE or the first plurality of RPs obtain the first location measurements at different second times; and (ii) obtaining the plurality of sets of location information for the UE based on the first location measurements received from the at least one of the UE or the first plurality of RPs, e.g., as discussed for FIGS. 6 and 7. In implementation I2, the process may also include configuring at least some of the first location measurements in the at least one of the UE or the first plurality of RPs when not all of the first location measurements are initially configured in the at least one of the UE or the first plurality of RPs, where the at least some of the first location measurements configured in the UE are based on the location capabilities of the UE, where the configuring at least some of the first location measurements uses control plane signaling—e.g., as discussed in FIG. 6 and stages 12, 18 and 24 of FIG. 8. In implementation I2, the process may also include configuring in the UE at least some of the first UL signals transmitted by the UE when not all of the first UL signals are initially configured in the UE, where the configuring the transmission of the at least some of the first UL signals in the UE is based on the location capabilities of the UE, where the configuring in the UE at least some of the first UL signals uses control plane signaling, e.g., as discussed in FIG. 6 and stages 12, 18 and 24 of FIG. 8. In implementation I2, the process may further include configuring in the first plurality of TPs at least some of the first DL RSs transmitted by the first plurality of TPs when not all of the first DL RSs transmitted by the first plurality of TPs are initially configured in the first plurality of TPs, where the configuring in the first plurality of TPs at least some of the first DL RSs uses control plane signaling, e.g., as discussed in FIG. 6 and stages 12, 18 and 24 of FIG. 8. In implementation I2, the first location measurements received from the UE may include at least one of a time of arrival (TOA), a receive time-transmission time difference (Rx-Tx), round trip signal propagation time (RTT), angle of arrival (AOA), angle of departure (AOD), received signal strength indication (RSSI), reference signal received power (RSRP), reference signal received quality (RSRQ), Global Navigation Satellite System (GNSS) code phase, GNSS carrier phase, WiFi AP RTT, WiFi AP RSSI, sensor measurements, or some combination of these. In implementation I2, the first location measurements received from the first plurality of RPs may include at least one of a time of arrival (TOA), a receive time-transmission time difference (Rx-Tx), round trip signal propagation time (RTT), angle of arrival (AOA), angle of departure (AOD), received signal strength indication (RSSI), reference signal received power (RSRP), reference signal received quality (RSRQ), or some combination of these. In implementation I2, at least some of the first DL RSs may comprise DL positioning reference signals (PRSs), DL Tracking Reference Signals (TRSs) or both DL PRSs and DL TRSs. In implementation I2, at least some of the first UL signals may comprise UL positioning reference signals (PRSs).

In implementation I2, the process may further include receiving an indication of a new SgNB or a new serving cell for the UE, and determining to continue obtaining the first location information for the UE using control plane signaling and continue reporting the first location information for the UE to the external client using user plane signaling, e.g., as discussed for Case A of FIG. 8A. The indication of the new SgNB or the new serving cell may be received from the new SgNB using control plane signaling, where the indication of the new SgNB or the new serving cell may further include an indication of sufficient connectivity, where the determining to continue obtaining the first location information for the UE and continue reporting the first location information for the UE to the external client may be based at least in part on the indication of sufficient connectivity, e.g., as discussed for case A of FIG. 8A. The process may further include at least one of: (i) configuring second location measurements for the UE in at least one of the UE or a second plurality of RPs, based on the indication of the new SgNB or the new serving cell; (ii) configuring transmission of second UL signals by the UE, based on the indication of the new SgNB or the new serving cell; (iii) configuring transmission of second DL RSs by a second plurality of TPs, based on the indication of the new SgNB or the new serving cell; (iv) cancelling at least some of the first location measurements for the UE in at least one of the UE or the first plurality of RPs, based on the indication of the new SgNB or the new serving cell; (v) cancelling the transmission of at least some of the first UL signals by the UE, based on the indication of the new SgNB or the new serving cell; or (vi) cancelling the transmission of at least some of the first DL RSs in the first plurality of TPs, based on the indication of the new SgNB or the new serving cell.

In implementation I2, the process may further include receiving an indication of a new SgNB or a new serving cell for the UE; and determining to cease obtaining the first location information for the UE using control plane signaling and cease reporting the first location information for the UE to the external client using user plane signaling, based on the indication of the new SgNB or the new serving cell for the UE, e.g., as discussed for Case B and Case C of FIG. 8. For example, the indication of the new SgNB or the new serving cell may be received from the new SgNB for the UE, and the process may then further include: determining a fourth entity, where the fourth entity comprises a new CgNB for locating the UE, where the new CgNB comprises the new SgNB, a new NgNB for the UE, a second LMC server or a second LLMF server, where the fourth entity is different than the first entity; and sending a location context for the UE to the fourth entity, where the location context enables the fourth entity to obtain second location information for the UE using control plane signaling and report the second location information for the UE to the external client using user plane signaling. The fourth entity may be determined based on the indication of the new SgNB or the new serving cell for the UE or based on an indication of the fourth entity received from the new SgNB. The location context may comprise at least one of: (i) information for the request for locating the UE received from the second entity; (ii) an indication of the first plurality of RPs; (iii) an indication of the first plurality of TPs; (iv) an indication of the first location measurements configured in the UE; (v) an indication of the first location measurements configured in the first plurality of RPs; (vi) an indication of the first DL RSs transmitted by the first plurality of TPs; (vii) an indication of the first UL signals transmitted by the UE; (viii) a location session identifier; (ix) the location capabilities of the UE; or (x) some combination of these, e.g. as described in Table 1.

In another example of the implementation I2, the indication of the new SgNB is received from an old SgNB for the UE, e.g., as discussed at stage 20 of FIG. 8B, where the indication of the new SgNB further includes an indication of insufficient connectivity, where the determining to cease obtaining the first location information and cease reporting the first location information may be based on the indication of insufficient connectivity, e.g., as discussed at stage 21 of FIG. 8B. In this example, the process may include at least one of: cancelling the first location measurements for the UE in at least one of the UE or the first plurality of RPs; cancelling the transmission of the first UL signals by the UE; cancelling the transmission of at least some of the first DL RSs in the first plurality of TPs; or some combination of these, e.g., as discussed at stage 21 of FIG. 8B.

Figure 11:
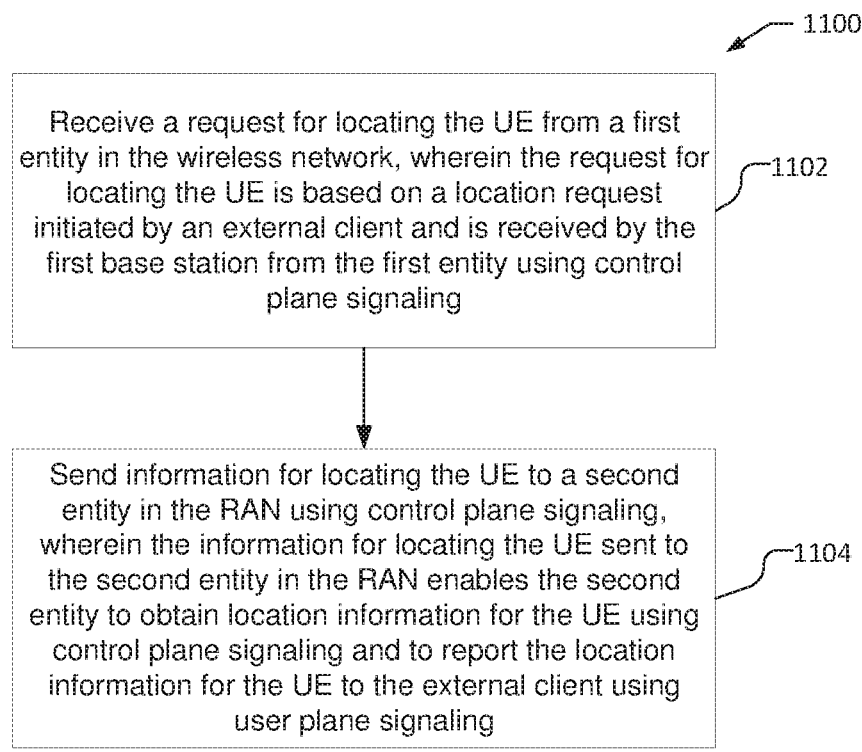
FIG. 11 shows a process flow illustrating a method for locating a user equipment (UE) performed by a serving base station in a Radio Access Network (RAN) for a wireless network, in which both control plane signaling and user plane signaling are used.

FIG. 11 shows a process flow 1100 illustrating a method for locating a user equipment (UE), such as the UE 105, performed by a first base station in a Radio Access Network (RAN) for a wireless network, where the first base station is a serving base station for the UE, and in which both control plane signaling and user plane signaling are used.

Process flow 1100 may start at block 1102, where a request for locating the UE is received from a first entity in the wireless network, where the request for locating the UE is based on a location request initiated by an external client and is received by the first base station from the first entity using control plane signaling, e.g. as described for stage 11 in FIG. 5 and stages 3 and 9 in FIG. 8. At block 1104, information for locating the UE is sent to a second entity in the RAN using control plane signaling, where the information for locating the UE sent to the second entity in the RAN enables the second entity to obtain location information for the UE using control plane signaling and to report the location information for the UE to the external client using user plane signaling.

In one implementation, the RAN is a next generation Radio Access Network (NG-RAN) providing 5G New Radio (NR) wireless access to the UE and the first base station is a Serving NR Node B (SgNB) for the UE (e.g. SgNB 110-1).

In one implementation, the first entity is a serving Access and Mobility Management Function (AMF) for the UE, such as AMF 154, where the information for locating the UE comprises information for the request for locating the UE, e.g., as discussed for stage 11 of FIG. 5.

In one implementation, the first entity is a previous SgNB for the UE (e.g. SgNB 110-1), where the information for locating the UE comprises at least one of an identity for the first base station or information for the request for locating the UE, e.g. as discussed for stage 3 and stage 9 of FIG. 8.

In one implementation, the second entity is a Controlling NR Node B (CgNB) for locating the UE (e.g. CgNB 110-2), where the CgNB comprises an NR Node B (gNB), a Neighbor gNB (NgNB) for the UE (e.g. NgNB 110-3 or NgNB 110-4), a Location Management Component (LMC) server or a Local Location Management Function (LLMF) server.

In one implementation, the process may further include: identifying a change of SgNB for the UE, where the change of SgNB is to a new SgNB, e.g., as discussed for stage 1 and stage 7 of FIG. 8; determining if there is sufficient signaling connectivity between the second entity and the new SgNB, and between the second entity and NgNBs for the new SgNB, to enable location reporting for the UE to continue at the second entity (e.g. as at stages 2 and 8 for FIG. 8); and sending a message to or towards the new SgNB, where the message comprises an indication of whether or not there is sufficient signaling connectivity and a location context for the UE, where the message enables a continuation of location information reporting for the UE to the external client following the change of SgNB (e.g. as at stages 3 and 9 for FIG. 8). For example, identifying the change of SgNB for the UE may be based on determining a handover for the UE to a serving cell for the new SgNB, where the handover is for a Radio Resource Control (RRC) Connected state for the UE, where the message comprises a Handover Request, e.g., as discussed for stages 1-3 of FIG. 8A. In another example, identifying the change of SgNB for the UE may be based on receiving a request for a UE context from the new SgNB, where the message comprises a response to the request for the UE context, e.g. as discussed for stages 7-9 for FIG. 8. The UE context may enable the UE to transition from a Radio Resource Control (RRC) Inactive state to an RRC Connected state or to perform a RAN-based Notification Area (RNA) update. The location context may include at least one of information for the request for locating the UE or an indication of the second entity, e.g. as described for stages 3 and 9 for FIG. 8.

Figure 12:
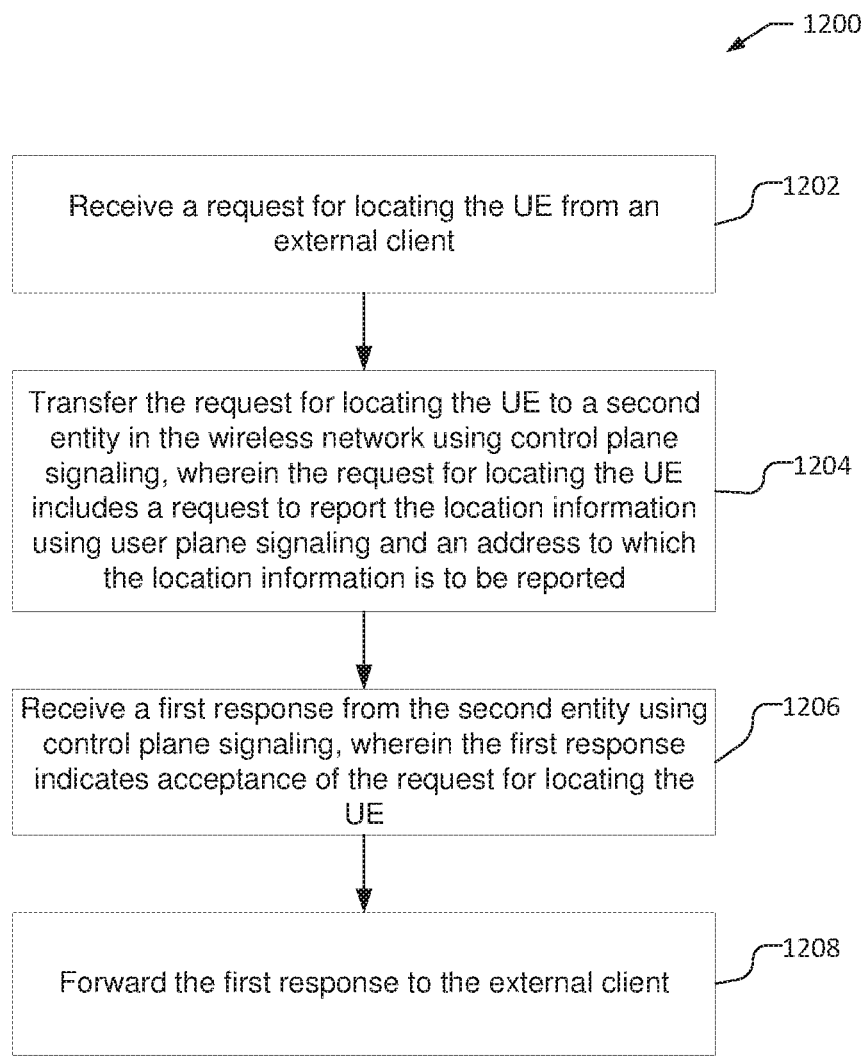
FIG. 12 shows a process flow illustrating another method for locating a user equipment (UE) performed by an entity in a wireless network, in which both control plane signaling and user plane signaling are used.

FIG. 12 shows a process flow 1200 illustrating a method for locating a user equipment (UE), such as the UE 105, performed by a first entity in a wireless network, such as GMLC 155 or NEF 159, and in which both control plane signaling and user plane signaling are used.

Process flow 1200 may start at block 1202, where a request for locating the UE is received from an external client, e.g., as discussed at stage 1 and stage 5 of FIG. 5 and stage 1 and stage 4 of FIG. 9. At block 1204, the request for locating the UE is transferred to a second entity in the wireless network using control plane signaling, where the request for locating the UE includes a request to report the location information using user plane signaling and an address to which the location information is to be reported, e.g. as discussed for stage 3 and stage 7 for FIG. 5 and stage 4 and stage 5 for FIG. 9. At block 1206, a first response is received from the second entity using control plane signaling, where the first response indicates acceptance of the request for locating the UE, e.g. as discussed for stage 3 and stage 7 for FIG. 5 and stage 6 and stage 7 for FIG. 9. At block 1208, the first response is forwarded to the external client, e.g. as discussed for stage 4 and stage 8 for FIG. 5 and stage 8 for FIG. 9.

In one implementation, the wireless network comprises a 5G System (5GS), where the first entity comprises a Gateway Mobile Location Center (GMLC) (e.g. GMLC 155) or a Network Exposure Function (NEF) (e.g. NEF 159), and where the second entity comprises a serving Access and Mobility Management Function (AMF) for the UE (e.g. AMF 154).

In one implementation, the process may further include: sending a query to a third entity (e.g. a UDM such as UDM 156) for an address of the second entity prior to transferring the request for locating the UE to the second entity; and receiving from the third entity the address of the second entity, e.g. as discussed for stage 2 and stage 6 for FIG. 5 and stage 3 for FIG. 9.

In one implementation, the process may further include: receiving a second response from the second entity using control plane signaling, where the second response indicates activation of the request for locating the UE in a Radio Access Network (RAN), where the RAN provide wireless access to the UE (e.g. as discussed for stage 17 and stage 19 for FIG. 5 and stage 18 and stage 19 for FIG. 9); and forwarding the second response to the external client, e.g. as discussed for stage 18 and stage 20 for FIG. 5 and stage 20 for FIG. 9.

Figure 13:
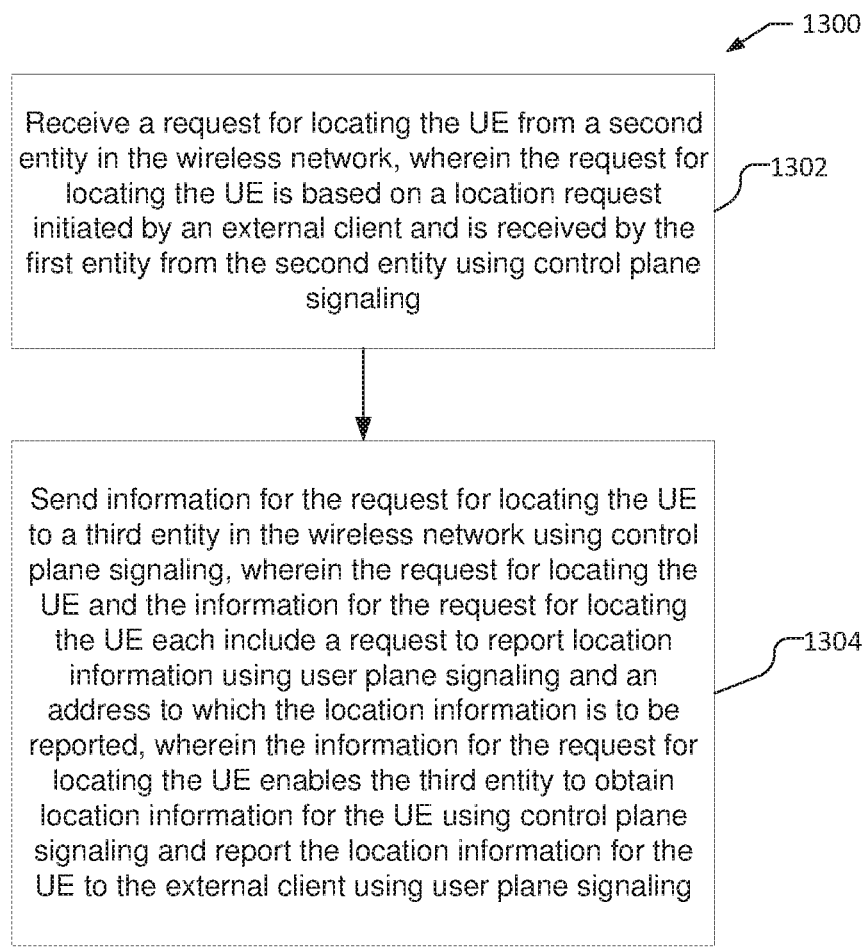
FIG. 13 shows a process flow illustrating another method for locating a user equipment (UE) performed by an entity in a wireless network in which both control plane signaling and user plane signaling are used.

FIG. 13 shows a process flow 1300 illustrating a method for locating a user equipment (UE), such as the UE 105, performed by a first entity in a wireless network, such as AMF 154 or LMF 152, and in which both control plane signaling and user plane signaling are used.

Process flow 1300 may start at block 1302, where a request for locating the UE is received from a second entity in the wireless network, where the request for locating the UE is based on a location request initiated by an external client and is received by the first entity from the second entity using control plane signaling, e.g. as discussed for stage 3 and stage 7 for FIG. 5 and stage 13 for FIG. 9. At block 1304, information for the request for locating the UE is sent to a third entity in the wireless network using control plane signaling, where the request for locating the UE and the information for the request for locating the UE each include a request to report location information using user plane signaling and an address to which the location information is to be reported, and where the information for the request for locating the UE enables the third entity to obtain location information for the UE using control plane signaling and report the location information for the UE to the external client using user plane signaling (e.g. as discussed for stage 11 for FIG. 5 and stage 13 for FIG. 9).

In one implementation, the wireless network is a 5G System (5GS), where the first entity comprises a serving Access and Mobility Management Function (AMF) for the UE (e.g. AMF 154), where the second entity comprises a Gateway Mobile Location Center (GMLC) (e.g. GMLC 155) or a Network Exposure Function (NEF) (e.g. NEF 159), and where the third entity comprises a serving NR Node B (SgNB) for the UE (e.g. SgNB 110-1).

In one implementation, the wireless network is a 5G System (5GS), where the first entity comprises a Location Management Function (LMF) (e.g. LMF 152), where the second entity comprises a serving Access and Mobility Management Function (AMF) for the UE (e.g. AMF 154), and where the third entity comprises the UE.

In one implementation, the process may further include: receiving a response from the third entity using control plane signaling, where the response indicates an activation or a confirmation of the request for locating the UE in the third entity (e.g. as discussed for stage 16 for FIG. 5 and stage 17 for FIG. 9); and forwarding the response to the second entity, e.g. as discussed for stage 17 and stage 19 for FIG. 5 and stage 18 for FIG. 9.

Figure 14:
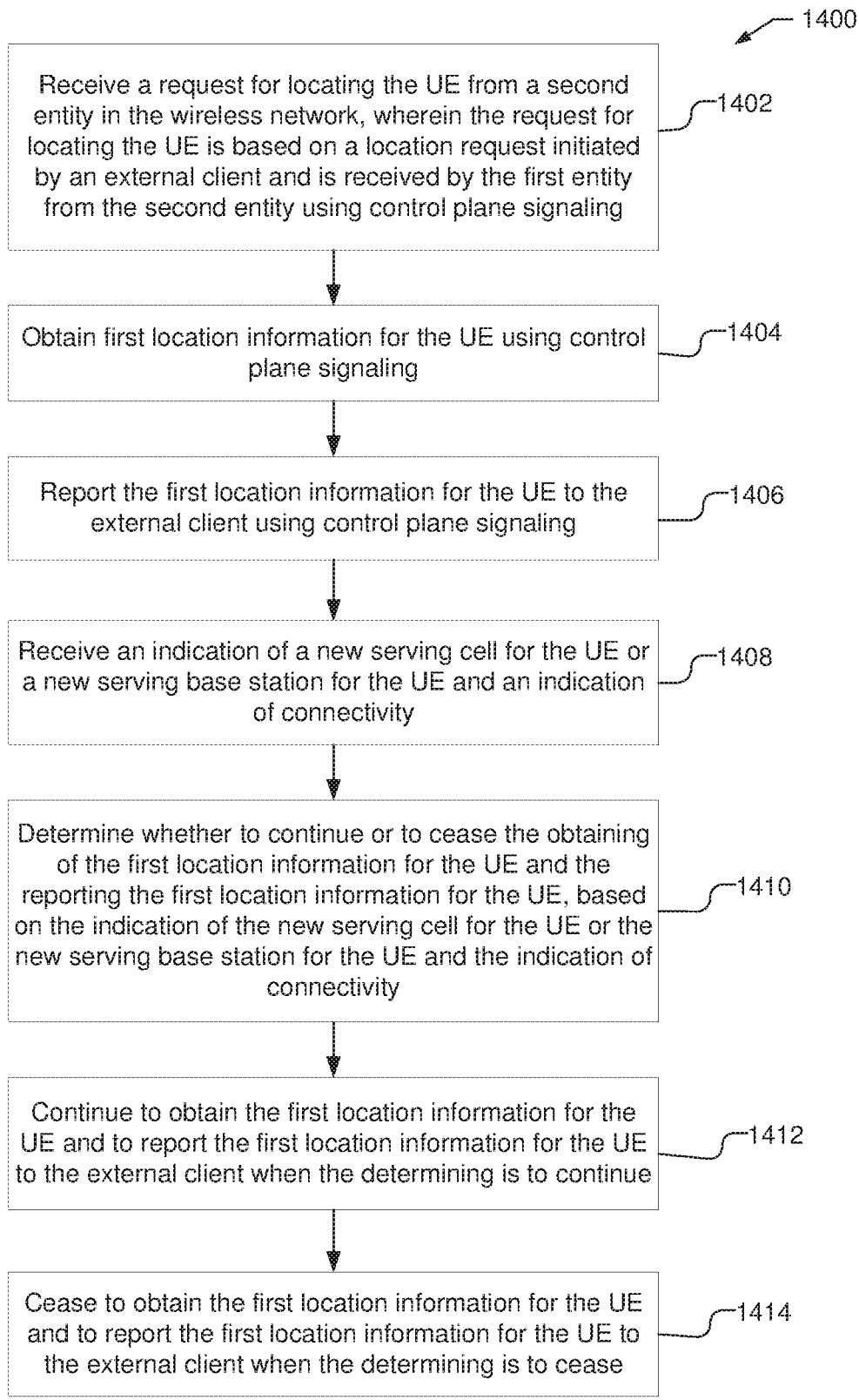
FIG. 14 shows a process flow illustrating another method for locating a user equipment (UE) performed by a first entity in a wireless network.

FIG. 14 shows a process flow 1400 illustrating a method for locating a user equipment (UE), such as the UE 105, performed by a first entity in a wireless network. The first entity, for example, may be an entity in the NG-RAN 112, such as the CgNB 110-2, the SgNB 110-1, an NgNB 110-3 or 110-4, an LMC server or an LLMF server.

Process flow 1400 may start at block 1402, where a request for locating the UE is received from a second entity in the wireless network, where the request for locating the UE is based on a location request initiated by an external client and is received by the first entity from the second entity using control plane signaling, e.g., as described at one of stage 11 or 13 in FIG. 5, or stage 3, 9, 17 or 23 of FIG. 8B. The second entity, for example, may be, one of an AMF (e.g. the AMF 154), an SgNB (e.g. the SgNB 110-1), or a previous CgNB (e.g. the CgNB 110-2) for locating the UE. At block 1404, first location information for the UE is obtained using control plane signaling e.g., as described in FIG. 6 and for stages 2-6 for FIG. 7. At block 1406, the first location information for the UE is reported to the external client using control plane signaling, e.g. as described for the control plane variant for FIG. 7. At block 1408, an indication is received of a new serving cell for the UE or a new serving base station for the UE and an indication of connectivity, e.g., as described for stages 11 and 15 for FIG. 8. At block 1410, the first entity determines whether to continue or to cease the obtaining of the first location information for the UE and the reporting the first location information for the UE, based on the indication of the new serving cell for the UE or the new serving base station for the UE and the indication of connectivity, e.g., as described for stage 11 and stage 15 for FIG. 8. At block 1412, the first entity continues to obtain the first location information for the UE and to report the first location information for the UE to the external client when the determining is to continue, e.g., as described for stage 12 and stage 13 for FIG. 8. At block 1414, the first entity ceases to obtain the first location information for the UE and to report the first location information for the UE to the external client when the determining is to cease, e.g., as described for stage 19 for FIG. 8.

In one implementation, information for the location request initiated by the external client is transferred to the second entity using control plane signaling.

In one implementation, the process further includes returning a confirmation of the request for locating the UE to the second entity using control plane signaling, e.g. as described for stage 15 and stage 16 for FIG. 5 and stage 19 and stage 25 for FIG. 8. In this implementation, the confirmation of the request for locating the UE may be transferred from the second entity to the external client using control plane signaling.

In one implementation, the first location information for the UE comprises a plurality of sets of location information for the UE obtained at different first times by the first entity and reported to the external client by the first entity using control plane signaling immediately following each of the different first times, e.g. as described for the control plane variant for FIG. 7. Each set of location information may be at least one of an absolute location estimate for the UE, a relative location estimate for the UE, a linear velocity for the UE, an angular velocity for the UE, a linear acceleration for the UE, an angular acceleration for the UE, an angular orientation for the UE, an identification of a trigger event, or some combination of these. The different first times, for example, may comprise at least one of periodic times or times for trigger events. The trigger events may comprise at least one of an area event, a motion event or a velocity event.

By way of example, the RAN may be a next generation RAN (NG-RAN) providing 5G New Radio (NR) wireless access to the UE. The UE may remain in a Connection Management (CM) Connected state and in either a Radio Resource Control (RRC) Connected state or an RRC Inactive state. The first entity may be a Controlling NR Node B (CgNB) for locating the UE (e.g. CgNB 110-2), where the CgNB comprises a Serving NR Node B (SgNB) for the UE (e.g. SgNB 110-1), a Neighbor NR Node B (NgNB) for the UE (e.g. NgNB 110-3 or NgNB 110-4), a first Location Management Component (LMC) server or a first Local Location Management Function (LLMF) server. The CgNB may comprise the SgNB, where the second entity is a serving Access and Mobility Management Function (AMF) for the UE (e.g. AMF 154). The CgNB may alternatively comprise the NgNB, the first LMC server or the first LLMF server, where the second entity is the SgNB.

In one implementation, the second entity may comprise a previous CgNB for locating the UE, where the request for locating the UE is received from the previous CgNB in response to a change of a serving cell for the UE or a change of a previous SgNB for the UE, as discussed, e.g., at stage 17 of FIG. 8B. In this implementation, the request for locating the UE may indicate the change of the serving cell or the change of the previous SgNB, where the request for locating the UE further comprises a location context. The location context may include at least one of: (i) information for the location request initiated by the external client; (ii) an indication of a plurality of Reception Points (RPs); (iii) an indication of a plurality of Transmission Points (TPs); (iv) an indication of location measurements configured in the UE; (v) an indication of location measurements configured in the plurality of RPs; (vi) an indication of downlink (DL) reference signals (RSs) transmitted by the plurality of TPs (vii) an indication of uplink (UL) signals transmitted by the UE; (viii) a location session identifier; (ix) location capabilities of the UE; or (x) some combination of these.

In one implementation, referred to as implementation I3, the process may further include obtaining location capabilities of the UE when the first entity does not have the location capabilities of the UE, e.g. as described for stage 1 for FIG. 6. In implementation I3, the process may further include receiving first location measurements for the UE from at least one of the UE or a first plurality of Reception Points (RPs), where the first location measurements are received using control plane signaling, where the first location measurements received from the first plurality of RPs comprise location measurements of first uplink (UL) signals transmitted by the UE, where the first location measurements received from the UE include at least one of location measurements of first downlink (DL) reference signals (RSs) transmitted by a first plurality of Transmission Points (TPs) or other location measurements, where the first plurality of TPs comprise at least one of the first entity, the SgNB, at least one NgNB or at least one Location Transmission Unit (LTU), where the first plurality of RPs comprise at least one of the first entity, the SgNB, at least one NgNB or at least one Location Measurement Unit (LMU), where the at least one of the UE or the first plurality of RPs obtain the first location measurements at different second times, e.g. as described for stage 4 and stage 5 for FIG. 7. In implementation I3, the process may also include obtaining the plurality of sets of location information for the UE based on the first location measurements received from the at least one of the UE or the first plurality of RPs, e.g. as described for stage 6 for FIG. 7. In implementation I3, the process may also include configuring at least some of the first location measurements in the at least one of the UE or the first plurality of RPs when not all of the first location measurements are initially configured in the at least one of the UE or the first plurality of RPs, where the at least some of the first location measurements configured in the UE are based on the location capabilities of the UE, where the configuring at least some of the first location measurements uses control plane signaling, e.g. as described for stages 4-7 for FIG. 6 and stages 12, 18 and 24 of FIG. 8. The process may then further include configuring in the UE at least some of the first UL signals transmitted by the UE, when not all of the first UL signals are initially configured in the UE, where the configuring the transmission of the at least some of the first UL signals in the UE is based on the location capabilities of the UE, where the configuring in the UE at least some of the first UL signals uses control plane signaling, e.g. as described for stages 6 and 7 for FIG. 6 and stages 12, 18 and 24 of FIG. 8. The process may then also further include configuring in the first plurality of TPs at least some of the first DL RSs transmitted by the first plurality of TPs when not all of the first DL RSs transmitted by the first plurality of TPs are initially configured in the first plurality of TPs, where the configuring in the first plurality of TPs at least some of the first DL RSs uses control plane signaling, e.g. as described for stage 3 for FIG. 6 and stages 12, 18 and 24 of FIG. 8. In implementation I3, the first location measurements received from the UE may include at least one of a time of arrival (TOA), a receive time-transmission time difference (Rx-Tx), round trip signal propagation time (RTT), angle of arrival (AOA), angle of departure (AoD), received signal strength indication (RSSI), reference signal received power (RSRP), reference signal received quality (RSRQ), Global Navigation Satellite System (GNSS) code phase, GNSS carrier phase, WiFi AP RTT, WiFi AP RSSI, sensor measurements, or some combination of these. In implementation I3, the first location measurements received from the first plurality of RPs may include at least one of a time of arrival (TOA), a receive time-transmission time difference (Rx-Tx), round trip signal propagation time (RTT), angle of arrival (AOA), received signal strength indication (RSSI), reference signal received power (RSRP), reference signal received quality (RSRQ), or some combination of these. In implementation I3, at least some of the first DL RSs may comprise DL positioning reference signals (PRSs), DL Tracking Reference Signals (TRSs) or both DL PRSs and DL TRSs. At least some of the first UL signals may comprise UL positioning reference signals (PRSs).

In implementation I3, the process may further include: receiving an indication of a new SgNB or a new serving cell for the UE; and determining to continue obtaining the first location information for the UE and reporting the first location information for the UE to the external client, e.g. as described for case A of FIG. 8. The indication of the new SgNB or the new serving cell may be received from the new SgNB (e.g. as described for stage 11 of FIG. 8), where the indication of the new SgNB or the new serving cell further includes an indication of sufficient connectivity, where the determining to continue obtaining the first location information for the UE and reporting the first location information for the UE to the external client is based at least in part on the indication of sufficient connectivity. The process may then further include at least one of: configuring second location measurements for the UE in at least one of the UE or a second plurality of RPs, based on the indication of the new SgNB or the new serving cell; configuring transmission of second UL signals by the UE, based on the indication of the new SgNB or the new serving cell; configuring transmission of second DL RSs by a second plurality of TPs, based on the indication of the new SgNB or the new serving cell; cancelling at least some of the first location measurements for the UE in at least one of the UE or the first plurality of RPs, based on the indication of the new SgNB or the new serving cell; cancelling the transmission of at least some of the first UL signals by the UE, based on the indication of the new SgNB or the new serving cell; or cancelling the transmission of at least some of the first DL RSs in the first plurality of TPs, based on the indication of the new SgNB or the new serving cell, e.g. as described for stage 12 of FIG. 8.

In one aspect of implementation I3, referred to as aspect A1, the process may further include: receiving an indication of a new SgNB or a new serving cell for the UE; and determining to cease obtaining the first location information for the UE and reporting the first location information for the UE to the external client, based on the indication of the new SgNB or the new serving cell for the UE. as described for case B of FIG. 8. For example, the indication of the new SgNB or the new serving cell may be received from the new SgNB for the UE (e.g. as described for stage 15 of FIG. 8), and the process may then further include: determining a third entity where the third entity comprises a new CgNB for locating the UE (e.g. as described for stage 16 of FIG. 8), where the new CgNB comprises the new SgNB, a new NgNB for the UE, a second LMC server or a second LLMF server, where the third entity is different than the first entity; and sending a location context for the UE to the third entity (e.g. as described for stage 17 of FIG. 8), where the location context enables the third entity to obtain second location information for the UE using control plane signaling and report the second location information for the UE to the external client using control plane signaling. The third entity may be determined based on the indication of the new SgNB or the new serving cell for the UE or based on an indication of the third entity received from the new SgNB. The location context may comprise at least one of: (i) information for the request for locating the UE received from the second entity; (ii) an indication of the first plurality of RPs; (iii) an indication of the first plurality of TPs; (iv) an indication of the first location measurements configured in the UE; (v) an indication of the first location measurements configured in the first plurality of RPs; (vi) an indication of the first DL RSs transmitted by the first plurality of TPs; (vii) an indication of the first UL signals transmitted by the UE; (viii) a location session identifier; (ix) the location capabilities of the UE; or (x) some combination of these.

In another example of aspect A1 of implementation I3, the indication of the new SgNB is received from an old SgNB for the UE (e.g. as described for case C of FIG. 8), where the indication of the new SgNB further includes an indication of insufficient connectivity, where the determining to cease obtaining the first location information and reporting the first location information is based on the indication of insufficient connectivity. In this example, the process may further include at least one of: cancelling the first location measurements for the UE in at least one of the UE or the first plurality of RPs; cancelling the transmission of the first UL signals by the UE; cancelling the transmission of at least some of the first DL RSs in the first plurality of TPs; or some combination of these, e.g. as described for stage 21 of FIG. 8.

Figure 15:
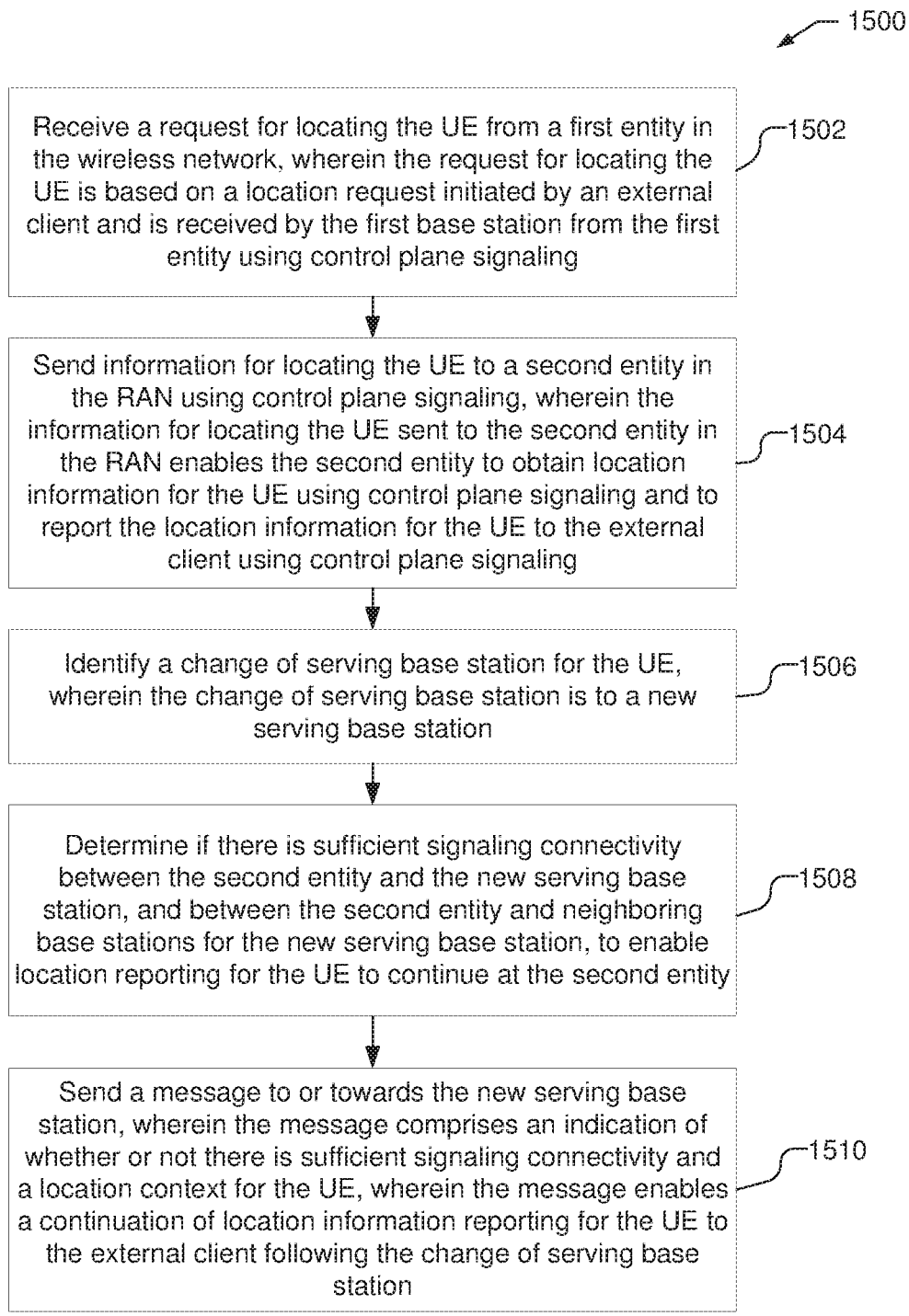
FIG. 15 shows a process flow illustrating another method for locating a user equipment (UE) performed by a serving base station in a Radio Access Network (RAN) for a wireless network.

FIG. 15 shows a process flow 1500 illustrating a method for locating a user equipment (UE), such as the UE 105, performed by a first base station in a Radio Access Network (RAN) for a wireless network, where the first base station is a serving base station for the UE, such as an SgNB 110-1, in an NG-RAN 112.

Process flow 1500 may start at block 1502, where a request for locating the UE is received from a first entity in the wireless network, where the request for locating the UE is based on a location request initiated by an external client (e.g. the external client 130) and is received by the first base station from the first entity using control plane signaling, e.g. as described for stage 11 of FIG. 5 and stage 3 and stage 9 of FIG. 8. At block 1504 information for locating the UE is sent to a second entity in the RAN using control plane signaling (e.g. as described for stage 13 of FIG. 5 and stage 11 and stage 15 for FIG. 8), where the information for locating the UE sent to the second entity in the RAN enables the second entity to obtain location information for the UE using control plane signaling and to report the location information for the UE to the external client using control plane signaling. At block 1506, a change of serving base station for the UE is identified, where the change of serving base station is to a new serving base station, e.g. as described for stage 1 and stage 7 of FIG. 8. At block 1508, the first base station determines if there is sufficient signaling connectivity between the second entity and the new serving base station, and between the second entity and neighboring base stations for the new serving base station, to enable location reporting for the UE to continue at the second entity, e.g. as described for stage 2 and stage 8 for FIG. 8. At block 1510, the first base station sends a message to or towards the new serving base station, where the message comprises an indication of whether or not there is sufficient signaling connectivity and a location context for the UE, where the message enables a continuation of location information reporting for the UE to the external client following the change of serving base station, e.g. as described for stage 3 and stage 9 for FIG. 8.

In one implementation, the RAN is a next generation Radio Access Network (NG-RAN) (e.g. NG-RAN 112) providing 5G New Radio (NR) wireless access to the UE and the first base station is a Serving NR Node B (SgNB) for the UE (e.g. SgNB 110-1).

In one implementation, the first entity is a serving Access and Mobility Management Function (AMF) for the UE, such as AMF 154, where the information for locating the UE comprises information for the request for locating the UE, e.g. as described for stage 11 of FIG. 5.

In one implementation, the first entity is a previous SgNB for the UE, where the information for locating the UE comprises at least one of an identity for the first base station or information for the request for locating the UE, e.g. as described for stage 3 and stage 9 for FIG. 8.

In one implementation, the second entity is a Controlling NR Node B (CgNB) for locating the UE (e.g. CgNB 110-2), where the CgNB comprises an NR Node B (gNB), a Neighbor gNB (NgNB) for the UE (e.g. NgNB 110-3 or NgNB 110-4), a Location Management Component (LMC) server or a Local Location Management Function (LLMF) server.

In one implementation, the change of serving base station comprises a change of SgNB, where the new serving base station is a new SgNB, and where the neighboring base stations for the new serving base stations are neighbor NR Node Bs (NgNBs) (e.g. NgNB 110-3 and NgNB 110-4). For example, identifying the change of SgNB for the UE may be based on determining a handover for the UE to a serving cell for the new SgNB (e.g. as described for stage 1 of FIG. 8), where the handover is for a Radio Resource Control (RRC) Connected state for the UE, and where the message comprises a Handover Request. In another example, identifying the change of SgNB for the UE is based on receiving a request for a UE context from the new SgNB (e.g. as described for stage 7 for FIG. 8), where the message comprises a response to the request for the UE context, e.g., as described for stage 9 for FIG. 8. The UE context may enable the UE to transition from a Radio Resource Control (RRC) Inactive state to an RRC Connected state or to perform a RAN-based Notification Area (RNA) update. The location context may comprise at least one of information for the request for locating the UE or an indication of the second entity, e.g. as described for stage 3 and stage 9 of FIG. 8.

Figure 16:
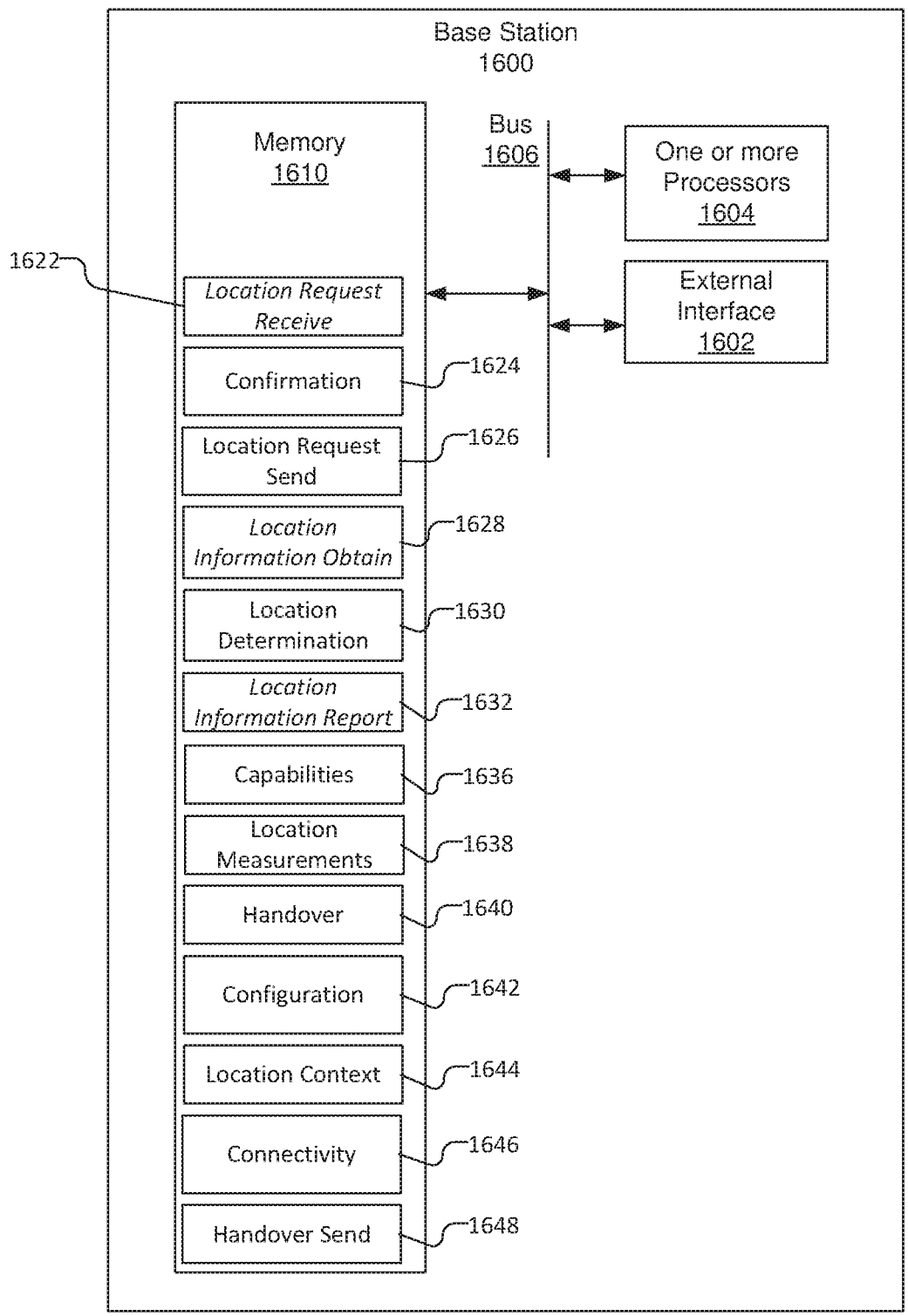
FIG. 16 is a block diagram of an embodiment of a base station that supports a VLLLS.

FIG. 16 is a diagram illustrating an example of a hardware implementation of a base station 1600 in a Radio Access Network, such as a Serving gNB (SgNB) 110-1, Controlling gNB (CgNB) 110-2, Location Management Component (LMC) server or a Local LMF (LLMF) server, as discussed herein, and shown in FIGS. 1-8. The base station 1600 may be, e.g., part of a wireless network such as a 5G Core network (5GCN) (e.g. 5GCN 150) and may be within the NG-RAN, such as NG-RAN 112 shown in FIGS. 1 and 2. The base station may be operated as a controlling entity or as a serving base station or as both. The base station 1600 includes, e.g., hardware components such as an external interface 1602, which may be a wired or wireless interface capable of connecting to an AMF 154, a UPF 151, base stations within the RAN, such as SgNB 110-1 (if the base station 1600 is a CgNB 110-2), CgNB 110-2 (if the base station 1600 is a SgNB 110-1), and neighbor CgNBs 110-3, 110-4, as well as wirelessly connect to one or more UEs 105. The base station 1600 includes one or more processors 1604 and memory 1610, which may be coupled together with bus 1606. The memory 1610 may contain executable code or software instructions that when executed by the one or more processors 1604 cause the one or more processors 1604 to operate as a special purpose computer programmed to perform the procedures and techniques disclosed herein (e.g. such as the process flows 1000, 1100, 1400, and 1500).

As illustrated in FIG. 16, the memory 1610 includes one or more components or modules that when implemented by the one or more processors 1604 implements the methodologies described herein. While the components or modules are illustrated as software in memory 1610 that is executable by the one or more processors 1604, it should be understood that the components or modules may be dedicated hardware either in the processors 1604 or off processor. As illustrated, the memory 1610 may include a location request receive unit 1622 that enables the one or more processors 1604 to receive via the external interface 1602 a request for locating the UE from an entity in the wireless network, such as the AMF 154, a SgNB 110-1, or a previous CgNB 110-2, wherein the request for locating the UE is based on a location request initiated by an external client and is received using control plane signaling.

The memory 1610 may further include a confirmation unit 1624 that enables the one or more processors 1604 to return via the external interface 1602 a confirmation of the request for locating the UE to the second entity using control plane signaling.

The memory 1610 may further include a location request send unit 1626 that enables the one or more processors 1604 to send via the external interface 1602 the information for locating the UE to a second entity in the RAN using control plane signaling, e.g., where the base station 1600 is acting as a serving base station for the UE and the second entity is a controlling entity.

The memory 1610 may further include a location information obtain unit 1628 that enables the one or more processors 1604 to receive via the external interface 1602 location information for the UE using control plane signaling. The location information may be measurements, for example, obtained from other base stations within the RAN and from the UE 105 and by the base station 1600 itself.

In some implementations, the memory 1610 may further include a location determination unit 1630 that enables the one or more processors 1604 to determine a location estimate of the UE using the obtained measurements, where the location estimate may be the received location information.

The memory 1610 may further include a location information report unit 1632 that enables the one or more processors 1604 to send via the external interface 1602 the location information for the UE to an external client using user plane signaling, which may be based on at least one of the Internet Protocol (IP), the Transmission Control Protocol (TCP), Transport Layer Security (TLS), or some combination of these. In some implementations, the location information report unit 1632 may report the location information using user plane signaling. In some implementations, the location information report unit 1632 may report the location information using control plane signaling. The memory 1610 may further include a capabilities unit 1636 that enables the one or more processors 1604 to obtain, via the external interface, location capabilities of the UE when the base station does not have the location capabilities of the UE.

The memory 1610 may further include a location measurement unit 1638 that enables the one or more processors 1604 to receive, via the external interface, location measurements for the UE from at least one of the UE or a first plurality of Reception Points (RPs), wherein a plurality of sets of location information is obtained for the UE, e.g., using location information obtain unit 1628, based on the location measurements received from the at least one of the UE or the first plurality of RPs.

The memory 1610 may further include a handover unit 1640 that enables the one or more processors 1604 to identify or to receive via the external interface 1602 an indication of a new serving cell for the UE or a new serving base station for the UE and an indication of connectivity.

The handover unit 1640 enables the one or more processors 1604 to determine whether to continue or to cease obtaining location information for the UE and reporting the location information, based on the indication of the new serving cell for the UE or the new serving base station for the UE and the indication of connectivity. Based on the indication of the new serving cell for the UE or a new serving base station for the UE, the one or more processors 1604 may be configured, using respective memory units, to configure additional location measurements for the UE in at least one of the UE or a second plurality of RPs; configure transmission of additional UL signals by the UE, configure transmission of additional DL RSs by a second plurality of TPs; cancel at least some of the location measurements for the UE in at least one of the UE or the first plurality of RPs; cancel the transmission of at least some of the UL signals by the UE; or cancel the transmission of at least some of the DL RSs in the first plurality of TPs. The one or more processors 1604 may be enabled to determine another entity for locating the UE.

The memory 1610 may further include a configuration unit 1642 that enables the one or more processors 1604 to configure the reference signals and location measurements in a plurality of reception points and transmission points, and to reconfigure the reference signals and location measurements based on whether the control entity 1600 is to continue or to cease obtaining location information for the UE. The configuration unit 1642 may further enable the one or more processors 1604 to configure at least some of the location measurements in the at least one of the UE or the first plurality of RPs when not all of the location measurements are initially configured in the at least one of the UE or the first plurality of RPs, wherein the at least some of the location measurements configured in the UE are based on the location capabilities of the UE. The configuration unit 1642 may further enable the one or more processors 1604 to configure in the UE at least some of the UL signals transmitted by the UE when not all of the UL signals are initially configured in the UE, wherein the configuring the transmission of the at least some of the first UL signals in the UE is based on the location capabilities of the UE. The configuration unit 1642 may further enable the one or more processors 1604 to configure in the first plurality of TPs at least some of the DL RSs transmitted by the first plurality of TPs when not all of the DL RSs transmitted by the first plurality of TPs are initially configured in the first plurality of TPs, wherein the configuring at least some of the location measurements, the configuring in the UE at least some of the UL signals and the configuring in the plurality of TPs at least some of the first DL RSs uses control plane signaling.

The memory 1610 may further include a location context unit 1644 that enables the one or more processors 1604 to send, via the external interface 1602, a location context for the UE to another entity, when another entity is determined for locating the UE, e.g., using handover unit 1640, wherein the location context enables the other entity to obtain location information for the UE using control plane signaling and report the location information for the UE to the external client using user plane signaling. The one or more processor may be further enabled to receive via the external interface 1602 and process and respond to a request for a location context for the UE.

The memory 1610 may further include a connectivity unit 1646 that enables the one or more processors 1604 to determine if there is sufficient signaling connectivity between a controlling entity and the new serving base station, and between the controlling entity and neighboring base stations for the new serving base station, to enable location reporting for the UE to continue at the second entity and to cease obtaining the location information and cease reporting the location information based on the indication of insufficient connectivity.

The memory 1610 may further include a handover send unit 1648 in the memory 1610 enables the one or more processors 1604 to send via the external interface 1602 a message to or towards a new serving base station, with an indication of signaling connectivity. The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1610) and executed by one or more processor units (e.g. processors 1604), causing the processor units to operate as a special purpose computer programmed to perform the techniques and procedures disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1610, and are configured to cause the one or more processors (e.g. processors 1604) to operate as a special purpose computer programmed to perform the techniques and procedures disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

A first entity in a wireless network, such as base station 1600, may be configured to support location determination of a user equipment (UE) and may include a means for receiving a request for locating the UE from a second entity in the wireless network, wherein the request for locating the UE is based on a location request initiated by an external client and is received by the first entity from the second entity using control plane signaling, which may be, e.g., the external interface 1602 and one or more processors 1604 with dedicated hardware or implementing executable code or software instructions in memory 1610 such as the location request receive unit 1622. Means for obtaining first location information for the UE using control plane signaling may be, e.g., the external interface 1602 and one or more processors 1604 with dedicated hardware or implementing executable code or software instructions in memory 1610 such as the location information obtain unit 1628. Means for reporting the first location information for the UE to the external client using user plane signaling may be, e.g., the external interface 1602 and one or more processors 1604 with dedicated hardware or implementing executable code or software instructions in memory 1610 such as the location information report unit 1632.

In one implementation, the first entity may include a means for returning a confirmation of the request for locating the UE to the second entity using control plane signaling, which may be, e.g., the external interface 1602 and one or more processors 1604 with dedicated hardware or implementing executable code or software instructions in memory 1610 such as the confirmation unit 1624.

In one implementation, the first entity may include a means for obtaining location capabilities of the UE, when the first entity does not have the location capabilities of the UE, which may be, e.g., the external interface 1602 and one or more processors 1604 with dedicated hardware or implementing executable code or software instructions in memory 1610 such as the capabilities unit 1636.

In one implementation, the first entity may include a means for receiving first location measurements for the UE from at least one of the UE or a first plurality of Reception Points (RPs), wherein the first location measurements are received using control plane signaling, wherein the first location measurements received from the first plurality of RPs comprise location measurements of first uplink (UL) signals transmitted by the UE, wherein the first location measurements received from the UE include at least one of location measurements of first downlink (DL) reference signals (RSs) transmitted by a first plurality of Transmission Points (TPs) or other location measurements, wherein the first plurality of TPs comprise at least one of the first entity, the SgNB, at least one NgNB or at least one Location Transmission Unit (LTU), wherein the first plurality of RPs comprise at least one of the first entity, the SgNB, at least one NgNB or at least one Location Measurement Unit (LMU), wherein the at least one of the UE or the first plurality of RPs obtain the first location measurements at different second times, which may be, e.g., the external interface 1602 and one or more processors 1604 with dedicated hardware or implementing executable code or software instructions in memory 1610 such as the location measurement unit 1638. A means for obtaining the plurality of sets of location information for the UE based on the first location measurements received from the at least one of the UE or the first plurality of RPs may be, e.g., the external interface 1602 and one or more processors 1604 with dedicated hardware or implementing executable code or software instructions in memory 1610 such as the location information obtain unit 1628.

In one implementation, the first entity may include a means for configuring at least some of the first location measurements in the at least one of the UE or the first plurality of RPs when not all of the first location measurements are initially configured in the at least one of the UE or the first plurality of RPs, wherein the at least some of the first location measurements configured in the UE are based on the location capabilities of the UE, which may be, e.g., the external interface 1602 and one or more processors 1604 with dedicated hardware or implementing executable code or software instructions in memory 1610 such as the configuration unit 1642. A means for configuring in the UE at least some of the first UL signals transmitted by the UE when not all of the first UL signals are initially configured in the UE, wherein the configuring the transmission of the at least some of the first UL signals in the UE is based on the location capabilities of the UE may be, e.g., the external interface 1602 and one or more processors 1604 with dedicated hardware or implementing executable code or software instructions in memory 1610 such as the configuration unit 1642. A means for configuring in the first plurality of TPs at least some of the first DL RSs transmitted by the first plurality of TPs when not all of the first DL RSs transmitted by the first plurality of TPs are initially configured in the first plurality of TPs, wherein the configuring at least some of the first location measurements, the configuring in the UE at least some of the first UL signals and the configuring in the first plurality of TPs at least some of the first DL RSs uses control plane signaling may be, e.g., the external interface 1602 and one or more processors 1604 with dedicated hardware or implementing executable code or software instructions in memory 1610 such as the configuration unit 1642.

In one implementation, the first entity may include a means for receiving an indication of a new SgNB or a new serving cell for the UE, which may be, e.g., the external interface 1602 and one or more processors 1604 with dedicated hardware or implementing executable code or software instructions in memory 1610 such as the handover unit 1640. A means for determining to continue obtaining the first location information for the UE using control plane signaling and continue reporting the first location information for the UE to the external client using user plane signaling may be, e.g., the one or more processors 1604 with dedicated hardware or implementing executable code or software instructions in memory 1610 such as the handover unit 1640.

In one implementation, the first entity may include a means for configuring second location measurements for the UE in at least one of the UE or a second plurality of RPs, based on the indication of the new SgNB or the new serving cell, which may be, e.g., the external interface 1602 and one or more processors 1604 with dedicated hardware or implementing executable code or software instructions in memory 1610 such as the handover unit 1640 and configuration unit 1642. A means for configuring transmission of second UL signals by the UE, based on the indication of the new SgNB or the new serving cell may be, e.g., the external interface 1602 and one or more processors 1604 with dedicated hardware or implementing executable code or software instructions in memory 1610 such as the handover unit 1640 and configuration unit 1642. A means for configuring transmission of second DL RSs by a second plurality of TPs, based on the indication of the new SgNB or the new serving cell may be, e.g., the external interface 1602 and one or more processors 1604 with dedicated hardware or implementing executable code or software instructions in memory 1610 such as the handover unit 1640 and configuration unit 1642. A means for cancelling at least some of the first location measurements for the UE in at least one of the UE or the first plurality of RPs, based on the indication of the new SgNB or the new serving cell may be, e.g., the external interface 1602 and one or more processors 1604 with dedicated hardware or implementing executable code or software instructions in memory 1610 such as the handover unit 1640 and configuration unit 1642. A means for cancelling the transmission of at least some of the first UL signals by the UE, based on the indication of the new SgNB or the new serving cell may be, e.g., the external interface 1602 and one or more processors 1604 with dedicated hardware or implementing executable code or software instructions in memory 1610 such as the handover unit 1640 and configuration unit 1642. A means for cancelling the transmission of at least some of the first DL RSs in the first plurality of TPs, based on the indication of the new SgNB or the new serving cell may be, e.g., the external interface 1602 and one or more processors 1604 with dedicated hardware or implementing executable code or software instructions in memory 1610 such as the handover unit 1640 and configuration unit 1642.

In one implementation, the first entity may include a means for receiving an indication of a new SgNB or a new serving cell for the UE, which may be, e.g., the external interface 1602 and one or more processors 1604 with dedicated hardware or implementing executable code or software instructions in memory 1610 such as the handover unit 1640. A means for determining to cease obtaining the first location information for the UE using control plane signaling and cease reporting the first location information for the UE to the external client using user plane signaling, based on the indication of the new SgNB or the new serving cell for the UE may be, e.g., the one or more processors 1604 with dedicated hardware or implementing executable code or software instructions in memory 1610 such as the handover unit 1640, location information obtain unit 1628, and location information report unit 1632.

In one implementation, the indication of the new SgNB or the new serving cell is received from the new SgNB for the UE and the first entity may include a means for determining another entity, wherein the another entity comprises a new CgNB for locating the UE, wherein the new CgNB comprises the new SgNB, a new NgNB for the UE, a second LMC server or a second LLMF server, wherein the another entity is different than the first entity, which may be, e.g., the one or more processors 1604 with dedicated hardware or implementing executable code or software instructions in memory 1610 such as the handover unit 1640. A means for sending a location context for the UE to the another entity, wherein the location context enables the another entity to obtain second location information for the UE using control plane signaling and report the second location information for the UE to the external client using user plane signaling may be, e.g., the external interface 1602 and one or more processors 1604 with dedicated hardware or implementing executable code or software instructions in memory 1610 such as the location context unit 1644.

In one implementation, the first entity may include a means for cancelling the first location measurements for the UE in at least one of the UE or the first plurality of RPs, which may be, e.g., the external interface 1602 and one or more processors 1604 with dedicated hardware or implementing executable code or software instructions in memory 1610 such as the handover unit 1640 and the configuration unit 1642. A means for cancelling the transmission of the first UL signals by the UE may be, e.g., the external interface 1602 and one or more processors 1604 with dedicated hardware or implementing executable code or software instructions in memory 1610 such as the handover unit 1640 and the configuration unit 1642. A means for cancelling the transmission of at least some of the first DL RSs in the first plurality of TPs may be, e.g., the external interface 1602 and one or more processors 1604 with dedicated hardware or implementing executable code or software instructions in memory 1610 such as the handover unit 1640 and the configuration unit 1642.

A first base station in a Radio Access Network (RAN) for a wireless network, such as base station 1600, configured to support location determination a user equipment (UE), wherein the first base station is a serving base station for the UE, may include a means for receiving a request for locating the UE from a first entity in the wireless network, wherein the request for locating the UE is based on a location request initiated by an external client and is received by the first base station from the first entity using control plane signaling, which may be, e.g., the external interface 1602 and one or more processors 1604 with dedicated hardware or implementing executable code or software instructions in memory 1610 such as the location request receive unit 1622. A means for sending information for locating the UE to a second entity in the RAN using control plane signaling, wherein the information for locating the UE sent to the second entity in the RAN enables the second entity to obtain location information for the UE using control plane signaling and to report the location information for the UE to the external client using user plane signaling may be, e.g., the external interface 1602 and one or more processors 1604 with dedicated hardware or implementing executable code or software instructions in memory 1610 such as the location request send unit 1626.

In one implementation, the first base station may include a means for identifying a change of SgNB for the UE, wherein the change of SgNB is to a new SgNB, which may be, e.g., the external interface 1602 and one or more processors 1604 with dedicated hardware or implementing executable code or software instructions in memory 1610 such as the handover unit 1640. A means for determining if there is sufficient signaling connectivity between the second entity and the new SgNB, and between the second entity and NgNBs for the new SgNB, to enable location reporting for the UE to continue at the second entity may be, e.g., the external interface 1602 and one or more processors 1604 with dedicated hardware or implementing executable code or software instructions in memory 1610 such as the connectivity unit 1646. A means for sending a message to or towards the new SgNB, wherein the message comprises an indication of whether or not there is sufficient signaling connectivity and a location context for the UE, wherein the message enables a continuation of location information reporting for the UE to the external client following the change of SgNB may be, e.g., the external interface 1602 and one or more processors 1604 with dedicated hardware or implementing executable code or software instructions in memory 1610 such as the handover send unit 1648.

A first entity in a radio access network (RAN) for a wireless network, such as base station 1600, configured to support location determination of a user equipment (UE) may include a means for receiving a request for locating the UE from a second entity in the wireless network, wherein the request for locating the UE is based on a location request initiated by an external client and is received by the first entity from the second entity using control plane signaling, which may be, e.g., the external interface 1602 and one or more processors 1604 with dedicated hardware or implementing executable code or software instructions in memory 1610 such as the location request receive unit 1622. A means for obtaining first location information for the UE using control plane signaling may be, e.g., the external interface 1602 and one or more processors 1604 with dedicated hardware or implementing executable code or software instructions in memory 1610 such as the location information obtain unit 1628. A means for reporting the first location information for the UE to the external client using control plane signaling may be, e.g., the external interface 1602 and one or more processors 1604 with dedicated hardware or implementing executable code or software instructions in memory 1610 such as the location information report unit 1632. A means for receiving an indication of a new serving cell for the UE or a new serving base station for the UE and an indication of connectivity may be, e.g., the external interface 1602 and one or more processors 1604 with dedicated hardware or implementing executable code or software instructions in memory 1610 such as the handover unit 1640. A means for determining whether to continue or to cease the obtaining of the first location information for the UE and the reporting the first location information for the UE, based on the indication of the new serving cell for the UE or the new serving base station for the UE and the indication of connectivity may be, e.g., the external interface 1602 and one or more processors 1604 with dedicated hardware or implementing executable code or software instructions in memory 1610 such as the handover unit 1640. A means for continuing to obtain the first location information for the UE and to report the first location information for the UE to the external client when the determining is to continue may be, e.g., the one or more processors 1604 with dedicated hardware or implementing executable code or software instructions in memory 1610 such as the handover unit 1640, location information obtain unit 1628. A means for ceasing to obtain the first location information for the UE and to report the first location information for the UE to the external client when the determining is to cease may be, e.g., the one or more processors 1604 with dedicated hardware or implementing executable code or software instructions in memory 1610 such as the handover unit 1640, location information obtain unit 1628.

In one implementation, the means for returning a confirmation of the request for locating the UE to the second entity using control plane signaling, which may be, e.g., the external interface 1602 and one or more processors 1604 with dedicated hardware or implementing executable code or software instructions in memory 1610 such as the confirmation unit 1624.

In one implementation, the first entity may include a means for obtaining location capabilities of the UE when the first entity does not have the location capabilities of the UE, which may be, e.g., the external interface 1602 and one or more processors 1604 with dedicated hardware or implementing executable code or software instructions in memory 1610 such as the capabilities unit 1636.

In one implementation, the first entity may include a means for receiving first location measurements for the UE from at least one of the UE or a first plurality of Reception Points (RPs), wherein the first location measurements are received using control plane signaling, wherein the first location measurements received from the first plurality of RPs comprise location measurements of first uplink (UL) signals transmitted by the UE, wherein the first location measurements received from the UE include at least one of location measurements of first downlink (DL) reference signals (RSs) transmitted by a first plurality of Transmission Points (TPs) or other location measurements, wherein the first plurality of TPs comprise at least one of the first entity, the SgNB, at least one NgNB or at least one Location Transmission Unit (LTU), wherein the first plurality of RPs comprise at least one of the first entity, the SgNB, at least one NgNB or at least one Location Measurement Unit (LMU), wherein the at least one of the UE or the first plurality of RPs obtain the first location measurements at different second times, which may be, e.g., the external interface 1602 and one or more processors 1604 with dedicated hardware or implementing executable code or software instructions in memory 1610 such as the location measurement unit 1638. A means for obtaining the plurality of sets of location information for the UE based on the first location measurements received from the at least one of the UE or the first plurality of RPs may be, e.g., the external interface 1602 and one or more processors 1604 with dedicated hardware or implementing executable code or software instructions in memory 1610 such as the location information obtain unit 1628.

In one implementation, the first entity may include a means for configuring at least some of the first location measurements in the at least one of the UE or the first plurality of RPs when not all of the first location measurements are initially configured in the at least one of the UE or the first plurality of RPs, wherein the at least some of the first location measurements configured in the UE are based on the location capabilities of the UE, which may be, e.g., the external interface 1602 and one or more processors 1604 with dedicated hardware or implementing executable code or software instructions in memory 1610 such as the configuration unit 1642. A means for configuring in the UE at least some of the first UL signals transmitted by the UE when not all of the first UL signals are initially configured in the UE, wherein the configuring the transmission of the at least some of the first UL signals in the UE is based on the location capabilities of the UE may be, e.g., the external interface 1602 and one or more processors 1604 with dedicated hardware or implementing executable code or software instructions in memory 1610 such as the configuration unit 1642. A means for configuring in the first plurality of TPs at least some of the first DL RSs transmitted by the first plurality of TPs when not all of the first DL RSs transmitted by the first plurality of TPs are initially configured in the first plurality of TPs, wherein the configuring at least some of the first location measurements, the configuring in the UE at least some of the first UL signals and the configuring in the first plurality of TPs at least some of the first DL RSs uses control plane signaling may be, e.g., the external interface 1602 and one or more processors 1604 with dedicated hardware or implementing executable code or software instructions in memory 1610 such as the configuration unit 1642.

In one implementation, the first entity may include a means for receiving the indication of the new SgNB or the new serving cell for the UE, which may be, e.g., the external interface 1602 and one or more processors 1604 with dedicated hardware or implementing executable code or software instructions in memory 1610 such as the handover unit 1640. A means for determining to continue obtaining the first location information for the UE and reporting the first location information for the UE to the external client may be, e.g., the one or more processors 1604 with dedicated hardware or implementing executable code or software instructions in memory 1610 such as the handover unit 1640.

In one implementation, the first entity may include a means for configuring second location measurements for the UE in at least one of the UE or a second plurality of RPs, based on the indication of the new SgNB or the new serving cell, which may be, e.g., the external interface 1602 and one or more processors 1604 with dedicated hardware or implementing executable code or software instructions in memory 1610 such as the handover unit 1640 and configuration unit 1642. A means for configuring transmission of second UL signals by the UE, based on the indication of the new SgNB or the new serving cell may be, e.g., the external interface 1602 and one or more processors 1604 with dedicated hardware or implementing executable code or software instructions in memory 1610 such as the handover unit 1640 and configuration unit 1642. A means for configuring transmission of second DL RSs by a second plurality of TPs, based on the indication of the new SgNB or the new serving cell may be, e.g., the external interface 1602 and one or more processors 1604 with dedicated hardware or implementing executable code or software instructions in memory 1610 such as the handover unit 1640 and configuration unit 1642. A means for cancelling at least some of the first location measurements for the UE in at least one of the UE or the first plurality of RPs, based on the indication of the new SgNB or the new serving cell may be, e.g., the external interface 1602 and one or more processors 1604 with dedicated hardware or implementing executable code or software instructions in memory 1610 such as the handover unit 1640 and configuration unit 1642. A means for cancelling the transmission of at least some of the first UL signals by the UE, based on the indication of the new SgNB or the new serving cell may be, e.g., the external interface 1602 and one or more processors 1604 with dedicated hardware or implementing executable code or software instructions in memory 1610 such as the handover unit 1640 and configuration unit 1642. A means for cancelling the transmission of at least some of the first DL RSs in the first plurality of TPs, based on the indication of the new SgNB or the new serving cell may be, e.g., the external interface 1602 and one or more processors 1604 with dedicated hardware or implementing executable code or software instructions in memory 1610 such as the handover unit 1640 and configuration unit 1642.

In one implementation, the first entity may include a means for receiving receiving an indication of a new SgNB or a new serving cell for the UE, which may be, e.g., the external interface 1602 and one or more processors 1604 with dedicated hardware or implementing executable code or software instructions in memory 1610 such as the handover unit 1640. A means for determining to cease obtaining the first location information for the UE and reporting the first location information for the UE to the external client, based on the indication of the new SgNB or the new serving cell for the UE may be, e.g., the one or more processors 1604 with dedicated hardware or implementing executable code or software instructions in memory 1610 such as the handover unit 1640, location information obtain unit 1628, and location information report unit 1632.

In one implementation, the indication of the new SgNB or the new serving cell is received from the new SgNB for the UE, and the first entity may include a means for determining another entity, wherein the another entity comprises a new CgNB for locating the UE, wherein the new CgNB comprises the new SgNB, a new NgNB for the UE, a second LMC server or a second LLMF server, wherein the another entity is different than the first entity, which may be, e.g., the one or more processors 1604 with dedicated hardware or implementing executable code or software instructions in memory 1610 such as the handover unit 1640. A means for sending a location context for the UE to the another entity, wherein the location context enables the another entity to obtain second location information for the UE using control plane signaling and report the second location information for the UE to the external client using control plane signaling may be, e.g., the external interface 1602 and one or more processors 1604 with dedicated hardware or implementing executable code or software instructions in memory 1610 such as the location context unit 1644.

In one implementation, the first entity may include a means for cancelling the first location measurements for the UE in at least one of the UE or the first plurality of RPs, which may be, e.g., the external interface 1602 and one or more processors 1604 with dedicated hardware or implementing executable code or software instructions in memory 1610 such as the handover unit 1640 and the configuration unit 1642. A means for cancelling the transmission of the first UL signals by the UE may be, e.g., the external interface 1602 and one or more processors 1604 with dedicated hardware or implementing executable code or software instructions in memory 1610 such as the handover unit 1640 and the configuration unit 1642. A means for cancelling the transmission of at least some of the first DL RSs in the first plurality of TPs may be, e.g., the external interface 1602 and one or more processors 1604 with dedicated hardware or implementing executable code or software instructions in memory 1610 such as the handover unit 1640 and the configuration unit 1642.

A first base station in a Radio Access Network (RAN) for a wireless network, such as base station 1600, configured to support location determination of a user equipment (UE), wherein the first base station is a serving base station for the UE, may include a means for receiving a request for locating the UE from a first entity in the wireless network, wherein the request for locating the UE is based on a location request initiated by an external client and is received by the first base station from the first entity using control plane signaling, which may be, e.g., the external interface 1602 and one or more processors 1604 with dedicated hardware or implementing executable code or software instructions in memory 1610 such as the location request receive unit 1622. A means for sending information for locating the UE to a second entity in the RAN using control plane signaling, wherein the information for locating the UE sent to the second entity in the RAN enables the second entity to obtain location information for the UE using control plane signaling and to report the location information for the UE to the external client using control plane signaling may be, e.g., the external interface 1602 and one or more processors 1604 with dedicated hardware or implementing executable code or software instructions in memory 1610 such as the location request send unit 1626. A means for identifying a change of serving base station for the UE, wherein the change of serving base station is to a new serving base station may be, e.g., the external interface 1602 and one or more processors 1604 with dedicated hardware or implementing executable code or software instructions in memory 1610 such as the handover unit 1640. A means for determining if there is sufficient signaling connectivity between the second entity and the new serving base station, and between the second entity and neighboring base stations for the new serving base station, to enable location reporting for the UE to continue at the second entity may be, e.g., the external interface 1602 and one or more processors 1604 with dedicated hardware or implementing executable code or software instructions in memory 1610 such as the connectivity unit 1646. A means for sending a message to or towards the new serving base station, wherein the message comprises an indication of whether or not there is sufficient signaling connectivity and a location context for the UE, wherein the message enables a continuation of location information reporting for the UE to the external client following the change of serving base station may be, e.g., the external interface 1602 and one or more processors 1604 with dedicated hardware or implementing executable code or software instructions in memory 1610 such as the handover send unit 1648.

Figure 17:
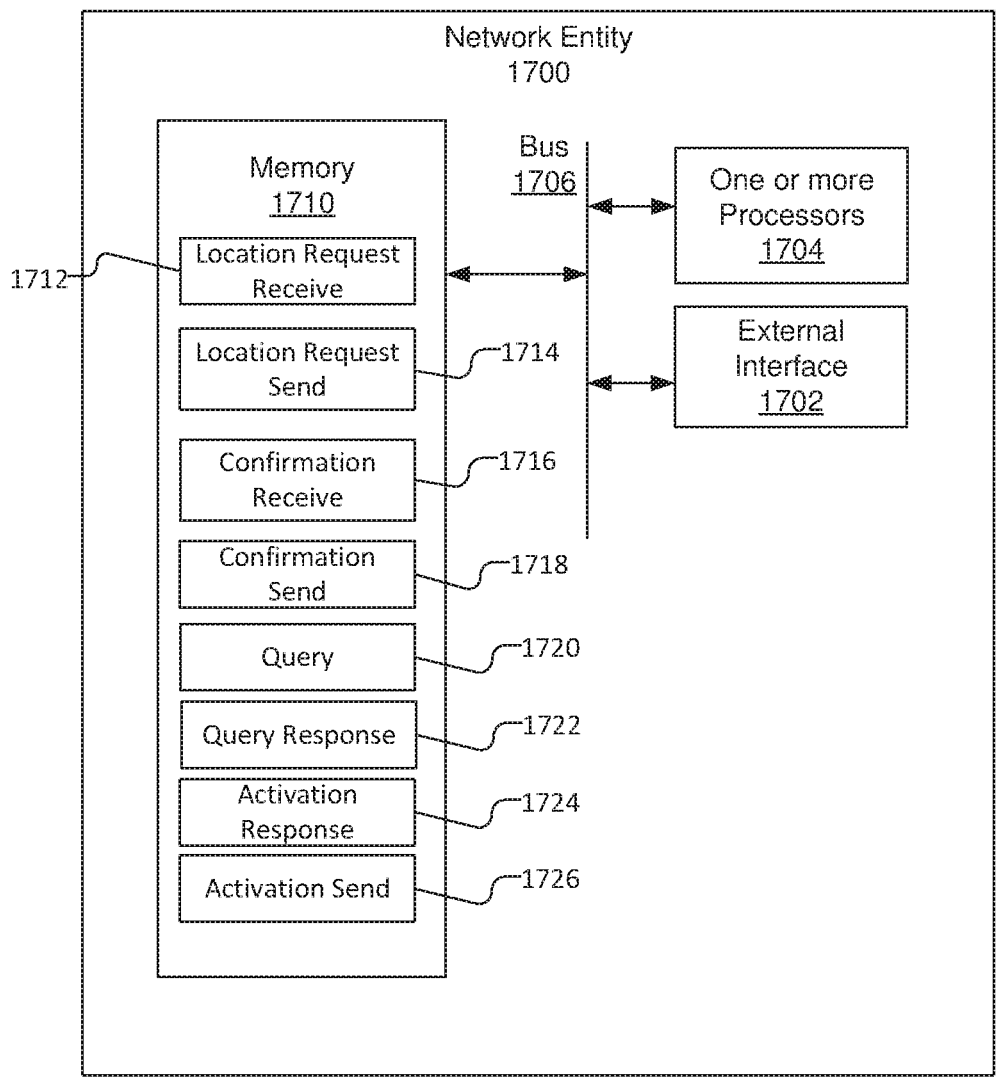
FIG. 17 is a block diagram of an embodiment of a network entity, such as a GMLC or NEF, that supports a VLLLS.

FIG. 17 is a diagram illustrating an example of a hardware implementation of a network entity 1700, such as GMLC 155, VGMLC 155V, HGMLC 155H or NEF 159 as shown in FIGS. 1 and 2. The network entity 1700 may be, e.g., part of a wireless network such as a 5G Core network (5GCN) 150, 150V, or 150H. The network entity 1700 includes, e.g., hardware components such as an external interface 1702, which may be a wired or wireless interface capable of connecting to an external client 130, NEF 159 (if network entity 1700 is GMLC 155), GMLC 155 (if network entity 1700 is NEF 159 or another GMLC 155), UDM 156, AMF 154. The network entity 1700 includes one or more processors 1704 and memory 1710, which may be coupled together with bus 1706. The memory 1710 may contain executable code or software instructions that when executed by the one or more processors 1704 cause the one or more processors to operate as a special purpose computer programmed to perform the procedures and techniques disclosed herein (e.g. such as the process flow 1200).

As illustrated in FIG. 17, the memory 1710 includes one or more components or modules that when implemented by the one or more processors 1704 implements the methodologies as described herein. While the components or modules are illustrated as software in memory 1710 that is executable by the one or more processors 1704, it should be understood that the components or modules may be dedicated hardware either in the processors 1704 or off processor. As illustrated, the memory 1710 may include a location request receive unit 1712 that enables the one or more processors 1704 to receive via the external interface 1702 and process a request for locating the UE from an external client. The memory 1710 may include a location request send unit 1716 that enables the one or more processors 1704 to transfer via the external interface 1702 the request for locating the UE to another entity in the wireless network, such as AMF 154, using control plane signaling, wherein the request for locating the UE includes a request to report the location information using user plane signaling (or control plane signaling) and an address to which the location information is to be reported. The memory 1710 may include a confirmation receive unit 1716 that enables the one or more processors 1704 to receive via the external interface 1702 and process a response from the other entity using control plane signaling, wherein the response indicates acceptance of the request for locating the UE. A confirmation send unit 1718 enables the one or more processors 1704 to send via the external interface 1702 the response to the external client. The memory 1710 may further include a query unit 1720 that enables the one or more processors 1704 to query via the external interface 1702 another entity, e.g., UDM 156, in the wireless network for an address of the other entity. The memory 1710 may further include a query response unit 1722 that enables the one or more processors 1704 to receive via the external interface 1702 a response to the query from another entity, e.g., UDM 156, in the wireless network with the address of the other entity. The memory 1710 may further include an activation response unit 1724 that enables the one or more processors 1704 to receive, via the external interface 1702, a second response from the second entity using control plane signaling, wherein the second response indicates activation of the request for locating the UE in a Radio Access Network (RAN), wherein the RAN provide wireless access to the UE. The memory 1710 may further include an activation send unit 1726 that enables the one or more processors 1704 to forward, via the external interface 1702, the second response to the external client.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1710, and are configured to cause the one or more processors 1704 to operate as a special purpose computer programmed to perform the procedures and techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

A first entity in a wireless network, such as network entity 1700, configured to support location determination of a user equipment (UE) may include a means for receiving a request for locating the UE from an external client, which may be, e.g., the external interface 1702 and one or more processors 1704 with dedicated hardware or implementing executable code or software instructions in memory 1710 such as the location request receive unit 1712. A means for transferring the request for locating the UE to a second entity in the wireless network using control plane signaling, wherein the request for locating the UE includes a request to report the location information using user plane signaling and an address to which the location information is to be reported may be, e.g., the external interface 1702 and one or more processors 1704 with dedicated hardware or implementing executable code or software instructions in memory 1710 such as the location request send unit 1714. A means for receiving a first response from the second entity using control plane signaling, wherein the first response indicates acceptance of the request for locating the UE may be, e.g., the external interface 1702 and one or more processors 1704 with dedicated hardware or implementing executable code or software instructions in memory 1710 such as the confirmation receive unit 1716. A means for forwarding the first response to the external client may be, e.g., the external interface 1702 and one or more processors 1704 with dedicated hardware or implementing executable code or software instructions in memory 1710 such as the confirmation send unit 1718.

In one implementation, the first entity may include a means for sending a query to a third entity for an address of the second entity prior to transferring the request for locating the UE to the second entity, which may be, e.g., the external interface 1702 and one or more processors 1704 with dedicated hardware or implementing executable code or software instructions in memory 1710 such as the query unit 1720. A means for receiving from the third entity the address of the second entity may be, e.g., the external interface 1702 and one or more processors 1704 with dedicated hardware or implementing executable code or software instructions in memory 1710 such as the query response unit 1722.

In one implementation, the first entity may include a means for receiving a second response from the second entity using control plane signaling, wherein the second response indicates activation of the request for locating the UE in a Radio Access Network (RAN), wherein the RAN provide wireless access to the UE, which may be, e.g., the external interface 1702 and one or more processors 1704 with dedicated hardware or implementing executable code or software instructions in memory 1710 such as the activation response unit 1724. A means for forwarding the second response to the external client may be, e.g., the external interface 1702 and one or more processors 1704 with dedicated hardware or implementing executable code or software instructions in memory 1710 such as the activation send unit 1726.

Figure 18:
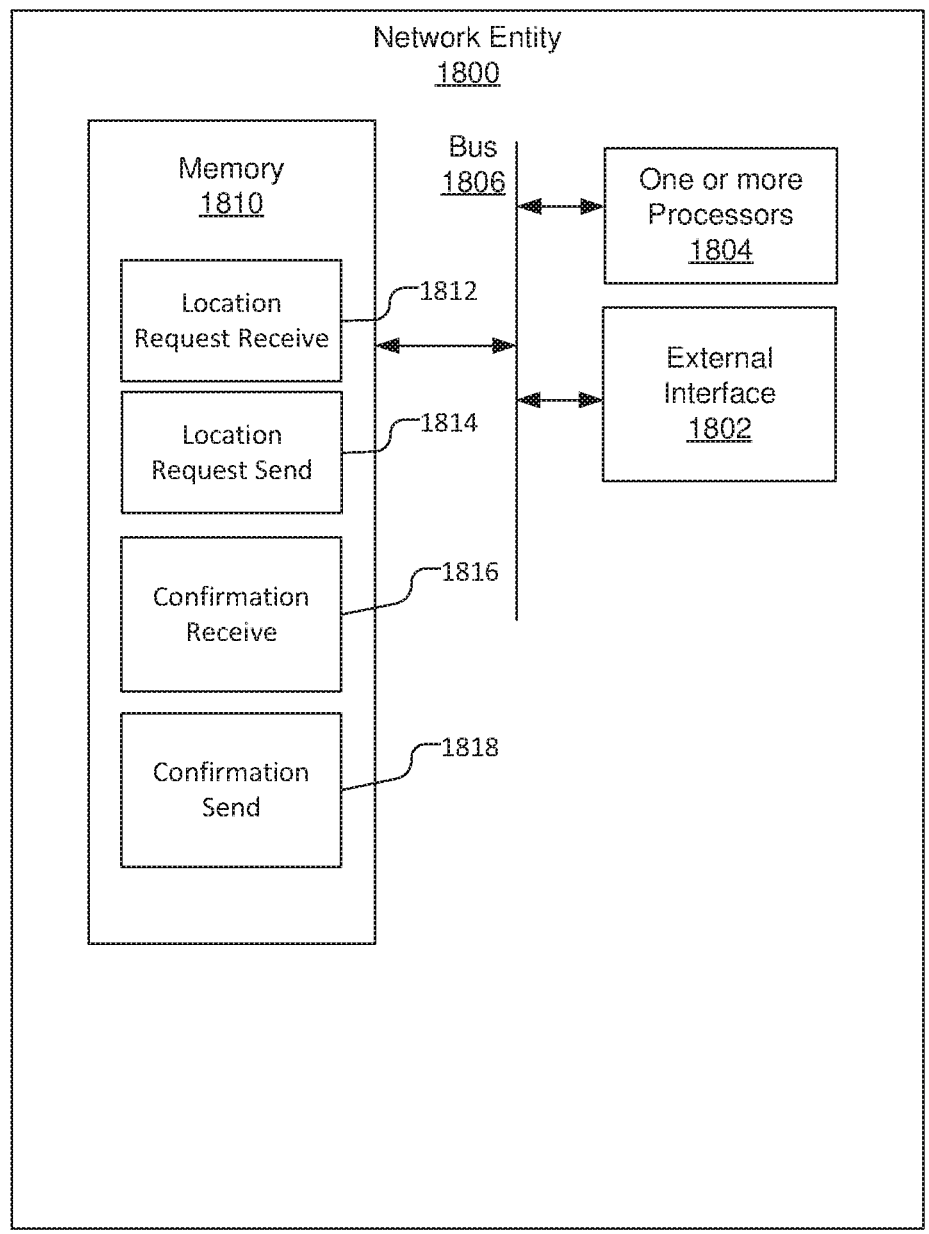
FIG. 18 is a block diagram of an embodiment of a network entity, such as an AMF or LMF, that supports a VLLLS.

FIG. 18 is a diagram illustrating an example of a hardware implementation of a network entity 1800, such as AMF 154 or LMF 152 shown in FIGS. 1 and 2. The network entity 1800 may be, e.g., part of a wireless network such as a 5G Core network (5GCN) 150, 150V, or 150H. The network entity 1800 includes, e.g., hardware components such as an external interface 1802, which may be a wired or wireless interface capable of connecting to GMLC 155, NEF 159, LMF 152 (if the network entity 1800 is AMF 154), AMF 154 (if the network entity is LMF 152), UDM 156, and serving base station 110-1. The network entity 1800 includes one or more processors 1804 and memory 1810, which may be coupled together with bus 1806. The memory 1810 may contain executable code or software instructions that when executed by the one or more processors 1804 cause the one or more processors to operate as a special purpose computer programmed to perform the procedures and techniques disclosed herein (e.g. such as the process flow 1300).

As illustrated in FIG. 18, the memory 1810 includes one or more components or modules that when implemented by the one or more processors 1804 implements the methodologies as described herein. While the components or modules are illustrated as software in memory 1810 that is executable by the one or more processors 1804, it should be understood that the components or modules may be dedicated hardware either in the processors 1804 or off processor. As illustrated, the memory 1810 may include a location request receive unit 1812 that enables the one or more processors 1804 to receive via the external interface 1802 and process a request for locating the UE from a second entity in the wireless network, such as the GMLC 155 or NEF 159, wherein the request for locating the UE is based on a location request initiated by an external client and is received using control plane signaling. The memory 1810 may include a location request send unit 1816 that enables the one or more processors 1804 to send via the external interface 1802 information for the request for locating the UE to a third entity in the wireless network using control plane signaling, where the third entity may be a serving base station, e.g., SgNB 110-1 or UE 105, wherein the request for locating the UE and the information for the request for locating the UE each include a request to report location information using user plane signaling and an address to which the location information is to be reported, wherein the information for the request for locating the UE enables the third entity to obtain location information for the UE using control plane signaling and report the location information for the UE to the external client using user plane signaling. The memory 1810 may include a confirmation receive unit 1816 that enables the one or more processors 1804 to receive via the external interface 1802 and process a response from the third entity using control plane signaling, wherein the response indicates an activation or a confirmation of the request for locating the UE in the third entity. A confirmation send unit 1818 enables the one or more processors 1804 to send via the external interface 1802 the response to the second entity.

The methodologies described herein may be implemented by various means depending upon the application. For example, these methodologies may be implemented in hardware, firmware, software, or any combination thereof. For a hardware implementation, the one or more processors 1804 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the one or more processor units to operate as a special purpose computer programmed to perform the techniques disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium such as memory 1810. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1810, and are configured to cause the one or more processors 1804 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

A first entity in a wireless network, such as the network entity 1800, configured to support location determination of a user equipment (UE) may include a means for receiving a request for locating the UE from a second entity in the wireless network, wherein the request for locating the UE is based on a location request initiated by an external client and is received by the first entity from the second entity using control plane signaling, which may be, e.g., the external interface 1802 and one or more processors 1804 with dedicated hardware or implementing executable code or software instructions in memory 1810 such as the location request receive unit 1812. A means for sending information for the request for locating the UE to a third entity in the wireless network using control plane signaling, wherein the request for locating the UE and the information for the request for locating the UE each include a request to report location information using user plane signaling and an address to which the location information is to be reported, wherein the information for the request for locating the UE enables the third entity to obtain location information for the UE using control plane signaling and report the location information for the UE to the external client using user plane signaling may be, e.g., the external interface 1802 and one or more processors 1804 with dedicated hardware or implementing executable code or software instructions in memory 1810 such as the location request send unit 1814.

In one implementation, the first entity may include a means for receiving a response from the third entity using control plane signaling, wherein the response indicates an activation or a confirmation of the request for locating the UE in the third entity, which may be, e.g., the external interface 1802 and one or more processors 1804 with dedicated hardware or implementing executable code or software instructions in memory 1810 such as the confirmation receive unit 1816. A means for forwarding the response to the second entity may be, e.g., the external interface 1802 and one or more processors 1804 with dedicated hardware or implementing executable code or software instructions in memory 1810 such as the confirmation send unit 1818.

Figure 19:
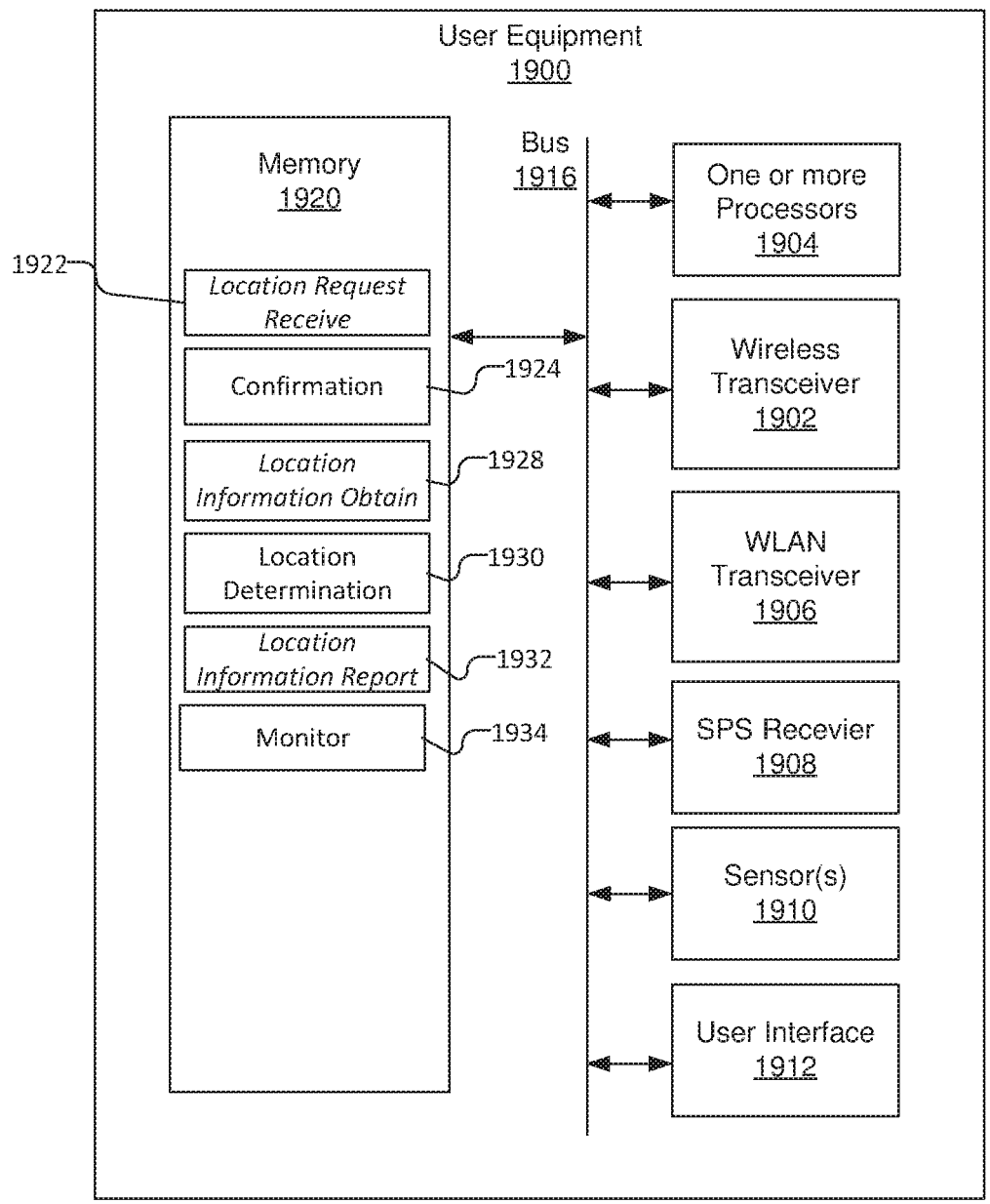
FIG. 19 is a block diagram of an embodiment of a user equipment that supports a VLLLS.

FIG. 19 is a diagram illustrating an example of a hardware implementation of a UE 1900, such as UE 105 shown in FIGS. 1 and 2. The UE 1900 may include an external interface, such as a wireless transceiver 1902 to wirelessly communicate with a base station in a Radio Access Network, such as a Serving gNB (SgNB) 110-1, Controlling gNB (CgNB) 110-2, Location Management Component (LMC) server or a Local LMF (LLMF) server, as discussed herein, and shown in FIGS. 1-8. The UE 1900 may also communicate using the wireless transceiver 1902 with elements in a 5GCN, such as an AMF 154 or LMF 152, as discussed herein, and shown in FIG. 9. The UE 1900 may also include additional transceivers, such a wireless local area network (WLAN) transceiver 1906, as well as an SPS receiver 1908 for receiving and measuring signals from SPS SVs 190 (shown in FIGS. 1 and 2). The UE 1900 may further include one or more sensors 1910, such as cameras, accelerometers, gyroscopes, electronic compass, magnetometer, barometer, etc. The UE 1900 may further include a user interface 1912 that may include e.g., a display, a keypad or other input device, such as virtual keypad on the display, through which a user may interface with the UE 1900. The UE 1900 further includes one or more processors 1904 and memory 1920, which may be coupled together with bus 1916. The one or more processors 1904 and other components of the UE 1900 may similarly be coupled together with bus 1916, a separate bus, or may be directly connected together or coupled using a combination of the foregoing. The memory 1920 may contain executable code or software instructions that when executed by the one or more processors 1904 cause the one or more processors to operate as a special purpose computer programmed to perform the algorithms disclosed herein.

As illustrated in FIG. 19, the memory 1920 may include one or more components or modules that may be implemented by the one or more processors 1904 to perform the methodologies described herein. While the components or modules are illustrated as software in memory 1920 that is executable by the one or more processors 1904, it should be understood that the components or modules may be dedicated hardware either in the one or more processors 1904 or off the processors. As illustrated, the memory 1920 may include a location request receive unit 1922 that enables the one or more processors 1904 to receive via the wireless transceiver 1902 a request for locating the UE from an entity in the wireless network, such as the AMF 154, the LMF 152, an SgNB 110-1, or an CgNB 110-2, wherein the request for locating the UE is based on a location request initiated by an external client and is received using control plane signaling.

The memory 1920 may further include a confirmation unit 1924 that enables the one or more processors 1904 to return via the wireless transceiver 1902 a confirmation of the request for locating the UE to the second entity using control plane signaling.

The memory 1920 may further include a location information obtain unit 1926 that enables the one or more processors 1904 to receive via the wireless transceiver 1902 location information for the UE using control plane signaling.

In some implementations, the memory 1920 may further include a location determination unit 1930 that enables the one or more processors 1904 to determine a location estimate of the UE using the obtained measurements, where the location estimate may be the received location information.

The memory 1920 may further include a location information report unit 1932 that enables the one or more processors 1904 to send via the wireless transceiver 1902 the location information for the UE to an external client using user plane signaling, which may be based on at least one of the Internet Protocol (IP), the Transmission Control Protocol (TCP), Transport Layer Security (TLS), or some combination of these. In some implementations, the location information report unit 1932 may report the location information using user plane signaling. For example, the first location information may be reported using a Protocol Data Unit (PDU) session for the UE.

The memory 1920 may further include a monitor unit 1934 that enables the one or more processors 1904 to monitor for an occurrence of one or more times, which may be, e.g., periodic times or times for trigger events, wherein location measurements are obtained, e.g., using location information obtain unit 1928 at each of the times for at least one of signals received from a plurality of transmission points (TPs), signals received from entities outside the 5GS, or inertial sensors of the UE; at least some of the first location information is determined, e.g., by location determination unit 1930, at each of the times based on the location measurements obtained at each of the first times; and the at least some of the first location information is sent to the external client, e.g., using location information report unit 1932, following each of the times using the user plane signaling.

The methodologies described herein may be implemented by various means depending upon the application. For example, these methodologies may be implemented in hardware, firmware, software, or any combination thereof. For a hardware implementation, the one or more processors 1904 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 1900 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1920) and executed by one or more processors 1904, causing the one or more processors 1904 to operate as a special purpose computer programmed to perform the techniques disclosed herein. Memory may be implemented within the one or processors 1904 or external to the one or more processors 1904. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 1900 may be stored as one or more instructions or code on a non-transitory computer-readable storage medium such as memory 1920. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 1900 may be provided as signals on transmission media included in a communication apparatus. For example, a communication apparatus comprising part or all of UE 1900 may include a transceiver having signals indicative of instructions and data. The instructions and data are stored on non-transitory computer readable media, e.g., memory 1920, and are configured to cause the one or more processors 1904 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

A first entity in a wireless network, such as user equipment (UE) 1900, configured to support location determination of the UE may include a means for receiving a request for locating the UE from a second entity in the wireless network, wherein the request for locating the UE is based on a location request initiated by an external client and is received by the first entity from the second entity using control plane signaling, which may be, e.g., the wireless transceiver 1902 and one or more processors 1904 with dedicated hardware or implementing executable code or software instructions in memory 1920 such as the location request receive unit 1922. A means for obtaining first location information for the UE using control plane signaling, may be, e.g., the wireless transceiver 1902 and one or more processors 1904 with dedicated hardware or implementing executable code or software instructions in memory 1920 such as the location information obtain unit 1928. A means reporting the first location information for the UE to the external client using user plane signaling, which may be, e.g., the wireless transceiver 1902 and one or more processors 1904 with dedicated hardware or implementing executable code or software instructions in memory 1920 such as the location information report unit 1932.

In one implementation, the first entity may include a means for returning a confirmation of the request for locating the UE to the second entity using control plane signaling, which may be, e.g., the wireless transceiver 1902 and one or more processors 1904 with dedicated hardware or implementing executable code or software instructions in memory 1920 such as the confirmation unit 1924.

In one implementation, the first entity may include a means for monitoring for an occurrence of each of the first times, which may be, e.g., the wireless transceiver 1902 and one or more processors 1904 with dedicated hardware or implementing executable code or software instructions in memory 1920 such as the monitor unit 1934. A means for obtaining location measurements at each of the first times for at least one of signals received from a plurality of transmission points (TPs), signals received from entities outside the 5GS, or inertial sensors of the UE may be, e.g., the wireless transceiver 1902 and one or more processors 1904 with dedicated hardware or implementing executable code or software instructions in memory 1920 such as the location information obtain unit 1928. A means for determining at least some of the first location information at each of the first times based on the location measurements obtained at each of the first times may be, e.g., the wireless transceiver 1902 and one or more processors 1904 with dedicated hardware or implementing executable code or software instructions in memory 1920 such as the location determination unit 1930. A means for sending the at least some of the first location information to the external client following each of the first times using the user plane signaling may be, e.g., the wireless transceiver 1902 and one or more processors 1904 with dedicated hardware or implementing executable code or software instructions in memory 1920 such as the location information report unit 1932.

One implementation, may be described as follows:
1. A method for locating a user equipment (UE) performed by a first base station in a Radio Access Network (RAN) for a wireless network, wherein the first base station is a serving base station for the UE, the method comprising:

receiving a request for locating the UE from a first entity in the wireless network, wherein the request for locating the UE is based on a location request initiated by an external client and is received by the first base station from the first entity using control plane signaling; and sending information for locating the UE to a second entity in the RAN using control plane signaling, wherein the information for locating the UE sent to the second entity in the RAN enables the second entity to obtain location information for the UE using control plane signaling and to report the location information for the UE to the external client using user plane signaling.

2. The method of claim 1 wherein the RAN is a next generation Radio Access Network (NG-RAN) providing 5G New Radio (NR) wireless access to the UE and the first base station is a Serving NR Node B (SgNB) for the UE.

3. The method of claim 2, wherein the first entity is a serving Access and Mobility Management Function (AMF) for the UE, wherein the information for locating the UE comprises information for the request for locating the UE.

4. The method of claim 2, wherein the first entity is a previous SgNB for the UE, wherein the information for locating the UE comprises at least one of an identity for the first base station or information for the request for locating the UE.

5. The method of claim 2 wherein the second entity is a Controlling NR Node B (CgNB) for locating the UE, wherein the CgNB comprises an NR Node B (gNB), a Neighbor gNB (NgNB) for the UE, a Location Management Component (LMC) server or a Local Location Management Function (LLMF) server.

6. The method of claim 2 further comprising:

identifying a change of SgNB for the UE, wherein the change of SgNB is to a new SgNB;

determining if there is sufficient signaling connectivity between the second entity and the new SgNB, and between the second entity and NgNBs for the new SgNB, to enable location reporting for the UE to continue at the second entity; and sending a message to or towards the new SgNB, wherein the message comprises an indication of whether or not there is sufficient signaling connectivity and a location context for the UE, wherein the message enables a continuation of location information reporting for the UE to the external client following the change of SgNB.

7. The method of claim 6, wherein the identifying the change of SgNB for the UE is based on determining a handover for the UE to a serving cell for the new SgNB, wherein the handover is for a Radio Resource Control (RRC) Connected state for the UE, wherein the message comprises a Handover Request.

8. The method of claim 6, wherein the identifying the change of SgNB for the UE is based on receiving a request for a UE context from the new SgNB, wherein the message comprises a response to the request for the UE context.

9. The method of claim 8, wherein the UE context enables the UE to transition from a Radio Resource Control (RRC) Inactive state to an RRC Connected state or to perform a RAN-based Notification Area (RNA) update.

10. The method of claim 6, wherein the location context comprises at least one of information for the request for locating the UE or an indication of the second entity.

11. A first base station in a Radio Access Network (RAN) for a wireless network configured to support location determination a user equipment (UE), wherein the first base station is a serving base station for the UE, comprising:

an external interface configured to communicate with other entities in the wireless network;

at least one memory; and at least one processor coupled to the wireless transceiver and the at least one memory, the at least one processor configured to:

receive a request for locating the UE from a first entity in the wireless network, wherein the request for locating the UE is based on a location request initiated by an external client and is received by the first base station from the first entity using control plane signaling; and send information for locating the UE to a second entity in the RAN using control plane signaling, wherein the information for locating the UE sent to the second entity in the RAN enables the second entity to obtain location information for the UE using control plane signaling and to report the location information for the UE to the external client using user plane signaling.

12. The first base station of claim 11 wherein the RAN is a next generation Radio Access Network (NG-RAN) providing 5G New Radio (NR) wireless access to the UE and the first base station is a Serving NR Node B (SgNB) for the UE.

13. The first base station of claim 12, wherein the first entity is a serving Access and Mobility Management Function (AMF) for the UE, wherein the information for locating the UE comprises information for the request for locating the UE.

14. The first base station of claim 12, wherein the first entity is a previous SgNB for the UE, wherein the information for locating the UE comprises at least one of an identity for the first base station or information for the request for locating the UE.

15. The first base station of claim 12 wherein the second entity is a Controlling NR Node B (CgNB) for locating the UE, wherein the CgNB comprises an NR Node B (gNB), a Neighbor gNB (NgNB) for the UE, a Location Management Component (LMC) server or a Local Location Management Function (LLMF) server.

16. The first base station of claim 12, wherein the at least one processor is further configured to:

identify a change of SgNB for the UE, wherein the change of SgNB is to a new SgNB;

determine if there is sufficient signaling connectivity between the second entity and the new SgNB, and between the second entity and NgNBs for the new SgNB, to enable location reporting for the UE to continue at the second entity; and send a message to or towards the new SgNB, wherein the message comprises an indication of whether or not there is sufficient signaling connectivity and a location context for the UE, wherein the message enables a continuation of location information reporting for the UE to the external client following the change of SgNB.

17. The first base station of claim 16, wherein the at least one processor is configured to identify the change of SgNB for the UE based on determining a handover for the UE to a serving cell for the new SgNB, wherein the handover is for a Radio Resource Control (RRC) Connected state for the UE, wherein the message comprises a Handover Request.

18. The first base station of claim 16, wherein the at least one processor is configured to identify the change of SgNB for the UE based on receiving a request for a UE context from the new SgNB, wherein the message comprises a response to the request for the UE context.

19. The first base station of claim 18, wherein the UE context enables the UE to transition from a Radio Resource Control (RRC) Inactive state to an RRC Connected state or to perform a RAN-based Notification Area (RNA) update.

20. The first base station of claim 16, wherein the location context comprises at least one of information for the request for locating the UE or an indication of the second entity.

21. A first base station in a Radio Access Network (RAN) for a wireless network configured to support location determination a user equipment (UE), wherein the first base station is a serving base station for the UE, comprising:

means for receiving a request for locating the UE from a first entity in the wireless network, wherein the request for locating the UE is based on a location request initiated by an external client and is received by the first base station from the first entity using control plane signaling; and means for sending information for locating the UE to a second entity in the RAN using control plane signaling, wherein the information for locating the UE sent to the second entity in the RAN enables the second entity to obtain location information for the UE using control plane signaling and to report the location information for the UE to the external client using user plane signaling.

22. A non-transitory computer readable medium including program code stored thereon, the program code is operable to configure at least one processor in a first base station in a Radio Access Network (RAN) for a wireless network configured to support location determination a user equipment (UE), wherein the first base station is a serving base station for the UE, comprising:

program code to receive a request for locating the UE from a first entity in the wireless network, wherein the request for locating the UE is based on a location request initiated by an external client and is received by the first base station from the first entity using control plane signaling; and program code to sending information for locating the UE to a second entity in the RAN using control plane signaling, wherein the information for locating the UE sent to the second entity in the RAN enables the second entity to obtain location information for the UE using control plane signaling and to report the location information for the UE to the external client using user plane signaling.

One implementation, may be described as follows:

1. A method for locating a user equipment (UE) performed by a first entity in a wireless network, the method comprising:

receiving a request for locating the UE from an external client;

transferring the request for locating the UE to a second entity in the wireless network using control plane signaling, wherein the request for locating the UE includes a request to report location information using user plane signaling and an address to which the location information is to be reported;

receiving a first response from the second entity using control plane signaling, wherein the first response indicates acceptance of the request for locating the UE; and forwarding the first response to the external client.

2. The method of claim 1, wherein the wireless network comprises a 5G System (5GS), wherein the first entity comprises a Gateway Mobile Location Center (GMLC) or a Network Exposure Function (NEF), and wherein the second entity comprises a serving Access and Mobility Management Function (AMF) for the UE.

3. The method of claim 1, further comprising:

sending a query to a third entity for an address of the second entity prior to transferring the request for locating the UE to the second entity;

receiving from the third entity the address of the second entity.

4. The method of claim 1, further comprising:

receiving a second response from the second entity using control plane signaling, wherein the second response indicates activation of the request for locating the UE in a Radio Access Network (RAN), wherein the RAN provide wireless access to the UE; and forwarding the second response to the external client.

5. A first entity in a wireless network configured to support location determination of a user equipment (UE) comprising:

an external interface configured to communicate with other entities in the wireless network;

at least one memory; and at least one processor coupled to the external interface and the at least one memory, the at least one processor configured to:

receive a request for locating the UE from an external client;

transfer the request for locating the UE to a second entity in the wireless network using control plane signaling, wherein the request for locating the UE includes a request to report location information using user plane signaling and an address to which the location information is to be reported;

receive a first response from the second entity using control plane signaling, wherein the first response indicates acceptance of the request for locating the UE; and forward the first response to the external client.

6. The first entity of claim 5, wherein the wireless network comprises a 5G System (5GS), wherein the first entity comprises a Gateway Mobile Location Center (GMLC) or a Network Exposure Function (NEF), and wherein the second entity comprises a serving Access and Mobility Management Function (AMF) for the UE.

7. The first entity of claim 5, wherein the at least one processor is further configured to:

send a query to a third entity for an address of the second entity prior to transferring the request for locating the UE to the second entity;

receive from the third entity the address of the second entity.

8. The first entity of claim 5, wherein the at least one processor is further configured to:

receive a second response from the second entity using control plane signaling, wherein the second response indicates activation of the request for locating the UE in a Radio Access Network (RAN), wherein the RAN provide wireless access to the UE; and forward the second response to the external client.

9. A first entity in a wireless network configured to support location determination of a user equipment (UE) comprising:

means for receiving a request for locating the UE from an external client;

means for transferring the request for locating the UE to a second entity in the wireless network using control plane signaling, wherein the request for locating the UE includes a request to report location information using user plane signaling and an address to which the location information is to be reported;

means for receiving a first response from the second entity using control plane signaling, wherein the first response indicates acceptance of the request for locating the UE; and means for forwarding the first response to the external client.

10. A non-transitory computer readable medium including program code stored thereon, the program code is operable to configure at least one processor in a first entity in a wireless network configured to support location determination of a user equipment (UE) comprising:

program code to receive a request for locating the UE from an external client;

program code to transfer the request for locating the UE to a second entity in the wireless network using control plane signaling, wherein the request for locating the UE includes a request to report location information using user plane signaling and an address to which the location information is to be reported;

program code to receive a first response from the second entity using control plane signaling, wherein the first response indicates acceptance of the request for locating the UE; and program code to forward the first response to the external client.

One implementation, may be described as follows:

1. A method for locating a user equipment (UE) performed by a first entity in a wireless network, the method comprising:

receiving a request for locating the UE from a second entity in the wireless network, wherein the request for locating the UE is based on a location request initiated by an external client and is received by the first entity from the second entity using control plane signaling; and sending information for the request for locating the UE to a third entity in the wireless network using control plane signaling, wherein the request for locating the UE and the information for the request for locating the UE each include a request to report location information using user plane signaling and an address to which the location information is to be reported, wherein the information for the request for locating the UE enables the third entity to obtain location information for the UE using control plane signaling and report the location information for the UE to the external client using user plane signaling.

2. The method of claim 1, wherein the wireless network is a 5G System (5GS), wherein the first entity comprises a serving Access and Mobility Management Function (AMF) for the UE, wherein the second entity comprises a Gateway Mobile Location Center (GMLC) or a Network Exposure Function (NEF), wherein the third entity comprises a serving NR Node B (SgNB) for the UE.

3. The method of claim 1, wherein the wireless network is a 5G System (5GS), wherein the first entity comprises a Location Management Function (LMF), wherein the second entity comprises a serving Access and Mobility Management Function (AMF) for the UE, wherein the third entity comprises the UE.

4. The method of claim 1, further comprising:

receiving a response from the third entity using control plane signaling, wherein the response indicates an activation or a confirmation of the request for locating the UE in the third entity; and forwarding the response to the second entity.

5. A first entity in a wireless network configured to support location determination of a user equipment (UE) comprising:

an external interface configured to communicate with other entities in the wireless network;

at least one memory; and at least one processor coupled to the external interface and the at least one memory, the at least one processor configured to:

receive a request for locating the UE from a second entity in the wireless network, wherein the request for locating the UE is based on a location request initiated by an external client and is received by the first entity from the second entity using control plane signaling; and send information for the request for locating the UE to a third entity in the wireless network using control plane signaling, wherein the request for locating the UE and the information for the request for locating the UE each include a request to report location information using user plane signaling and an address to which the location information is to be reported, wherein the information for the request for locating the UE enables the third entity to obtain location information for the UE using control plane signaling and report the location information for the UE to the external client using user plane signaling.

6. The first entity of claim 5, wherein the wireless network is a 5G System (5GS), wherein the first entity comprises a serving Access and Mobility Management Function (AMF) for the UE, wherein the second entity comprises a Gateway Mobile Location Center (GMLC) or a Network Exposure Function (NEF), wherein the third entity comprises a serving NR Node B (SgNB) for the UE.

7. The first entity of claim 5, wherein the wireless network is a 5G System (5GS), wherein the first entity comprises a Location Management Function (LMF), wherein the second entity comprises a serving Access and Mobility Management Function (AMF) for the UE, wherein the third entity comprises the UE.

8. The first entity of claim 5, wherein the at least one processor is further configured to:

receive a response from the third entity using control plane signaling, wherein the response indicates an activation or a confirmation of the request for locating the UE in the third entity; and forward the response to the second entity.

9. A first entity in a wireless network configured to support location determination of a user equipment (UE) comprising:

means for receiving a request for locating the UE from a second entity in the wireless network, wherein the request for locating the UE is based on a location request initiated by an external client and is received by the first entity from the second entity using control plane signaling; and means for sending information for the request for locating the UE to a third entity in the wireless network using control plane signaling, wherein the request for locating the UE and the information for the request for locating the UE each include a request to report location information using user plane signaling and an address to which the location information is to be reported, wherein the information for the request for locating the UE enables the third entity to obtain location information for the UE using control plane signaling and report the location information for the UE to the external client using user plane signaling.

10. A non-transitory computer readable medium including program code stored thereon, the program code is operable to configure at least one processor in a first entity in a wireless network configured to support location determination of a user equipment (UE) comprising:

program code to receive a request for locating the UE from a second entity in the wireless network, wherein the request for locating the UE is based on a location request initiated by an external client and is received by the first entity from the second entity using control plane signaling; and program code to send information for the request for locating the UE to a third entity in the wireless network using control plane signaling, wherein the request for locating the UE and the information for the request for locating the UE each include a request to report location information using user plane signaling and an address to which the location information is to be reported, wherein the information for the request for locating the UE enables the third entity to obtain location information for the UE using control plane signaling and report the location information for the UE to the external client using user plane signaling.

One implementation, may be described as follows:

1. A method for locating a user equipment (UE) performed by a first entity in a radio access network (RAN) for a wireless network, the method comprising:
receiving a request for locating the UE from a second entity in the wireless network, wherein the request for locating the UE is based on a location request initiated by an external client and is received by the first entity from the second entity using control plane signaling;
obtaining first location information for the UE using control plane signaling;
reporting the first location information for the UE to the external client using control plane signaling;
receiving an indication of a new serving cell for the UE or a new serving base station for the UE and an indication of connectivity;
determining whether to continue or to cease the obtaining of the first location information for the UE and the reporting the first location information for the UE, based on the indication of the new serving cell for the UE or the new serving base station for the UE and the indication of connectivity;
continuing to obtain the first location information for the UE and to report the first location information for the UE to the external client when the determining is to continue; and
ceasing to obtain the first location information for the UE and to report the first location information for the UE to the external client when the determining is to cease.

2. The method of claim 1, wherein information for the location request initiated by the external client is transferred to the second entity using control plane signaling.

3. The method of claim 1, further comprising returning a confirmation of the request for locating the UE to the second entity using control plane signaling.

4. The method of claim 3, wherein the confirmation of the request for locating the UE is transferred from the second entity to the external client using control plane signaling.

5. The method of claim 1, wherein the first location information for the UE comprises a plurality of sets of location information for the UE obtained at different first times by the first entity and reported to the external client by the first entity using control plane signaling immediately following each of the different first times.

6. The method of claim 5, wherein each set of location information comprises at least one of an absolute location estimate for the UE, a relative location estimate for the UE, a linear velocity for the UE, an angular velocity for the UE, a linear acceleration for the UE, an angular acceleration for the UE, an angular orientation for the UE, an identification of a trigger event, or some combination of these.

7. The method of claim 5, wherein the different first times comprise at least one of periodic times or times for trigger events.

8. The method of claim 7, wherein the trigger events comprise at least one of an area event, a motion event or a velocity event.

9. The method of claim 5, wherein the RAN is a next generation RAN (NG-RAN) providing 5G New Radio (NR) wireless access to the UE.

10. The method of claim 9, wherein the UE remains in a Connection Management (CM) Connected state and in a Radio Resource Control (RRC) Connected state or an RRC Inactive state.

11. The method of claim 9, wherein the first entity is a Controlling NR Node B (CgNB) for locating the UE, wherein the CgNB comprises a Serving NR Node B (SgNB) for the UE, a Neighbor NR Node B (NgNB) for the UE, a first Location Management Component (LMC) server or a first Local Location Management Function (LLMF) server.

12. The method of claim 11, wherein the CgNB comprises the SgNB, wherein the second entity is a serving Access and Mobility Management Function (AMF) for the UE.

13. The method of claim 11, wherein the CgNB comprises the NgNB, the first LMC server or the first LLMF server, wherein the second entity is the SgNB.

14. The method of claim 11, wherein the second entity comprises a previous CgNB for locating the UE, wherein the request for locating the UE is received from the previous CgNB in response to a change of a serving cell for the UE or a change of a previous SgNB for the UE.

15. The method of claim 14, wherein the request for locating the UE indicates the change of the serving cell or the change of the previous SgNB, wherein the request for locating the UE further comprises a location context.

16. The method of claim 15, wherein the location context comprises at least one of:
(i) information for the location request initiated by the external client;
(ii) an indication of a plurality of Reception Points (RPs);
(iii) an indication of a plurality of Transmission Points (TPs);
(iv) an indication of location measurements configured in the UE;
(v) an indication of location measurements configured in the plurality of RPs;
(vi) an indication of downlink (DL) reference signals (RSs) transmitted by the plurality of TPs
(vii) an indication of uplink (UL) signals transmitted by the UE;
(viii) a location session identifier;
(ix) location capabilities of the UE; or
(x) some combination of these.

17. The method of claim 11, further comprising obtaining location capabilities of the UE when the first entity does not have the location capabilities of the UE.

18. The method of claim 17, further comprising:
receiving first location measurements for the UE from at least one of the UE or a first plurality of Reception Points (RPs),
wherein the first location measurements are received using control plane signaling,
wherein the first location measurements received from the first plurality of RPs comprise location measurements of first uplink (UL) signals transmitted by the UE,
wherein the first location measurements received from the UE include at least one of location measurements of first downlink (DL) reference signals (RSs) transmitted by a first plurality of Transmission Points (TPs) or other location measurements,
wherein the first plurality of TPs comprise at least one of the first entity, the SgNB, at least one NgNB or at least one Location Transmission Unit (LTU),
wherein the first plurality of RPs comprise at least one of the first entity, the SgNB, at least one NgNB or at least one Location Measurement Unit (LMU),
wherein the at least one of the UE or the first plurality of RPs obtain the first location measurements at different second times; and
obtaining the plurality of sets of location information for the UE based on the first location measurements received from the at least one of the UE or the first plurality of RPs.

19. The method of claim 18, further comprising:
configuring at least some of the first location measurements in the at least one of the UE or the first plurality of RPs when not all of the first location measurements are initially configured in the at least one of the UE or the first plurality of RPs, wherein the at least some of the first location measurements configured in the UE are based on the location capabilities of the UE;
configuring in the UE at least some of the first UL signals transmitted by the UE when not all of the first UL signals are initially configured in the UE, wherein the configuring the transmission of the at least some of the first UL signals in the UE is based on the location capabilities of the UE; and
configuring in the first plurality of TPs at least some of the first DL RSs transmitted by the first plurality of TPs when not all of the first DL RSs transmitted by the first plurality of TPs are initially configured in the first plurality of TPs, wherein the configuring at least some of the first location measurements, the configuring in the UE at least some of the first UL signals and the configuring in the first plurality of TPs at least some of the first DL RSs uses control plane signaling.

20. The method of claim 18, wherein the first location measurements received from the UE include at least one of a time of arrival (TOA), a receive time-transmission time difference (Rx-Tx), round trip signal propagation time (RTT), angle of arrival (AOA), angle of departure (AOD), received signal strength indication (RSSI), reference signal received power (RSRP), reference signal received quality (RSRQ), Global Navigation Satellite System (GNSS) code phase, GNSS carrier phase, WiFi AP RTT, WiFi AP RSSI, sensor measurements, or some combination of these.

21. The method of claim 18, wherein the first location measurements received from the first plurality of RPs include at least one of a time of arrival (TOA), a receive time-transmission time difference (Rx-Tx), round trip signal propagation time (RTT), angle of arrival (AOA), received signal strength indication (RSSI), reference signal received power (RSRP), reference signal received quality (RSRQ), or some combination of these.

22. The method of claim 18, wherein at least some of the first DL RSs comprise DL positioning reference signals (PRSs), DL Tracking Reference Signals (TRSs) or both DL PRSs and DL TRSs.

23. The method of claim 18, wherein at least some of the first UL signals comprise UL positioning reference signals (PRSs).

24. The method of claim 19 further comprising:
receiving the indication of the new SgNB or the new serving cell for the UE; and
determining to continue obtaining the first location information for the UE and reporting the first location information for the UE to the external client.

25. The method of claim 24, wherein the indication of the new SgNB or the new serving cell is received from the new SgNB, wherein the indication of the new SgNB or the new serving cell further includes an indication of sufficient connectivity, wherein the determining to continue obtaining the first location information for the UE and reporting the first location information for the UE to the external client is based at least in part on the indication of sufficient connectivity.

26. The method of claim 25 further comprising at least one of:
configuring second location measurements for the UE in at least one of the UE or a second plurality of RPs, based on the indication of the new SgNB or the new serving cell;
configuring transmission of second UL signals by the UE, based on the indication of the new SgNB or the new serving cell;
configuring transmission of second DL RSs by a second plurality of TPs, based on the indication of the new SgNB or the new serving cell;
cancelling at least some of the first location measurements for the UE in at least one of the UE or the first plurality of RPs, based on the indication of the new SgNB or the new serving cell;
cancelling the transmission of at least some of the first UL signals by the UE, based on the indication of the new SgNB or the new serving cell; or cancelling the transmission of at least some of the first DL RSs in the first plurality of TPs, based on the indication of the new SgNB or the new serving cell.

27. The method of claim 19 further comprising:
determining to cease obtaining the first location information for the UE and reporting the first location information for the UE to the external client, based on the indication of the new SgNB or the new serving cell for the UE.

28. The method of claim 27, wherein the indication of the new SgNB or the new serving cell is received from the new SgNB for the UE, and further comprising:
determining a third entity, wherein the third entity comprises a new CgNB for locating the UE, wherein the new CgNB comprises the new SgNB, a new NgNB for the UE, a second LMC server or a second LLMF server, wherein the third entity is different than the first entity;
sending a location context for the UE to the third entity, wherein the location context enables the third entity to obtain second location information for the UE using control plane signaling and report the second location information for the UE to the external client using control plane signaling.

29. The method of claim 28, wherein the third entity is determined based on the indication of the new SgNB or the new serving cell for the UE or based on an indication of the third entity received from the new SgNB.

30. The method of claim 28, wherein the location context comprises at least one of:
(i) information for the request for locating the UE received from the second entity;
(ii) an indication of the first plurality of RPs;
(iii) an indication of the first plurality of TPs;
(iv) an indication of the first location measurements configured in the UE;
(v) an indication of the first location measurements configured in the first plurality of RPs;
(vi) an indication of the first DL RSs transmitted by the first plurality of TPs;
(vii) an indication of the first UL signals transmitted by the UE;
(viii) a location session identifier;
(ix) the location capabilities of the UE; or
(x) some combination of these.

31. The method of claim 27, wherein the indication of the new SgNB is received from an old SgNB for the UE, wherein the indication of the new SgNB further includes an indication of insufficient connectivity, wherein the determining to cease obtaining the first location information and reporting the first location information is based on the indication of insufficient connectivity.

32. The method of claim 31, further comprising at least one of:
cancelling the first location measurements for the UE in at least one of the UE or the first plurality of RPs;
cancelling the transmission of the first UL signals by the UE;
cancelling the transmission of at least some of the first DL RSs in the first plurality of TPs;
or some combination of these.

33. A first entity in a radio access network (RAN) for a wireless network configured to support location determination of a user equipment (UE) comprising:
an external interface configured to communicate with other entities in the wireless network;
at least one memory; and
at least one processor coupled to the external interface and the at least one memory, the at least one processor configured to:
receive a request for locating the UE from a second entity in the wireless network, wherein the request for locating the UE is based on a location request initiated by an external client and is received by the first entity from the second entity using control plane signaling;
obtain first location information for the UE using control plane signaling;
report the first location information for the UE to the external client using control plane signaling;
receive an indication of a new serving cell for the UE or a new serving base station for the UE and an indication of connectivity;
determine whether to continue or to cease the obtaining of the first location information for the UE and the reporting the first location information for the UE, based on the indication of the new serving cell for the UE or the new serving base station for the UE and the indication of connectivity;
continue to obtain the first location information for the UE and to report the first location information for the UE to the external client when the determining is to continue; and
cease to obtain the first location information for the UE and to report the first location information for the UE to the external client when the determining is to cease.

34. The first entity of claim 33, wherein information for the location request initiated by the external client is transferred to the second entity using control plane signaling.

35. The first entity of claim 33, wherein the at least one processor is further configured to return a confirmation of the request for locating the UE to the second entity using control plane signaling.

36. The first entity of claim 35, wherein the confirmation of the request for locating the UE is transferred from the second entity to the external client using control plane signaling.

37. The first entity of claim 33, wherein the first location information for the UE comprises a plurality of sets of location information for the UE obtained at different first times by the first entity and reported to the external client by the first entity using control plane signaling immediately following each of the different first times.

38. The first entity of claim 37, wherein each set of location information comprises at least one of an absolute location estimate for the UE, a relative location estimate for the UE, a linear velocity for the UE, an angular velocity for the UE, a linear acceleration for the UE, an angular acceleration for the UE, an angular orientation for the UE, an identification of a trigger event, or some combination of these.

39. The first entity of claim 37, wherein the different first times comprise at least one of periodic times or times for trigger events.

40. The first entity of claim 39, wherein the trigger events comprise at least one of an area event, a motion event or a velocity event.

41. The first entity of claim 37, wherein the RAN is a next generation RAN (NG-RAN) providing 5G New Radio (NR) wireless access to the UE.

42. The first entity of claim 41, wherein the UE remains in a Connection Management (CM) Connected state and in a Radio Resource Control (RRC) Connected state or an RRC Inactive state.

43. The first entity of claim 41, wherein the first entity is a Controlling NR Node B (CgNB) for locating the UE, wherein the CgNB comprises a Serving NR Node B (SgNB) for the UE, a Neighbor NR Node B (NgNB) for the UE, a first Location Management Component (LMC) server or a first Local Location Management Function (LLMF) server.

44. The first entity of claim 43, wherein the CgNB comprises the SgNB, wherein the second entity is a serving Access and Mobility Management Function (AMF) for the UE.

45. The first entity of claim 43, wherein the CgNB comprises the NgNB, the first LMC server or the first LLMF server, wherein the second entity is the SgNB.

46. The first entity of claim 43, wherein the second entity comprises a previous CgNB for locating the UE, wherein the request for locating the UE is received from the previous CgNB in response to a change of a serving cell for the UE or a change of a previous SgNB for the UE.

47. The first entity of claim 46, wherein the request for locating the UE indicates the change of the serving cell or the change of the previous SgNB, wherein the request for locating the UE further comprises a location context.

48. The first entity of claim 47, wherein the location context comprises at least one of:
(i) information for the location request initiated by the external client;
(ii) an indication of a plurality of Reception Points (RPs);
(iii) an indication of a plurality of Transmission Points (TPs);
(iv) an indication of location measurements configured in the UE;
(v) an indication of location measurements configured in the plurality of RPs;
(vi) an indication of downlink (DL) reference signals (RSs) transmitted by the plurality of TPs
(vii) an indication of uplink (UL) signals transmitted by the UE;
(viii) a location session identifier;
(ix) location capabilities of the UE; or
(x) some combination of these.

49. The first entity of claim 43, wherein the at least one processor is further configured to obtain location capabilities of the UE when the first entity does not have the location capabilities of the UE.

50. The first entity of claim 49, wherein the at least one processor is further configured to:
receive first location measurements for the UE from at least one of the UE or a first plurality of Reception Points (RPs),
wherein the first location measurements are received using control plane signaling,
wherein the first location measurements received from the first plurality of RPs comprise location measurements of first uplink (UL) signals transmitted by the UE,
wherein the first location measurements received from the UE include at least one of location measurements of first downlink (DL) reference signals (RSs) transmitted by a first plurality of Transmission Points (TPs) or other location measurements,
wherein the first plurality of TPs comprise at least one of the first entity, the SgNB, at least one NgNB or at least one Location Transmission Unit (LTU),
wherein the first plurality of RPs comprise at least one of the first entity, the SgNB, at least one NgNB or at least one Location Measurement Unit (LMU),
wherein the at least one of the UE or the first plurality of RPs obtain the first location measurements at different second times; and
obtain the plurality of sets of location information for the UE based on the first location measurements received from the at least one of the UE or the first plurality of RPs.

51. The first entity of claim 50, wherein the at least one processor is further configured to:
configure at least some of the first location measurements in the at least one of the UE or the first plurality of RPs when not all of the first location measurements are initially configured in the at least one of the UE or the first plurality of RPs, wherein the at least some of the first location measurements configured in the UE are based on the location capabilities of the UE;
configure in the UE at least some of the first UL signals transmitted by the UE when not all of the first UL signals are initially configured in the UE, wherein the configuring the transmission of the at least some of the first UL signals in the UE is based on the location capabilities of the UE; and
configure in the first plurality of TPs at least some of the first DL RSs transmitted by the first plurality of TPs when not all of the first DL RSs transmitted by the first plurality of TPs are initially configured in the first plurality of TPs, wherein the configuring at least some of the first location measurements, the configuring in the UE at least some of the first UL signals and the configuring in the first plurality of TPs at least some of the first DL RSs uses control plane signaling.

52. The first entity of claim 50, wherein the first location measurements received from the UE include at least one of a time of arrival (TOA), a receive time-transmission time difference (Rx-Tx), round trip signal propagation time (RTT), angle of arrival (AOA), angle of departure (AOD), received signal strength indication (RSSI), reference signal received power (RSRP), reference signal received quality (RSRQ), Global Navigation Satellite System (GNSS) code phase, GNSS carrier phase, WiFi AP RTT, WiFi AP RSSI, sensor measurements, or some combination of these.

53. The first entity of claim 50, wherein the first location measurements received from the first plurality of RPs include at least one of a time of arrival (TOA), a receive time-transmission time difference (Rx-Tx), round trip signal propagation time (RTT), angle of arrival (AOA), received signal strength indication (RSSI), reference signal received power (RSRP), reference signal received quality (RSRQ), or some combination of these.

54. The first entity of claim 50, wherein at least some of the first DL RSs comprise DL positioning reference signals (PRSs), DL Tracking Reference Signals (TRSs) or both DL PRSs and DL TRSs.

55. The first entity of claim 50, wherein at least some of the first UL signals comprise UL positioning reference signals (PRSs).

56. The first entity of claim 51, wherein the at least one processor is further configured to:
receive the indication of the new SgNB or the new serving cell for the UE; and determine to continue obtaining the first location information for the UE and reporting the first location information for the UE to the external client.

57. The first entity of claim 56, wherein the indication of the new SgNB or the new serving cell is received from the new SgNB, wherein the indication of the new SgNB or the new serving cell further includes an indication of sufficient connectivity, wherein the at least one processor is configured to the determine to continue obtaining the first location information for the UE and reporting the first location information for the UE to the external client based at least in part on the indication of sufficient connectivity.

58. The first entity of claim 57, wherein the at least one processor is further configured to at least one of:
configure second location measurements for the UE in at least one of the UE or a second plurality of RPs, based on the indication of the new SgNB or the new serving cell;
configure transmission of second UL signals by the UE, based on the indication of the new SgNB or the new serving cell;
configuring transmission of second DL RSs by a second plurality of TPs, based on the indication of the new SgNB or the new serving cell;
cancel at least some of the first location measurements for the UE in at least one of the UE or the first plurality of RPs, based on the indication of the new SgNB or the new serving cell;
cancel the transmission of at least some of the first UL signals by the UE, based on the indication of the new SgNB or the new serving cell; or
cancel the transmission of at least some of the first DL RSs in the first plurality of TPs, based on the indication of the new SgNB or the new serving cell.

59. The first entity of claim 51, wherein the at least one processor is further configured to:
determine to cease obtaining the first location information for the UE and reporting the first location information for the UE to the external client, based on the indication of the new SgNB or the new serving cell for the UE.

60. The first entity of claim 59, wherein the indication of the new SgNB or the new serving cell is received from the new SgNB for the UE, and wherein the at least one processor is further configured to:
determine a third entity, wherein the third entity comprises a new CgNB for locating the UE, wherein the new CgNB comprises the new SgNB, a new NgNB for the UE, a second LMC server or a second LLMF server, wherein the third entity is different than the first entity;
send a location context for the UE to the third entity, wherein the location context enables the third entity to obtain second location information for the UE using control plane signaling and report the second location information for the UE to the external client using control plane signaling.

61. The first entity of claim 60, wherein the third entity is determined based on the indication of the new SgNB or the new serving cell for the UE or based on an indication of the third entity received from the new SgNB.

62. The first entity of claim 60, wherein the location context comprises at least one of:
(i) information for the request for locating the UE received from the second entity;
(ii) an indication of the first plurality of RPs;
(iii) an indication of the first plurality of TPs;
(iv) an indication of the first location measurements configured in the UE;
(v) an indication of the first location measurements configured in the first plurality of RPs;
(vi) an indication of the first DL RSs transmitted by the first plurality of TPs;
(vii) an indication of the first UL signals transmitted by the UE;
(viii) a location session identifier;
(ix) the location capabilities of the UE; or
(x) some combination of these.

63. The first entity of claim 59, wherein the indication of the new SgNB is received from an old SgNB for the UE, wherein the indication of the new SgNB further includes an indication of insufficient connectivity, wherein the at least one processor is configured to determine to cease obtaining the first location information and reporting the first location information based on the indication of insufficient connectivity.

64. The first entity of claim 63, wherein the at least one processor is further configured to at least one of:
cancel the first location measurements for the UE in at least one of the UE or the first plurality of RPs;
cancel the transmission of the first UL signals by the UE;
cancel the transmission of at least some of the first DL RSs in the first plurality of TPs;
or some combination of these.

65. A first entity in a radio access network (RAN) for a wireless network configured to support location determination of a user equipment (UE) comprising:
means for receiving a request for locating the UE from a second entity in the wireless network, wherein the request for locating the UE is based on a location request initiated by an external client and is received by the first entity from the second entity using control plane signaling;
means for obtaining first location information for the UE using control plane signaling;
means for reporting the first location information for the UE to the external client using control plane signaling;
means for receiving an indication of a new serving cell for the UE or a new serving base station for the UE and an indication of connectivity;
means for determining whether to continue or to cease the obtaining of the first location information for the UE and the reporting the first location information for the UE, based on the indication of the new serving cell for the UE or the new serving base station for the UE and the indication of connectivity;
means for continuing to obtain the first location information for the UE and to report the first location information for the UE to the external client when the determining is to continue; and
means for ceasing to obtain the first location information for the UE and to report the first location information for the UE to the external client when the determining is to cease.

66. A non-transitory computer readable medium including program code stored thereon, the program code is operable to configure at least one processor in a first entity in a radio access network (RAN) for a wireless network configured to support location determination of a user equipment (UE) comprising:
program code to receive a request for locating the UE from a second entity in the wireless network, wherein the request for locating the UE is based on a location request initiated by an external client and is received by the first entity from the second entity using control plane signaling;

program code to obtain first location information for the UE using control plane signaling;

program code to report the first location information for the UE to the external client using control plane signaling;

program code to receive an indication of a new serving cell for the UE or a new serving base station for the UE and an indication of connectivity;

program code to determine whether to continue or to cease the obtaining of the first location information for the UE and the reporting the first location information for the UE, based on the indication of the new serving cell for the UE or the new serving base station for the UE and the indication of connectivity;

program code to continue to obtain the first location information for the UE and to report the first location information for the UE to the external client when the determining is to continue; and program code to cease to obtain the first location information for the UE and to report the first location information for the UE to the external client when the determining is to cease.

One implementation, may be described as follows:

1. A method for locating a user equipment (UE) performed by a first base station in a Radio Access Network (RAN) for a wireless network, wherein the first base station is a serving base station for the UE, the method comprising:

receiving a request for locating the UE from a first entity in the wireless network, wherein the request for locating the UE is based on a location request initiated by an external client and is received by the first base station from the first entity using control plane signaling;

sending information for locating the UE to a second entity in the RAN using control plane signaling, wherein the information for locating the UE sent to the second entity in the RAN enables the second entity to obtain location information for the UE using control plane signaling and to report the location information for the UE to the external client using control plane signaling;

identifying a change of serving base station for the UE, wherein the change of serving base station is to a new serving base station;

determining if there is sufficient signaling connectivity between the second entity and the new serving base station, and between the second entity and neighboring base stations for the new serving base station, to enable location reporting for the UE to continue at the second entity; and sending a message to or towards the new serving base station, wherein the message comprises an indication of whether or not there is sufficient signaling connectivity and a location context for the UE, wherein the message enables a continuation of location information reporting for the UE to the external client following the change of serving base station.

2. The method of claim 1 wherein the RAN is a next generation Radio Access Network (NG-RAN) providing 5G New Radio (NR) wireless access to the UE and the first base station is a Serving NR Node B (SgNB) for the UE.

3. The method of claim 2, wherein the first entity is a serving Access and Mobility Management Function (AMF) for the UE, wherein the information for locating the UE comprises information for the request for locating the UE.

4. The method of claim 2, wherein the first entity is a previous SgNB for the UE, wherein the information for locating the UE comprises at least one of an identity for the first base station or information for the request for locating the UE.

5. The method of claim 2 wherein the second entity is a Controlling NR Node B (CgNB) for locating the UE, wherein the CgNB comprises an NR Node B (gNB), a Neighbor gNB (NgNB) for the UE, a Location Management Component (LMC) server or a Local Location Management Function (LLMF) server.

6. The method of claim 2, wherein the change of serving base station comprises a change of SgNB, wherein the new serving base station is a new SgNB, and wherein the neighboring base stations for the new serving base stations are neighbor NR Node Bs (NgNBs).

7. The method of claim 6, wherein the identifying the change of SgNB for the UE is based on determining a handover for the UE to a serving cell for the new SgNB, wherein the handover is for a Radio Resource Control (RRC) Connected state for the UE, wherein the message comprises a Handover Request.

8. The method of claim 6, wherein the identifying the change of SgNB for the UE is based on receiving a request for a UE context from the new SgNB, wherein the message comprises a response to the request for the UE context.

9. The method of claim 8, wherein the UE context enables the UE to transition from a Radio Resource Control (RRC) Inactive state to an RRC Connected state or to perform a RAN-based Notification Area (RNA) update.

10. The method of claim 6, wherein the location context comprises at least one of information for the request for locating the UE or an indication of the second entity.

11. A first base station in a Radio Access Network (RAN) for a wireless network configured to support location determination of a user equipment (UE), wherein the first base station is a serving base station for the UE, comprising:

an external interface configured to communicate with other entities in the wireless network;

at least one memory; and at least one processor coupled to the external interface and the at least one memory, the at least one processor configured to:

receive a request for locating the UE from a first entity in the wireless network, wherein the request for locating the UE is based on a location request initiated by an external client and is received by the first base station from the first entity using control plane signaling;

send information for locating the UE to a second entity in the RAN using control plane signaling, wherein the information for locating the UE sent to the second entity in the RAN enables the second entity to obtain location information for the UE using control plane signaling and to report the location information for the UE to the external client using control plane signaling;

identify a change of serving base station for the UE, wherein the change of serving base station is to a new serving base station;

determine if there is sufficient signaling connectivity between the second entity and the new serving base station, and between the second entity and neighboring base stations for the new serving base station, to enable location reporting for the UE to continue at the second entity; and send a message to or towards the new serving base station, wherein the message comprises an indication of whether or not there is sufficient signaling connectivity and a location context for the UE, wherein the message enables a continuation of location information reporting for the UE to the external client following the change of serving base station.

12. The first base station of claim 11 wherein the RAN is a next generation Radio Access Network (NG-RAN) providing 5G New Radio (NR) wireless access to the UE and the first base station is a Serving NR Node B (SgNB) for the UE.

13. The first base station of claim 12, wherein the first entity is a serving Access and Mobility Management Function (AMF) for the UE, wherein the information for locating the UE comprises information for the request for locating the UE.

14. The first base station of claim 12, wherein the first entity is a previous SgNB for the UE, wherein the information for locating the UE comprises at least one of an identity for the first base station or information for the request for locating the UE.

15. The first base station of claim 12 wherein the second entity is a Controlling NR Node B (CgNB) for locating the UE, wherein the CgNB comprises an NR Node B (gNB), a Neighbor gNB (NgNB) for the UE, a Location Management Component (LMC) server or a Local Location Management Function (LLMF) server.

16. The first base station of claim 12, wherein the change of serving base station comprises a change of SgNB, wherein the new serving base station is a new SgNB, and wherein the neighboring base stations for the new serving base stations are neighbor NR Node Bs (Ng-NBs).

17. The first base station of claim 16, wherein the at least one processor is configured to identify the change of SgNB for the UE based on determining a handover for the UE to a serving cell for the new SgNB, wherein the handover is for a Radio Resource Control (RRC) Connected state for the UE, wherein the message comprises a Handover Request.

18. The first base station of claim 16, wherein the at least one processor is configured to identify the change of SgNB for the UE based on receiving a request for a UE context from the new SgNB, wherein the message comprises a response to the request for the UE context.

19. The first base station of claim 18, wherein the UE context enables the UE to transition from a Radio Resource Control (RRC) Inactive state to an RRC Connected state or to perform a RAN-based Notification Area (RNA) update.

20. The first base station of claim 16, wherein the location context comprises at least one of information for the request for locating the UE or an indication of the second entity.

21. A first base station in a Radio Access Network (RAN) for a wireless network configured to support location determination of a user equipment (UE), wherein the first base station is a serving base station for the UE, comprising:

means for receiving a request for locating the UE from a first entity in the wireless network, wherein the request for locating the UE is based on a location request initiated by an external client and is received by the first base station from the first entity using control plane signaling;

means for sending information for locating the UE to a second entity in the RAN using control plane signaling, wherein the information for locating the UE sent to the second entity in the RAN enables the second entity to obtain location information for the UE using control plane signaling and to report the location information for the UE to the external client using control plane signaling;

means for identifying a change of serving base station for the UE, wherein the change of serving base station is to a new serving base station;

means for determining if there is sufficient signaling connectivity between the second entity and the new serving base station, and between the second entity and neighboring base stations for the new serving base station, to enable location reporting for the UE to continue at the second entity; and means for sending a message to or towards the new serving base station, wherein the message comprises an indication of whether or not there is sufficient signaling connectivity and a location context for the UE, wherein the message enables a continuation of location information reporting for the UE to the external client following the change of serving base station.

22. A non-transitory computer readable medium including program code stored thereon, the program code is operable to configure at least one processor in a first base station in a Radio Access Network (RAN) for a wireless network configured to support location determination of a user equipment (UE), wherein the first base station is a serving base station for the UE, comprising:

program code to receive a request for locating the UE from a first entity in the wireless network, wherein the request for locating the UE is based on a location request initiated by an external client and is received by the first base station from the first entity using control plane signaling;

program code to send information for locating the UE to a second entity in the RAN using control plane signaling, wherein the information for locating the UE sent to the second entity in the RAN enables the second entity to obtain location information for the UE using control plane signaling and to report the location information for the UE to the external client using control plane signaling;

program code to identify a change of serving base station for the UE, wherein the change of serving base station is to a new serving base station;

program code to determine if there is sufficient signaling connectivity between the second entity and the new serving base station, and between the second entity and neighboring base stations for the new serving base station, to enable location reporting for the UE to continue at the second entity; and program code to send a message to or towards the new serving base station, wherein the message comprises an indication of whether or not there is sufficient signaling connectivity and a location context for the UE, wherein the message enables a continuation of location information reporting for the UE to the external client following the change of serving base station.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for locating a user equipment (UE) performed by a first entity in a wireless network, wherein the first entity comprises the UE or an entity in a next generation Radio Access Network (NG-RAN) providing 5G New Radio (NR) wireless access to the UE, the method comprising:
   receiving a request for locating the UE from a second entity in the wireless network, wherein the request for locating the UE is based on a location request initiated by an external client and is received by the first entity from the second entity using control plane signaling, wherein the request for locating the UE includes an indication of using user plane signaling to report location information and an address to which the location information is to be reported;
   obtaining first location information for the UE using control plane signaling;
   establishing a first user plane connection to at least one of the external client based on the address or a third entity based on the address and the third entity establishes a second user plane connection towards the external client; and
   reporting the first location information for the UE to the external client using the first user plane connection or using the first user plane connection and the second user plane connection;
   wherein:
      the first location information for the UE comprises a plurality of sets of location information for the UE obtained at different first times by the first entity and reported to the external client by the first entity using the user plane signaling immediately following each of the different first time;
      the first entity is the entity in the NG-RAN providing 5G NR wireless access to the UE; and
      the first entity is a Controlling NR Node B (CgNB) for locating the UE, wherein the CgNB comprises a Serving NR Node B (SgNB) for the UE, a Neighbor NR Node B (NgNB) for the UE, a first Location Management Component (LMC) server or a first Local Location Management Function (LLMF) server; and
   wherein the method further comprises:
      obtaining location capabilities of the UE when the first entity does not have the location capabilities of the UE;

receiving first location measurements for the UE from at least one of the UE or a first plurality of Reception Points (RPs),
  wherein the first location measurements are received using control plane signaling,
  wherein the first location measurements received from the first plurality of RPs comprise location measurements of first uplink (UL) signals transmitted by the UE,
  wherein the first location measurements received from the UE include at least one of location measurements of first downlink (DL) reference signals (RSS) transmitted by a first plurality of Transmission Points (TPs) or other location measurements,
  wherein the first plurality of TPs comprise at least one of the first entity, the SgNB, at least one NgNB or at least one Location Transmission Unit (LTU),
  wherein the first plurality of RPs comprise at least one of the first entity, the SgNB, at least one NgNB or at least one Location Measurement Unit (LMU),
  wherein the at least one of the UE or the first plurality of RPs obtain the first location measurements at different second times;
obtaining the plurality of sets of location information for the UE based on the first location measurements received from the at least one of the UE or the first plurality of RPs
configuring at least some of the first location measurements in the at least one of the UE or the first plurality of RPs when not all of the first location measurements are initially configured in the at least one of the UE or the first plurality of RPs, wherein the at least some of the first location measurements configured in the UE are based on the location capabilities of the UE;
configuring in the UE at least some of the first UL signals transmitted by the UE when not all of the first UL signals are initially configured in the UE, wherein the configuring the transmission of the at least some of the first UL signals in the UE is based on the location capabilities of the UE; and
configuring in the first plurality of TPs at least some of the first DL RSs transmitted by the first plurality of TPs when not all of the first DL RSs transmitted by the first plurality of TPs are initially configured in the first plurality of TPs, wherein the configuring at least some of the first location measurements, the configuring in the UE at least some of the first UL signals and the configuring in the first plurality of TPs at least some of the first DL RSs uses control plane signaling.

2. The method of claim 1 further comprising:
receiving an indication of a new SgNB or a new serving cell for the UE; and
determining to continue obtaining the first location information for the UE using control plane signaling and continue reporting the first location information for the UE to the external client using user plane signaling.

3. The method of claim 2, wherein the indication of the new SgNB or the new serving cell is received from the new SgNB using control plane signaling, wherein the indication of the new SgNB or the new serving cell further includes an indication of sufficient connectivity, wherein the determining to continue obtaining the first location information for the UE and continue reporting the first location information for the UE to the external client is based at least in part on the indication of sufficient connectivity.

4. The method of claim 2 further comprising at least one of:
configuring second location measurements for the UE in at least one of the UE or a second plurality of RPs, based on the indication of the new SgNB or the new serving cell;
configuring transmission of second UL signals by the UE, based on the indication of the new SgNB or the new serving cell;
configuring transmission of second DL RSs by a second plurality of TPs, based on the indication of the new SgNB or the new serving cell;
cancelling at least some of the first location measurements for the UE in at least one of the UE or the first plurality of RPs, based on the indication of the new SgNB or the new serving cell;
cancelling the transmission of at least some of the first UL signals by the UE, based on the indication of the new SgNB or the new serving cell; or
cancelling the transmission of at least some of the first DL RSs in the first plurality of TPs, based on the indication of the new SgNB or the new serving cell.

5. The method of claim 1 further comprising:
receiving an indication of a new SgNB or a new serving cell for the UE; and
determining to cease obtaining the first location information for the UE using control plane signaling and cease reporting the first location information for the UE to the external client using user plane signaling, based on the indication of the new SgNB or the new serving cell for the UE.

6. The method of claim 5, wherein the indication of the new SgNB or the new serving cell is received from the new SgNB for the UE, and further comprising:
determining a fourth entity, wherein the fourth entity comprises a new CgNB for locating the UE, wherein the new CgNB comprises the new SgNB, a new NgNB for the UE, a second LMC server or a second LLMF server, wherein the fourth entity is different than the first entity; and
sending a location context for the UE to the fourth entity, wherein the location context enables the fourth entity to obtain second location information for the UE using control plane signaling and report the second location information for the UE to the external client using user plane signaling.

7. The method of claim 6, wherein the fourth entity is determined based on the indication of the new SgNB or the new serving cell for the UE or based on an indication of the fourth entity received from the new SgNB.

8. The method of claim 6, wherein the location context comprises at least one of:
(i) information for the request for locating the UE received from the second entity;
(ii) an indication of the first plurality of RPs;
(iii) an indication of the first plurality of TPs;
(iv) an indication of the first location measurements configured in the UE;
(v) an indication of the first location measurements configured in the first plurality of RPs;
(vi) an indication of the first DL RSs transmitted by the first plurality of TPs;
(vii) an indication of the first UL signals transmitted by the UE;

(viii) a location session identifier;
(ix) the location capabilities of the UE; or
(x) some combination of these.

9. The method of claim 5, wherein the indication of the new SgNB is received from an old SgNB for the UE, wherein the indication of the new SgNB further includes an indication of insufficient connectivity, wherein the determining to cease obtaining the first location information and cease reporting the first location information is based on the indication of insufficient connectivity.

10. The method of claim 9, further comprising at least one of:
cancelling the first location measurements for the UE in at least one of the UE or the first plurality of RPs;
cancelling the transmission of the first UL signals by the UE;
cancelling the transmission of at least some of the first DL RSs in the first plurality of TPs;
or some combination of these.

11. A first entity in a wireless network configured to support location determination of a user equipment (UE), wherein the first entity comprises the UE or an entity in a next generation Radio Access Network (NG-RAN) providing 5G New Radio (NR) wireless access to the UE, comprising:
an external interface configured to communicate with other entities in the wireless network;
at least one memory; and
at least one processor coupled to the wireless transceiver and the at least one memory, the at least one processor configured to:
receive a request for locating the UE from a second entity in the wireless network, wherein the request for locating the UE is based on a location request initiated by an external client and is received by the first entity from the second entity using control plane signaling, wherein the request for locating the UE includes an indication of using user plane signaling to report location information and an address to which the location information is to be reported;
obtain first location information for the UE using control plane signaling;
establish a first user plane connection to at least one of the external client based on the address or a third entity based on the address and the third entity establishes a second user plane connection towards the external client; and
report the first location information for the UE to the external client using the first user plane connection or using the first user plane connection and the second user plane connection;
wherein:
the first location information for the UE comprises a plurality of sets of location information for the UE obtained at different first times by the first entity and reported to the external client by the first entity using the user plane signaling immediately following each of the different first times;
the first entity is the entity in the NG-RAN providing 5G NR wireless access to the UE;
the first entity is a Controlling NR Node B (CgNB) for locating the UE, wherein the CgNB comprises a Serving NR Node B (SgNB) for the UE, a Neighbor NR Node B (NgNB) for the UE, a first Location Management Component (LMC) server or a first Local Location Management Function (LLMF) server;

wherein the at least one processor is further configured to:
obtain location capabilities of the UE when the first entity does not have the location capabilities of the UE;
receive first location measurements for the UE from at least one of the UE or a first plurality of Reception Points (RPs),
wherein the first location measurements are received using control plane signaling,
wherein the first location measurements received from the first plurality of RPs comprise location measurements of first uplink (UL) signals transmitted by the UE,
wherein the first location measurements received from the UE include at least one of location measurements of first downlink (DL) reference signals (RSS) transmitted by a first plurality of Transmission Points (TPs) or other location measurements,
wherein the first plurality of TPs comprise at least one of the first entity, the SgNB, at least one NgNB or at least one Location Transmission Unit (LTU),
wherein the first plurality of RPs comprise at least one of the first entity, the SgNB, at least one NgNB or at least one Location Measurement Unit (LMU),
wherein the at least one of the UE or the first plurality of RPs obtain the first location measurements at different second times; and
obtain the plurality of sets of location information for the UE based on the first location measurements received from the at least one of the UE or the first plurality of RPs
configure at least some of the first location measurements in the at least one of the UE or the first plurality of RPs when not all of the first location measurements are initially configured in the at least one of the UE or the first plurality of RPs, wherein the at least some of the first location measurements configured in the UE are based on the location capabilities of the UE;
configure in the UE at least some of the first UL signals transmitted by the UE when not all of the first UL signals are initially configured in the UE, wherein the configuring the transmission of the at least some of the first UL signals in the UE is based on the location capabilities of the UE; and
configure in the first plurality of TPs at least some of the first DL RSs transmitted by the first plurality of TPs when not all of the first DL RSs transmitted by the first plurality of TPs are initially configured in the first plurality of TPs, wherein the configuring at least some of the first location measurements, the configuring in the UE at least some of the first UL signals and the configuring in the first plurality of TPs at least some of the first DL RSs uses control plane signaling.

12. The first entity of claim 11, wherein the at least one processor is further configured to:
receive an indication of a new SgNB or a new serving cell for the UE; and
determine to continue obtaining the first location information for the UE using control plane signaling and continue reporting the first location information for the UE to the external client using user plane signaling.

13. The first entity of claim 12, wherein the indication of the new SgNB or the new serving cell is received from the new SgNB using control plane signaling, wherein the indication of the new SgNB or the new serving cell further includes an indication of sufficient connectivity, wherein the determining to continue obtaining the first location information for the UE and continue reporting the first location information for the UE to the external client is based at least in part on the indication of sufficient connectivity.

14. The first entity of claim 12, wherein the at least one processor is further configured to at least one of:
configure second location measurements for the UE in at least one of the UE or a second plurality of RPs, based on the indication of the new SgNB or the new serving cell;
configure transmission of second UL signals by the UE, based on the indication of the new SgNB or the new serving cell;
configure transmission of second DL RSs by a second plurality of TPs, based on the indication of the new SgNB or the new serving cell;
cancel at least some of the first location measurements for the UE in at least one of the UE or the first plurality of RPs, based on the indication of the new SgNB or the new serving cell;
cancel the transmission of at least some of the first UL signals by the UE, based on the indication of the new SgNB or the new serving cell; or
cancel the transmission of at least some of the first DL RSs in the first plurality of TPs, based on the indication of the new SgNB or the new serving cell.

15. The first entity of claim 11, wherein the at least one processor is further configured to:
receive an indication of a new SgNB or a new serving cell for the UE; and
determine to cease obtaining the first location information for the UE using control plane signaling and cease reporting the first location information for the UE to the external client using user plane signaling, based on the indication of the new SgNB or the new serving cell for the UE.

16. The first entity of claim 15, wherein the indication of the new SgNB or the new serving cell is received from the new SgNB for the UE, and wherein the at least one processor is further configured to:
determine a fourth entity, wherein the fourth entity comprises a new CgNB for locating the UE, wherein the new CgNB comprises the new SgNB, a new NgNB for the UE, a second LMC server or a second LLMF server, wherein the fourth entity is different than the first entity; and
send a location context for the UE to the fourth entity, wherein the location context enables the fourth entity to obtain second location information for the UE using control plane signaling and report the second location information for the UE to the external client using user plane signaling.

17. The first entity of claim 16, wherein the fourth entity is determined based on the indication of the new SgNB or the new serving cell for the UE or based on an indication of the fourth entity received from the new SgNB.

18. The first entity of claim 16, wherein the location context comprises at least one of:
(i) information for the request for locating the UE received from the second entity;
(ii) an indication of the first plurality of RPs;
(iii) an indication of the first plurality of TPs;
(iv) an indication of the first location measurements configured in the UE;
(v) an indication of the first location measurements configured in the first plurality of RPs;
(vi) an indication of the first DL RSs transmitted by the first plurality of TPs;
(vii) an indication of the first UL signals transmitted by the UE;
(viii) a location session identifier;
(ix) the location capabilities of the UE; or
(x) some combination of these.

19. The first entity of claim 15, wherein the indication of the new SgNB is received from an old SgNB for the UE, wherein the indication of the new SgNB further includes an indication of insufficient connectivity, wherein the at least one processor is configured to determine to cease obtaining the first location information and cease reporting the first location information based on the indication of insufficient connectivity.

20. The first entity of claim 19, wherein the at least one processor is further configured to at least one of:
cancel the first location measurements for the UE in at least one of the UE or the first plurality of RPs;
cancel the transmission of the first UL signals by the UE;
cancel the transmission of at least some of the first DL RSs in the first plurality of TPs;
or some combination of these.

* * * * *